(12) United States Patent
Deshpande

(10) Patent No.: US 12,167,012 B2
(45) Date of Patent: Dec. 10, 2024

(54) SYSTEMS AND METHODS FOR SIGNALING TILE STRUCTURES FOR PICTURES OF CODED VIDEO

(71) Applicant: SHARP KABUSHIKI KAISHA, Sakai (JP)

(72) Inventor: Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/295,963

(22) PCT Filed: Nov. 26, 2019

(86) PCT No.: PCT/JP2019/046062
§ 371 (c)(1),
(2) Date: May 21, 2021

(87) PCT Pub. No.: WO2020/111023
PCT Pub. Date: Jun. 4, 2020

(65) Prior Publication Data
US 2023/0027997 A1      Jan. 26, 2023

Related U.S. Application Data

(60) Provisional application No. 62/806,502, filed on Feb. 15, 2019, provisional application No. 62/791,227, (Continued)

(51) Int. Cl.
*H04N 19/46* (2014.01)
*H04N 19/176* (2014.01)
(Continued)

(52) U.S. Cl.
CPC .......... *H04N 19/46* (2014.11); *H04N 19/176* (2014.11); *H04N 19/70* (2014.11); *H04N 19/96* (2014.11)

(58) Field of Classification Search
CPC ...... H04N 19/46; H04N 19/176; H04N 19/70; H04N 19/96
See application file for complete search history.

(56) References Cited

U.S. PATENT DOCUMENTS 10,057,570 B2*   8/2018  Ye ................... H04N 19/105
2017/0289556 A1* 10/2017 Hendry ............ H04N 21/85406
(Continued)

FOREIGN PATENT DOCUMENTS

| KR | 20150139894 A | 12/2015 | |
|---|---|---|---|
| KR | 20180013918 A | 2/2018 | |
| WO | WO-2020060184 A1 * | 3/2020 | ........... H04N 19/119 |

OTHER PUBLICATIONS

Sjoberg et al. "Tile groups for VVC", Joint Video Experts Team (JVET) of ITU-T SG 16 WP 3 and ISO/IEC JTC 1/SC 29/WG 11 12th Meeting: Macao, CN, Oct. 3-12, 2018 (Year: 2018).*
(Continued)

*Primary Examiner* — Richard A Hansell, Jr.
(74) *Attorney, Agent, or Firm* — ScienBiziP, P.C.

(57) ABSTRACT

A method of decoding video data by a device is provided. A first flag syntax in a picture parameter set is decoded. The first flag specifies whether tiles within each slice are in raster scan order or the tiles within each slice cover a rectangular region of a picture. The method determines, based on the first flag syntax, whether a slice address syntax is present in a slice header. The slice address syntax is decoded when the slice address is present in the slice header.

14 Claims, 10 Drawing Sheets

Related U.S. Application Data filed on Jan. 11, 2019, provisional application No. 62/784,296, filed on Dec. 21, 2018, provisional application No. 62/774,050, filed on Nov. 30, 2018.

(51) Int. Cl.
*H04N 19/70* (2014.01)
*H04N 19/96* (2014.01)

(56) References Cited

U.S. PATENT DOCUMENTS

| | | | |
|---|---|---|---|
| 2020/0213588 A1* | 7/2020 | Chen | H04N 19/91 |
| 2020/0236377 A1* | 7/2020 | Choi | H04N 19/129 |
| 2021/0204000 A1* | 7/2021 | Wang | H04N 19/184 |
| 2021/0235096 A1* | 7/2021 | Hendry | H04N 19/463 |
| 2021/0250598 A1* | 8/2021 | Nishi | H04N 19/70 |
| 2021/0281858 A1* | 9/2021 | Hannuksela | H04N 19/174 |
| 2021/0314577 A1* | 10/2021 | Hendry | H04N 19/119 |
| 2021/0321110 A1* | 10/2021 | Hendry | H04N 19/70 |
| 2022/0182631 A1* | 6/2022 | Ikai | H04N 19/174 |

OTHER PUBLICATIONS

High Efficiency Video Coding (HEVC), Rec. ITU-T H.265, Dec. 2016.
Jianle Chen et al.: "Algorithm Description of Joint Exploration Test Model 7 (JEM 7)," Document: JVET-G1001-v1 Joint Video Exploration Team (JVET) of ITU-T SG 16 WP 3 and ISO/IEC JTC 1/SC 29/WG 11 7th Meeting: Torino, IT, Jul. 13-21, 2017.
Benjamin Bross: "Versatile Video Coding (Draft 1)," Document: JVET-J1001-v2 Joint Video Experts Team (JVET) of ITU-T SG 16 WP 3 and ISO/IEC JTC 1/SC 29/WG 11 10th Meeting: San Diego, US, Apr. 10-20, 2018.
Benjamin Bross et al.: "Versatile Video Coding (Draft 2)," Document: JVET-K1001-v7 Joint Video Experts Team (JVET) of ITU-T SG 16 WP 3 and ISO/IEC JTC 1/SC 29/WG 11 11th Meeting: Ljubljana, SI, Jul. 10-18, 2018.
Benjamin Bross et al.: "Versatile Video Coding (Draft 3)," Document: JVET-L1001-v2 Joint Video Experts Team (JVET) of ITU-T SG 16 WP 3 and ISO/IEC JTC 1/SC 29/WG 11 12th Meeting: Macao, CN, Oct. 3-12, 2018.
Sachin Deshpande et al.: "On Tile Information Signaling for VVC," Document: JVET-10374-v2 Joint Video Experts Team (JVET) of ITU-T SG 16 WP 3 and ISO/IEC JTC 1/SC 29/WG 11 12th Meeting: Macao, CN, Oct. 3-12, 2018.
Rickard Sjöberg et al.: "Tile groups for VVC," Document: JVET-L0415-v1 Joint Video Experts Team (JVET) of ITU-T SG 16 WP 3 and ISO/IEC JTC 1/SC 29/WG 11 12th Meeting: Macao, CN, Oct. 3-12, 2018.
Ye-Kui Wang et al.: "Tile groups," Document: JCTVC-H0520r1 Joint Collaborative Team on Video Coding (JCT-VC) of ITU-T SG16 WP3 and ISO/IEC JTC1/SC29/WG11 8th Meeting: San Jose, CA, USA, Feb. 1-10, 2012.
Sachin Deshpande et al.: "On Tile Grouping," Document: JVET-M0853-v2 Joint Video Experts Team (JVET) of ITU-T SG 16 WP 3 and ISO/IEC JTC 1/SC 29/WG 11 13th Meeting: Marrakech, MA, Jan. 9-18, 2019.
Sullivan G et al., "Draft Text of H.263+", Document: ITU-LBC-97-094R2 (Draft12 of H.263+), ITU-Telecommunications Standardization Sector, Study Group 16, Video Coding Experts Group (Q.15/16), Jun. 24, 1997-Jun. 27, 1997, Portland, OR, US, No. q15a05, May 9, 1997, XP030002586, sections 5.1.4, 5.1.9, 5.2, annex K.1.
Y-K Wang (Huawei) et al., "On slicing and tiling in VCC", Document: JVET-L0114-v1, Joint Video Experts Team (JVET) of ITU-T SG 16 WP 3 and ISO/IEC JTC 1/SC 29/WG 11, 12th Meeting: Macao, CN, Oct. 3-12, 2018, XP030193755, sections 1.1, 1.3.2, 2.
"Text of CD ISO/IEC 23008-2:201x High Efficiency Video Coding (4th ed.)", 120. MPEG Meeting, 201711023-Oct. 27, 2017, Macau, CN, (Motion Picture Expert Group or ISO/IEC JTC1/SC29/WG11), No. n17205, Jan. 17, 2018,XP030023866, sections 6.3.1 (pp. 32,33), 6.5.1 (pp. 37-39), figures 6-4, 6-5.
ITU-T Telecommunication Standardization Sector of ITU, "Series H: Audiovisual and Multimedia Systems Infrastructure of audiovisual services—Coding of moving video", H.264, (Apr. 2017).
Wenger, Stephan & Knorr, G.D. & Ott, Jorg & Kossentini, Faouzi. (1998). "Error Resilience Support in H. 263+. Circuits and Systems for Video Technology", IEEE Transactions on. 8. 867-877. 10.1109/76.735382.; Dec. 31, 1998.
Lulin Chen et al.: "AHG17: Flexible tile grouping for VVC", JVET-M0160-v2, Joint Video Experts Team (JVET) of ITU-T SG 16 WP 3 and ISO/IEC JTC 1/SC 29/WG 11, 13th Meeting: Marrakech, MA, Jan. 9-18, 2019 (Jan. 6, 2019).

* cited by examiner

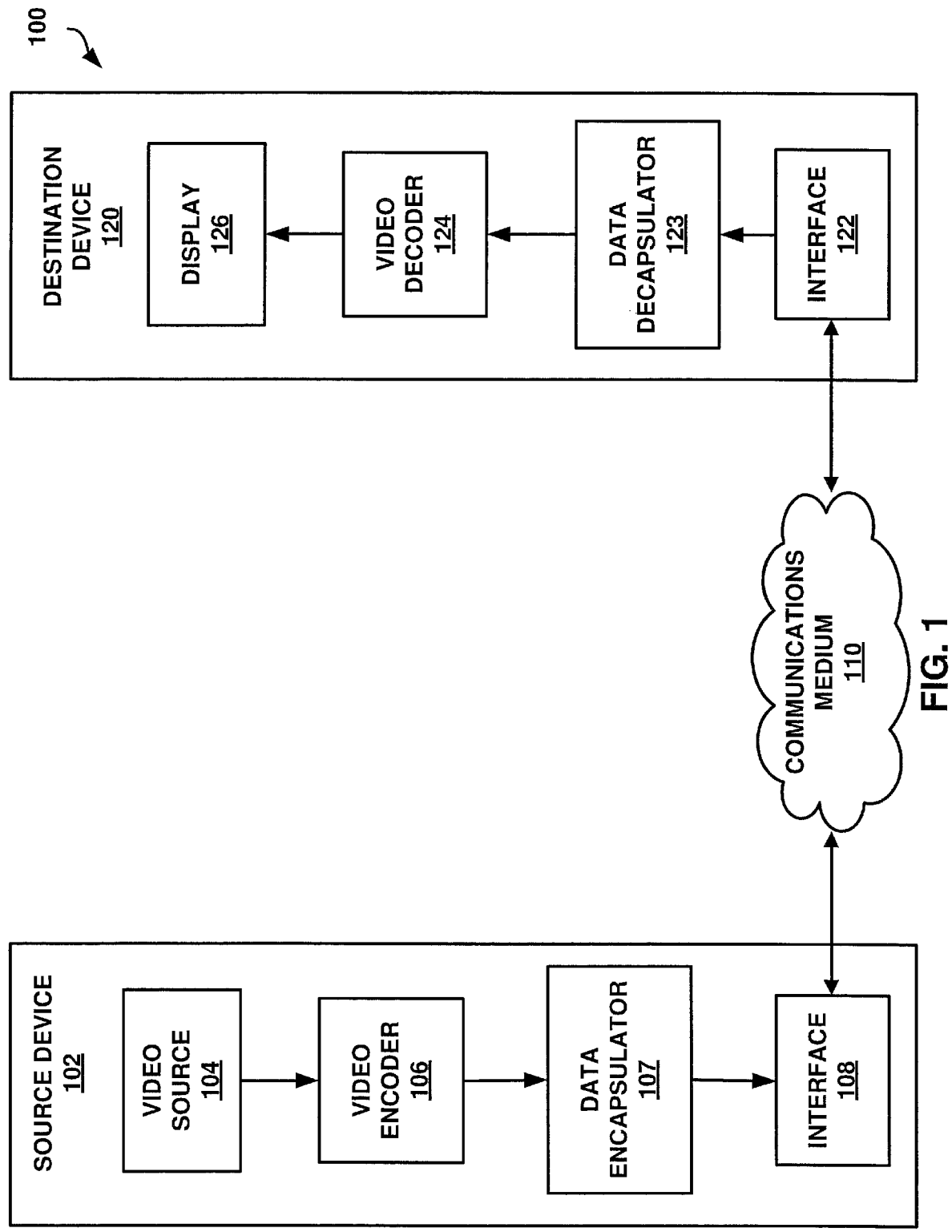

SYSTEMS AND METHODS FOR SIGNALING TILE STRUCTURES FOR PICTURES OF CODED VIDEO

CROSS-REFERENCE TO RELATED APPLICATION(S)

This present disclosure is a national stage application of International Patent Application PCT/JP2019/046062, filed on Nov. 26, 2019, now published as WO2020/111023, which claims the benefit of and priority to U.S. Provisional Patent Application Ser. No. 62/774,050, filed on Nov. 30, 2018, U.S. Provisional Patent Application Ser. No. 62/784,296, filed on Dec. 21, 2018, U.S. Provisional Patent Application Ser. No. 62/791,227, filed on Jan. 11, 2019 and U.S. Provisional Patent Application Ser. No. 62/806,502, filed on Feb. 15, 2019, the contents of all of which are hereby incorporated fully by reference into the present disclosure.

TECHNICAL FIELD

This disclosure relates to video coding and more particularly to techniques for signaling of tile structures for pictures of coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that are under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the 10$^{th}$ Meeting of ISO/IEC JTC1/SC29/WG11 16-20 Apr. 2018, San Diego, CA As a result of the multiple descriptions of video coding, a draft text of a video coding specification is described in "Versatile Video Coding (Draft 1)," 10$^{th}$ Meeting of ISO/IEC JTC1/SC29/WG11 16-20 April 2018, San Diego, CA, document JVET-J1001-v2, which is incorporated by reference herein, and referred to as JVET-J1001. "Versatile Video Coding (Draft 2)," 11th Meeting of ISO/IEC JTC1/SC29/WG11 10-18 Jul. 2018, Ljubljana, SI, document JVET-K1001-v7, which is incorporated by reference herein, and referred to as JVET-K1001, is an update to JVET-J1001. Further, "Versatile Video Coding (Draft 3)," 12th Meeting of ISO/IEC JTC1/SC29/WG11 3-12 Oct. 2018, Macao, CN, document JVET-L1001-v2, which is incorporated by reference herein, and referred to as JVETL1001, is an update to JVET-K1001.

Video compression techniques reduce data requirements for storing and transmitting video data by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY OF INVENTION

In one example, a method of decoding video data is provided, the method comprising: decoding a first flag syntax in a picture parameter set, wherein the first flag syntax specifies whether tiles within each of at least one slice are in raster scan order or the tiles within each of the at least one slice cover a rectangular region of a picture; determining, based on a value of the first flag syntax, whether a slice address syntax is present in a slice header; and decoding the slice address syntax when the slice address syntax is present in the slice header.

In one example, a method of coding data is provided, the method comprising: coding a first flag syntax in a picture parameter set, wherein the first flag syntax specifies whether tiles within each of at least one slice are in raster scan order or the tiles within each of the at least one slice cover a rectangular region of a picture; and determining, based on a value of the first flag syntax, whether to code the slice address syntax into a slice header.

BRIEF DESCRIPTION OF DRAWINGS

FIG. 1 is a block diagram illustrating an example of a system that may be configured to encode and decode video data according to one or more techniques of this this disclosure.

DESCRIPTION OF EMBODIMENTS

Figure 2A:
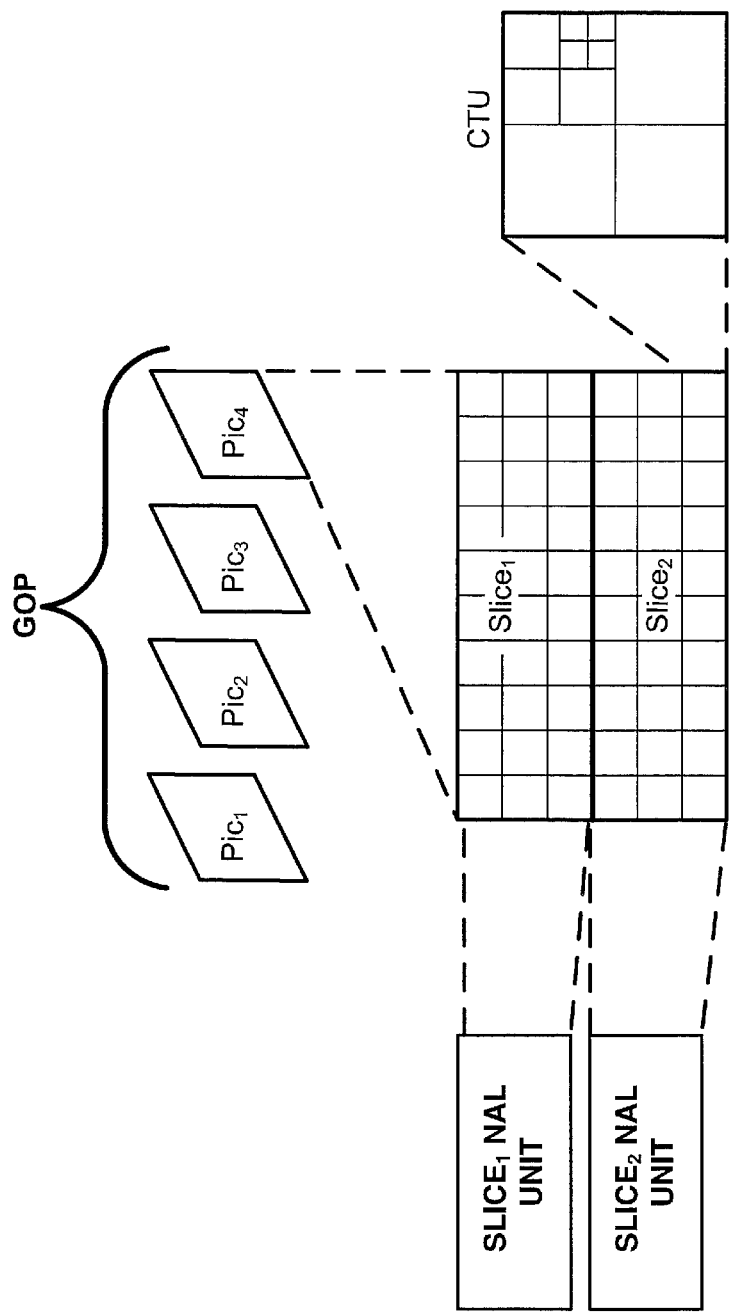
FIG. 2A is a conceptual diagram illustrating coded video data and corresponding data structures according to one or more techniques of this this disclosure.

In general, this disclosure describes various techniques for coding video data. In particular, this disclosure describes techniques for signaling of tile structures for pictures of coded video. As used herein the term tile structure may refer to a particular partitioning of a picture into tiles. As described in further detail below, according to the techniques described herein a picture may be partitioned into variable sized tiles and tile structures. Signaling of tile structures according to the techniques described herein may be particularly useful for improving video distribution system performance by lowering transmission bandwidth and/or facilitating parallelization of a video encoder and/or decoder. It should be noted that although techniques of this disclosure are described with respect to ITU-T H.264 and ITU-T H.265, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264 and ITU-T H.265 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of signaling tile set structures comprises signaling a flag indicating tile sets are enabled in a bitstream, signaling a syntax element indicating a number tile set columns partitioning a picture, and signaling a syntax element indicating a number tile set rows partitioning a picture.

In one example, a device comprises one or more processors configured to signal a flag indicating tile sets are enabled in a bitstream, signal a syntax element indicating a number tile set columns partitioning a picture, and signal a syntax element indicating a number tile set rows partitioning a picture.

In one example, a non-transitory computer-readable storage medium comprises instructions stored thereon that, when executed, cause one or more processors of a device to signal a flag indicating tile sets are enabled in a bitstream, signal a syntax element indicating a number tile set columns partitioning a picture, and signal a syntax element indicating a number tile set rows partitioning a picture.

In one example, an apparatus comprises means for signaling a flag indicating tile sets are enabled in a bitstream, means for signaling a syntax element indicating a number tile set columns partitioning a picture, and means for signaling a syntax element indicating a number tile set rows partitioning a picture.

In one example, a method of decoding video data comprises parsing a flag indicating tile sets are enabled in a bitstream, parsing a syntax element indicating a number tile set columns partitioning a picture, parsing a syntax element indicating a number tile set rows partitioning a picture, and generating video data based on values of the parsed syntax elements.

In one example, a device comprises one or more processors configured to parse a flag indicating tile sets are enabled in a bitstream, parse a syntax element indicating a number tile set columns partitioning a picture, parse a syntax element indicating a number tile set rows partitioning a picture, and generate video data based on values of the parsed syntax elements.

In one example, a non-transitory computer-readable storage medium comprises instructions stored thereon that, when executed, cause one or more processors of a device to parse a flag indicating tile sets are enabled in a bitstream, parse a syntax element indicating a number tile set columns partitioning a picture, parse a syntax element indicating a number tile set rows partitioning a picture, and generate video data based on values of the parsed syntax elements.

In one example, an apparatus comprises means for parsing a flag indicating tile sets are enabled in a bitstream, means for parsing a syntax element indicating a number tile set columns partitioning a picture, means for parsing a syntax element indicating a number tile set rows partitioning a picture, and means for generating video data based on values of the parsed syntax elements.

The details of one or more examples are set forth in the accompanying drawings and the description below. Other features, objects, and advantages will be apparent from the description and drawings, and from the claims.

Video content typically includes video sequences comprised of a series of frames. A series of frames may also be referred to as a group of pictures (GOP). Each video frame or picture may include a one or more slices, where a slice includes a plurality of video blocks. A video block includes an array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure (which may be referred to as a Largest Coding Unit (LCU)) where a picture may be split into CTUs of equal size and each CTU may include Coding Tree Blocks (CTB) having 16×16, 32×32, or 64×64 luma samples. As used herein, the term video block may generally refer to an area of a picture or may more specifically refer to the largest array of pixel values that may be predictively coded, sub-divisions thereof, and/or corresponding structures. Further, according to ITU-T H.265, each video frame or picture may be partitioned to include one or more tiles, where a tile is a sequence of coding tree units corresponding to a rectangular area of a picture.

In ITU-T H.265, a CTU is composed of respective CTBs for each component of video data (e.g., luma (Y) and chroma (Cb and Cr)). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB sizes type include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. Thus, the binary tree structure in JEM enables square and rectangular leaf nodes, where each leaf node includes a CB. As illustrated in FIG. 2A, a picture included in a GOP may include slices, where each slice includes a sequence of CTUs and each CTU may be partitioned according to a QTBT structure. In JEM, CBs are used for prediction without any further partitioning. That is, in JEM, a CB may be a block of sample values on which the same prediction is applied. Thus, a JEM QTBT leaf node may be analogous a PB in ITU-T H.265.

Intra prediction data (e.g., intra prediction mode syntax elements) or inter prediction data (e.g., motion data syntax elements) may associate PUs with corresponding reference samples. Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, an array of pixel difference values may be sub-divided for purposes of generating transform coefficients (e.g., four 8×8 transforms may be applied to a 16×16 array of residual values corresponding to a 16×16 luma CB), such sub-divisions may be referred to as Transform Blocks (TBs). Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP), Spatial-temporal motion vector prediction (STMVP), Pattern matched motion vector derivation (PMMVD) mode, which is a special merge mode based on Frame-Rate Up Conversion (FRUC) techniques, and affine transform motion compensation prediction.

Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. In ITU-T H.265, a CU is associated with a transform unit (TU) structure having its root at the CU level. That is, in ITU-T H.265, as described above, an array of difference values may be sub-divided for purposes of generating transform coefficients (e.g., four 8×8 transforms may be applied to a 16×16 array of residual values). It should be noted that in ITU-T H.265, TBs are not necessarily aligned with PBs.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization approximates transform coefficients by amplitudes restricted to a set of specified values. Quantization may be used in order to vary the amount of data required to represent a group of transform coefficients. Quantization may be realized through division of transform coefficients by a scaling factor and any associated rounding functions (e.g., rounding to the nearest integer). Quantized transform coefficients may be referred to as coefficient level values. Inverse quantization (or "dequantization") may include multiplication of coefficient level values by the scaling factor. It should be noted that as used herein the term quantization process in some instances may refer to division by a scaling factor to generate level values or multiplication by a scaling factor to recover transform coefficients in some instances. That is, a quantization process may refer to quantization in some cases and inverse quantization in some cases.

With respect to the equations used herein, the following arithmetic operators may be used:

| | |
|---|---|
| + | Addition |
| − | Subtraction |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and -7/-4 are truncated to 1 and -7/4 and 7/-4 are truncated to -1. |
| ÷ | Used to denote division in mathematical equations where no truncation or rounding is intended. |
| $\frac{x}{y}$ | Used to denote division in mathematical equations where no truncation or rounding is intended. |

Further, the following mathematical functions may be used:
Log 2(x) the base-2 logarithm of x;

$$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Ceil(x) the smallest integer greater than or equal to x.
With respect to the example syntax used herein, the following definitions of logical operators may be applied:

| | |
|---|---|
| x && y | Boolean logical "and" of x and y |
| x \|\| y | Boolean logical "or" of x and y |
| ! | Boolean logical "not" |
| x ? y : z | If x is TRUE or not equal to 0, evaluates to the value of y; otherwise, evaluates to the value of z. |

Further, the following relational operators may be applied:

| | |
|---|---|
| > | Greater than |
| >= | Greater than or equal to |
| < | Less than |
| <= | Less than or equal to |
| == | Equal to |
| != | Not equal to |

Further, it should be noted that in the syntax descriptors used herein, the following descriptors may be applied:
u(n): unsigned integer using n bits.
ue(v): unsigned integer 0-th order Exp-Golomb-coded syntax element with the left bit first.
Virtual Reality (VR) applications may include video content that may be rendered with a head-mounted display, where only the area of the spherical video that corresponds to the orientation of the user's head is rendered. VR applications may be enabled by omnidirectional video, which is also referred to as 3600 spherical video. Omnidirectional video is typically captured by multiple cameras that cover up to 3600 of a scene. A distinct feature of omnidirectional video compared to normal video is that, typically only a subset of the entire captured video region is displayed, i.e., the area corresponding to the current user's field of view (FOV) is displayed. A FOV is sometimes also referred to as viewport. In other cases, a viewport may be part of the spherical video that is currently displayed and viewed by the user. It should be noted that the size of the viewport can be smaller than or equal to the field of view.

A most-interested region in an omnidirectional video picture may refer to a subset of the entire video region that is statistically the most likely to be rendered to the user at the presentation time of that picture (i.e., most likely to be in a FOV). It should be noted that most-interested regions of an omnidirectional video may be determined by the intent of a director or producer, or derived from user statistics by a service or content provider, e.g., through the statistics of which regions have been requested/seen the most by users when the omnidirectional video content was provided through a streaming service. Most-interested regions may be used for data pre-fetching in omnidirectional video adaptive streaming by edge servers or clients, and/or transcoding optimization when an omnidirectional video is transcoded, e.g., to a different codec or projection mapping. Thus, signaling most-interested regions in an omnidirectional video picture may improve system performance by lowering transmission bandwidth and lowering decoding complexity. It should be noted that a base region generally refers to an overall region of coded video data, e.g., the entire video region.

Figure 2B:
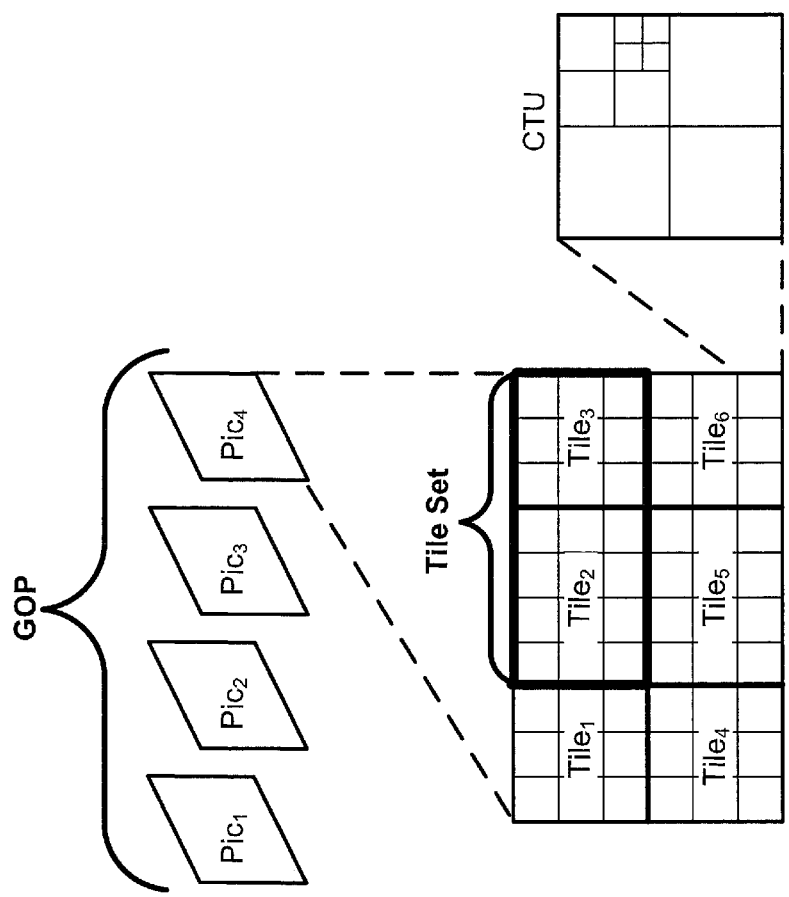
FIG. 2B is a conceptual diagram illustrating coded video data and corresponding data structures according to one or more techniques of this this disclosure.
Figure 2C:
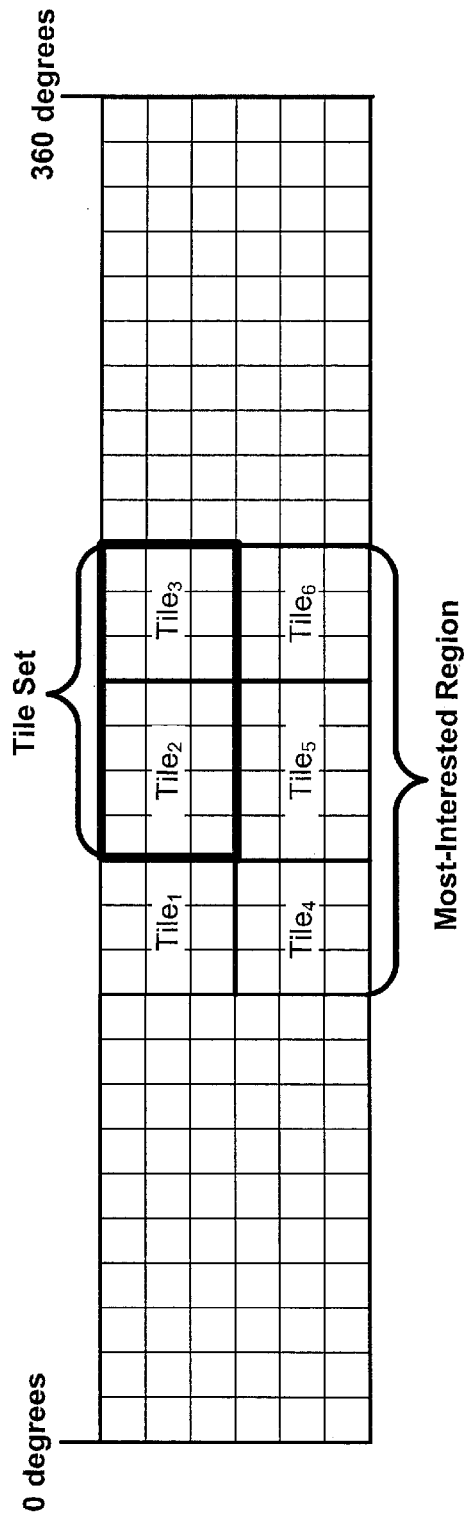
FIG. 2C is a conceptual diagram illustrating coded video data and corresponding data structures according to one or more techniques of this this disclosure.

As described above, according to ITU-T H.265, each video frame or picture may be partitioned to include one or more slices and further partitioned to include one or more tiles. FIGS. 2A-2C are conceptual diagrams illustrating an example of a group of pictures including slices and further partitioning pictures into tiles. In the example illustrated in FIG. 2A, $Pic_4$ is illustrated as including two slices (i.e., $Slice_1$ and $Slice_2$) where each slice includes a sequence of CTUs (e.g., in raster scan order). It should be noted that a slice is a sequence of one or more slice segments starting with an independent slice segment and containing all subsequent dependent slice segments (if any) that precede the next independent slice segment (if any) within the same access unit. A slice segment, like a slice, is a sequence of coding tree units. In the examples described herein, in some cases the terms slice and slice segment may be used interchangeably to indicate a sequent of coding tree units. In the example illustrated in FIG. 2B, $Pic_4$ is illustrated as including six tiles (i.e., $Tile_1$ to $Tile_6$), where each tile is rectangular and includes a sequence of CTUs. It should be noted that in ITU-T H.265, a tile may consist of coding tree units contained in more than one slice and a slice may consist of coding tree units contained in more than one tile. However, ITU-T H.265 provides that one or both of the following conditions shall be fulfilled: (1) All coding tree units in a slice belong to the same tile; and (2) All coding tree units in a tile belong to the same slice. Thus, for example, with respect to FIG. 2B, all of the tiles may belong to a single slice or the tiles may belong to multiple slices (e.g., $Tile_1$ to $Tile_3$ may belong to $Slice_1$ and $Tile_4$ to $Tile_6$ may belong to $Slice_2$). With respect to JVETL1001, it has been proposed that slices shall be required to consist of an integer number of complete tiles instead of only being required to consist of an integer number of complete CTUs. As such, a slice including a set of CTUs which do not form a rectangular region of a picture may or may not be supported in some video coding techniques. Further, a slice that is required to consist of an integer number of complete tiles is referred to as a tile group. The techniques described herein may applicable to slices, tiles, and/or tile groups.

Further, as illustrated in FIG. 2B, tiles may form tile sets (i.e., $Tile_2$ and $Tile_3$ form a tile set). Tile sets may be used to define boundaries for coding dependencies (e.g., intra-prediction dependencies, entropy encoding dependencies, etc.,) and as such, may enable parallelism in coding and region-of-interest coding. For example, if the video sequence in the example illustrated in FIG. 2B corresponds to a nightly news program, the tile set formed by $Tile_2$ and $Tile_3$ may correspond to a visual region-of-interest including a news anchor reading the news. ITU-T H.265 defines signaling that enables motion-constrained tile sets (MCTS). A motion-constrained tile set may include a tile set for which inter-picture prediction dependencies are limited to the collocated tile sets in reference pictures. Thus, it is possible to perform motion compensation for a given MCTS independent of the decoding of other tile sets outside the MCTS. For example, referring to FIG. 2B, if the tile set formed by $Tile_2$ and $Tile_3$ is a MCTS and each of $Pic_1$ to $PiC_3$ include collocated tile sets, motion compensation may be performed on $Tile_2$ and $Tile_3$ independent of coding $Tile_1$, $Tile_4$, $Tile_5$, and $Tile_6$ in $Pic_4$ and tiles collocated with tiles $Tile_1$, $Tile_4$, $Tile_5$, and $Tile_6$ in each of $Pic_1$ to $Pic_3$. Coding video data according to MCTS may be useful for video applications including omnidirectional video presentations.

As illustrated in FIG. 2C, $Tile_1$ to $Tile_6$ may form a most-interested region of an omnidirectional video. Further, the tile set formed by $Tile_2$ and $Tile_3$ may be a MCTS included within the most-interested region. Viewport dependent video coding, which may also be referred to as viewport dependent partial video coding, may be used to enable decoding of only part of an entire video region. That is, for example, viewport dependent video coding may be used to provide sufficient information for rendering of a current FOV. For example, omnidirectional video may be encoded using MCTS, such that each potential region covering a viewport can be independently decoded from other regions across time. In this case, for example, for a particular current viewport, a minimum set of tiles that cover a viewport may be sent to the client, decoded, and/or rendered. This process may be referred to as simple tile based partial decoding (STPD).

In ITU-T H.265, a coded video sequence (CVS) may be encapsulated (or structured) as a sequence of access units, where each access unit includes video data structured as network abstraction layer (NAL) units. In ITU-T H.265, a bitstream is described as including a sequence of NAL units forming one or more CVSs. It should be noted that ITU-T H.265 supports multi-layer extensions, including format range extensions (RExt), scalability (SHVC), multi-view (MV-HEVC), and 3-D (3D-HEVC). Multi-layer extensions enable a video presentation to include a base layer and one or more additional enhancement layers. For example, a base layer may enable a video presentation having a basic level of quality (e.g., High Definition rendering) to be presented and an enhancement layer may enable a video presentation having an enhanced level of quality (e.g., an Ultra High Definition rendering) to be presented. In ITU-T H.265, an enhancement layer may be coded by referencing a base layer. That is, for example, a picture in an enhancement layer may be coded (e.g., using inter prediction techniques) by referencing one or more pictures (including scaled versions thereof) in a base layer. In ITU-T H.265, each NAL unit may include an identifier indicating a layer of video data the NAL unit is associated with. Referring to the example illustrated in FIG. 2A, each slice of video data included in $Pic_4$ (i.e., $Slice_1$ and $Slice_2$) is illustrated as being encapsulated in a NAL unit. Further, in ITU-T H.265 each of a video sequence, a GOP, a picture, a slice, and CTU may be associated with metadata that describes video coding properties. ITU-T H.265 defines parameters sets that may be used to describe video data and/or video coding properties. In ITU-T H.265, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, ITU-T H.265 enables supplemental enhancement information (SEI) messages to be signaled. In ITU-T H.265, SEI messages assist in processes related to decoding, display or other purposes, however, SEI messages may not be required for constructing the luma or chroma samples by the decoding process. In ITU-T H.265, SEI messages may be signaled in a bitstream using non-VCL NAL units. Further, SEI messages may be conveyed by some means other than by being present in the bitstream (i.e., signaled out-of-band).

Figure 3:
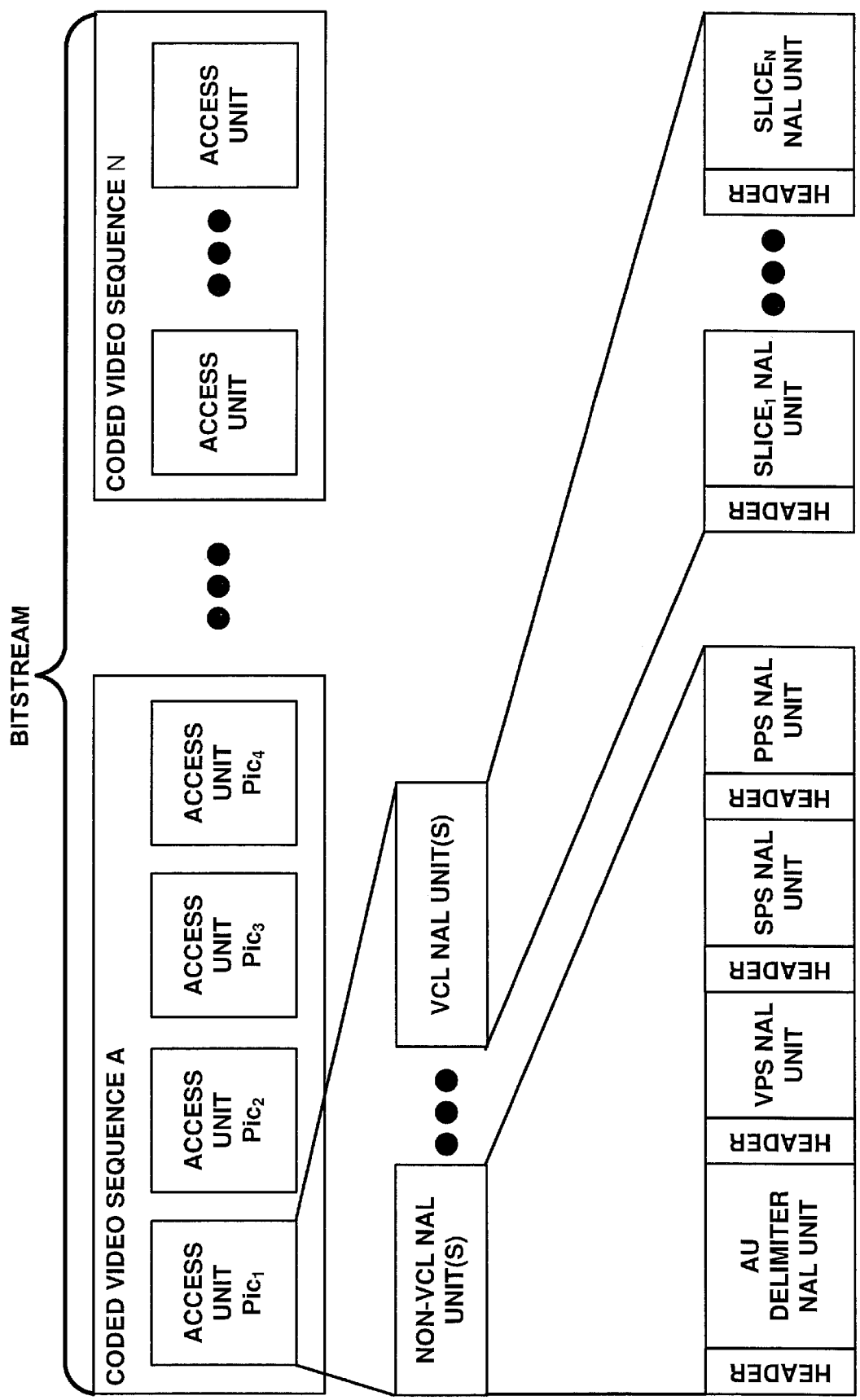
FIG. 3 is a conceptual diagram illustrating a data structure encapsulating coded video data and corresponding metadata according to one or more techniques of this this disclosure.

FIG. 3 illustrates an example of a bitstream including multiple CVSs, where a CVS is represented by NAL units included in a respective access unit. In the example, illustrated in FIG. 3, non-VCL NAL units include respective parameter set units (i.e., Video Parameter Sets (VPS), Sequence Parameter Sets (SPS), and Picture Parameter Set (PPS) units) and an access unit delimiter NAL unit. It should be noted that ITU-T H.265 defines NAL unit header semantics that specify the type of Raw Byte Sequence Payload (RBSP) data structure included in the NAL unit. As described above, omnidirectional video may be coded using MCTS. Sub-bitstream extraction may refer to a process where a device receiving a ITU-T H.265 compliant bitstream forms a new ITU-T H.265 compliant bitstream by discarding and/or modifying data in the received bitstream. For example, as described above, for a particular current viewport, a minimum set of tiles that cover a viewport may be sent to the client. Sub-bitstream extraction may be used to form a new ITU-T H.265 compliant bitstream including the minimum set of tiles. For example, referring to FIG. 2C, if a viewport includes only $Tile_2$ and $Tile_3$ and an access unit in a bitstream includes VCL NAL units for $Tile_1$ to $Tile_6$, where $Tile_1$, $Tile_2$ and $Tile_3$ are included in a first slice and $Tile_4$, $Tile_5$ and $Tile_6$ are included in a second slice, a sub-bitstream extraction process may include generating a new bitstream that only includes VCL NAL units for the slice including $Tile_2$ and $Tile_3$ (i.e., VCL NAL unit including the slice including for $Tile_4$, $Tile_5$ and $Tile_6$ is removed from the received bitstream).

As described above, the term tile structure may refer to a particular partitioning of a picture into tiles. Referring to FIG. 2B, the tile structure for $Pic_4$ includes the illustrated tiles, $Tile_1$-$Tile_6$. In some cases, it may be useful to use different tile structures for different pictures. In ITU-T H.265, a tile structure for a picture is signaled using a Picture Parameter Set. Table 1 is a portion of the syntax of the PPS specified in ITU-T H.265 including the relevant syntax elements for signaling a tile structure.

TABLE 1

| | Descriptor |
|---|---|
| pic_parameter_set_rbsp( ) { | |
|   pps_pic_parameter_set_id | ue(v) |
|   pps_seq_parameter_set_id | ue(v) |
|   ... | |
|   tiles_enabled_flag | u(1) |
|   ... | |
|   if( tiles_enabled_flag) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tiles_columns_minus1; i++ ) | |
|         colunm_width_minus1[ i ] | ue(v) |
|       for( i = 0; i < num_tiles_rows_minus1; i++ ) | |
|         row_height_minus1[ i ] | ue(v) |
|     } | |
|     loop_filter_across_tiles_enabled_flag | u(1) |
|   } | |
| ... | |

ITU-T H.265 provides the following definitions for the respective syntax elements illustrated in Table 1.
pps_pic_parameter_set_id identifies the PPS for reference by other syntax elements. The value of pps_pic_parameter_set_id shall be in the range of 0 to 63, inclusive.
pps_seq_parameter_set_id specifies the value of sps_seq_parameter_set_id for the active SPS. The value of pps_seqparameter_set_id shall be in the range of 0 to 15, inclusive.
tiles_enabled_flag equal to 1 specifies that there is more than one tile in each picture referring to the PPS. tiles_enabled_flag equal to 0 specifies that there is only one tile in each picture referring to the PPS. It is a requirement of bitstream conformance that the value of tiles_enabled_flag shall be the same for all PPSs that are activated within a CVS.
num_tile_columns_minus1 plus 1 specifies the number of tile columns partitioning the picture. num_tile_columns_minus1 shall be in the range of 0 to PicWidthInCtbsY−1, inclusive. When not present, the value of num_tile_columns_minus1 is inferred to be equal to 0.
num_tile_rows_minus1 plus 1 specifies the number of tile rows partitioning the picture. num_tile_rows_minus1 shall be in the range of 0 to PicHeightInCtbsY−1, inclusive. When not present, the value of num_tile_rows_minus1 is inferred to be equal to 0. When tiles_enabled_flag is equal to 1, num_tile_columns_minus1 and num_tile_rows_minus1 shall not be both equal to 0.
uniform_spacing_flag equal to 1 specifies that tile column boundaries and likewise tile row boundaries are distributed uniformly across the picture. uniform_spacing_flag equal to 0 specifies that tile column boundaries and likewise tile row boundaries are not distributed uniformly across the picture but signalled explicitly using the syntax elements column_width_minus1[i] and row_height_minus1[i]. When not present, the value of uniform_spacing_flag is inferred to be equal to 1.
column_width_minus1[i] plus 1 specifies the width of the i-th tile column in units of coding tree blocks.
row_height_minus1[i] plus 1 specifies the height of the i-th tile row in units of coding tree blocks.

Further, in ITU-T H.265, information regarding entry points in a bitstream are signaled using a slice segment header. Table 2 is a portion of the syntax of the slice segment header specified in ITU-T H.265 including the relevant syntax elements for signaling entry points.

TABLE 2

| | Descriptor |
|---|---|
| slice_segment_header( ) { | |
| ... | |
| slice_pic_parameter_set_id | ue(v) |
| ... | |
| if( tiles_enabled_flag \|\| | |
| entropy_coding_sync_enabled_flag ) { | |
| num_entry_point_offsets | ue(v) |
| if( num_entry_point_offsets > 0 ) { | |
| offset_len_minus1 | ue(v) |
| for( i = 0; i < num_entry_point_offsets; i++ ) | |
| entry_point_offset_minus1 [ i ] | u(v) |
| } | |
| } | |
| ... | |
| } | |

ITU-T H.265 provides the following definitions for the respective syntax elements illustrated in Table 2. slice_pic_parameter_set_id specifies the value of pps_pic_parameter_set_id for the PPS in use. The value of slice_pic_parameter_set_id shall be in the range of 0 to 63, inclusive.

num_entry_point_offsets specifies the number of entry_point_offset_minus1[i] syntax elements in the slice header. When not present, the value of num_entry_point_offsets is inferred to be equal to 0.

The value of num_entry_point_offsets is constrained as follows:

If tiles_enabled_flag is equal to 0 and entropy_coding_sync_enabled_flag is equal to 1, the value of num_entry_point_offsets shall be in the range of 0 to PicHeightInCtbsY−1, inclusive.

Otherwise, if tiles_enabled_flag is equal to 1 and entropy_coding_sync_enabled_flag is equal to 0, the value of num_entry_point_offsets shall be in the range of 0 to (num_tile_columns_minus1+1)* (num_tile_rows_minus1+1)−1, inclusive.

Otherwise, when tiles_enabled_flag is equal to 1 and entropy_coding_sync_enabled_flag is equal to 1, the value of num_entry_point_offsets shall be in the range of 0 to (num_tile_columns_minus1+1)* PicHeightInCtbsY−1, inclusive.

offset_len_minus1 plus 1 specifies the length, in bits, of the entry_point_offset_minus1 [i] syntax elements. The value of offset_len_minus1 shall be in the range of 0 to 31, inclusive.

entrypoint_offset_minus1 [i] plus 1 specifies the i-th entry point offset in bytes, and is represented by offset_len_minus1plus 1 bits. The slice segment data follows the slice segment header consists of num_entry_point_offsets+1 subsets, with subset index values ranging from 0 to num_entry_point_offsets, inclusive. The first byte of the slice segment data is considered byte 0. When present, emulation prevention bytes that appear in the slice segment data portion of the coded slice segment NAL unit are counted as part of the slice segment data for purposes of subset identification. Subset 0 consists of bytes 0 to entry_point_offset_minus1[0], inclusive, of the coded slice segment data, subset k, with k in the range of 1 to num_entry_point_offsets−1, inclusive, consists of bytes firstByte[k] to lastByte [k], inclusive, of the coded slice segment data with firstByte [k] and lastByte[k] defined as:

$$firstByte[k] = \sum_{n=1}^{k} (entry\_point\_offset\_minus1[n-1] + 1)$$

$$lastByte[k] = firstByte[k] + entry\_point\_offset\_minus1[k]$$

The last subset (with subset index equal to num_entry_point_offsets) consists of the bytes of the coded slice segment data.

When tiles_enabled_flag is equal to 1 and entropy_coding_sync_enabled_flag is equal to 0, each subset shall consist of all coded bits of all coding tree units in the slice segment that are within the same tile, and the number of subsets (i.e. the value of num_entry_point_offsets+1) shall be equal to the number of tiles that contain coding tree units that are coded slice segment.

NOTE 6—When tiles_enabled_flag is equal to 1 and entropy_coding_sync_enabled_flag is equal to 0, each slice must include either a subset of the coding tree units of one tile (in which case the syntax element entry_point_offset_minus1[i] is not present) or must include all coding tree units of an integer number of complete tiles.

When tiles_enabled_flag is equal to 0 and entropy_coding_sync_enabled_flag is equal to 1, each subset k with k in the range of 0 to num_entry_point_offsets, inclusive, shall consist of all coded bits of all coding tree units in the slice segment that include luma coding tree blocks that are in the same luma coding tree block row of the picture, and the number of subsets (i.e. the value of num_entry_point_offsets+1) shall be equal to the number of coding tree block rows of the picture that contain coding tree units that are in the coded slice segment.

NOTE 7—The last subset (i.e. subset k for k equal to num_entry_point_offsets) may or may not contain all coding tree units that include luma coding tree blocks that are in a luma coding tree block row of the picture.

When tiles_enabled_flag is equal to 1 and entropy_coding_sync_enabled_flag is equal to 1, each subset k with k in the range of 0 to num_entry_point_offsets, inclusive, shall consist of all coded bits of all coding tree units in the slice segment that include luma coding tree blocks that are in the same luma coding tree block row of a tile, and the number of subsets (i.e. the value of num_entry_point_offsets+1) shall be equal to the number of luma coding tree block rows of a tile that contain coding tree units that are in the coded slice segment.

As illustrated in the syntax and semantics above, in ITU-T H.265, tile structures are specified by a number of columns and a number rows and thus are limited in that each row and column includes the same number of tiles. Limiting tiles structures in this manner may be less than ideal. According to the techniques described herein, a video encoder may signal tile structure and tile sets in a manner that provides increased flexibility.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
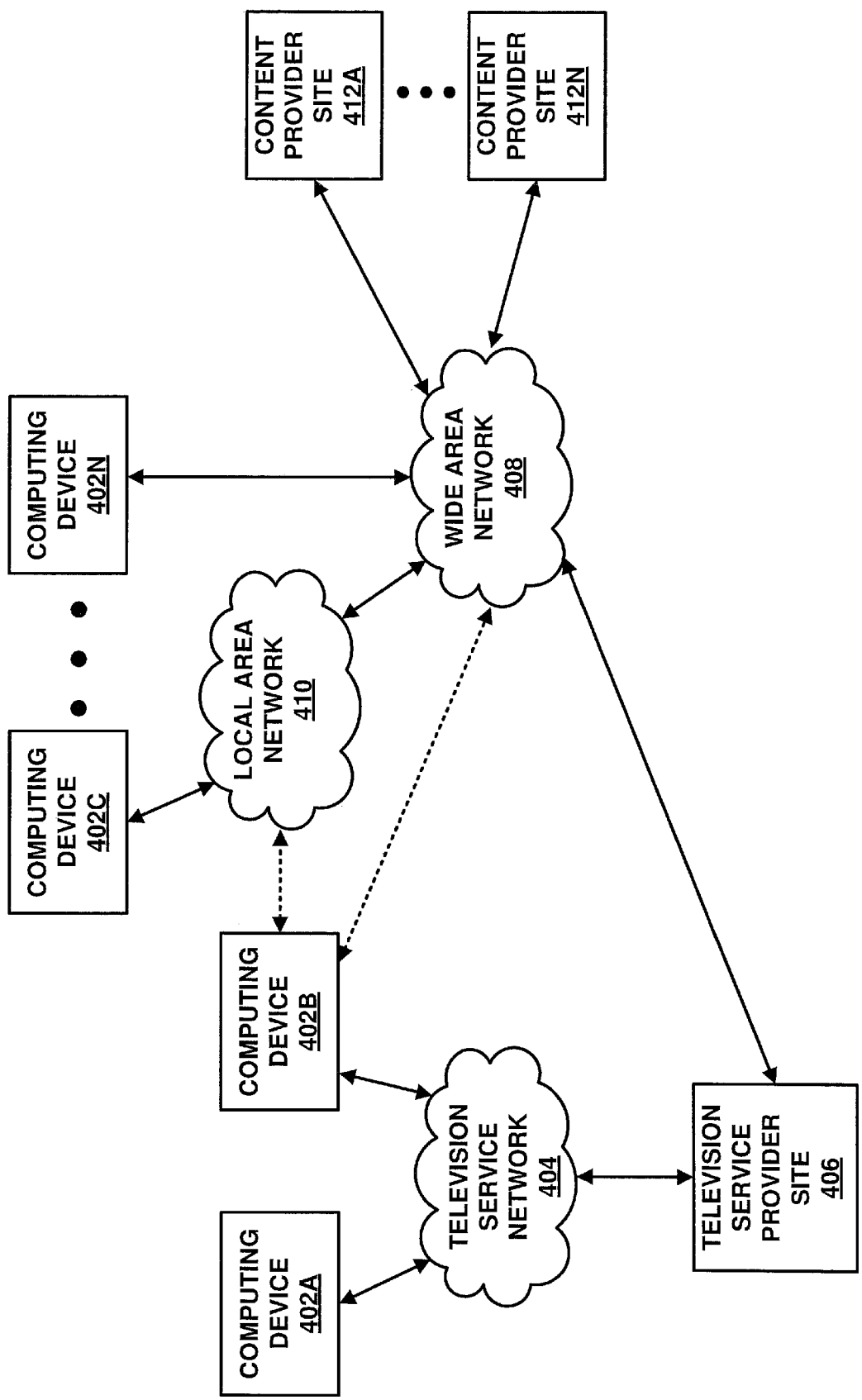
FIG. 4 is a conceptual drawing illustrating an example of components that may be included in an implementation of a system that may be configured to encode and decode video data according to one or more techniques of this this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
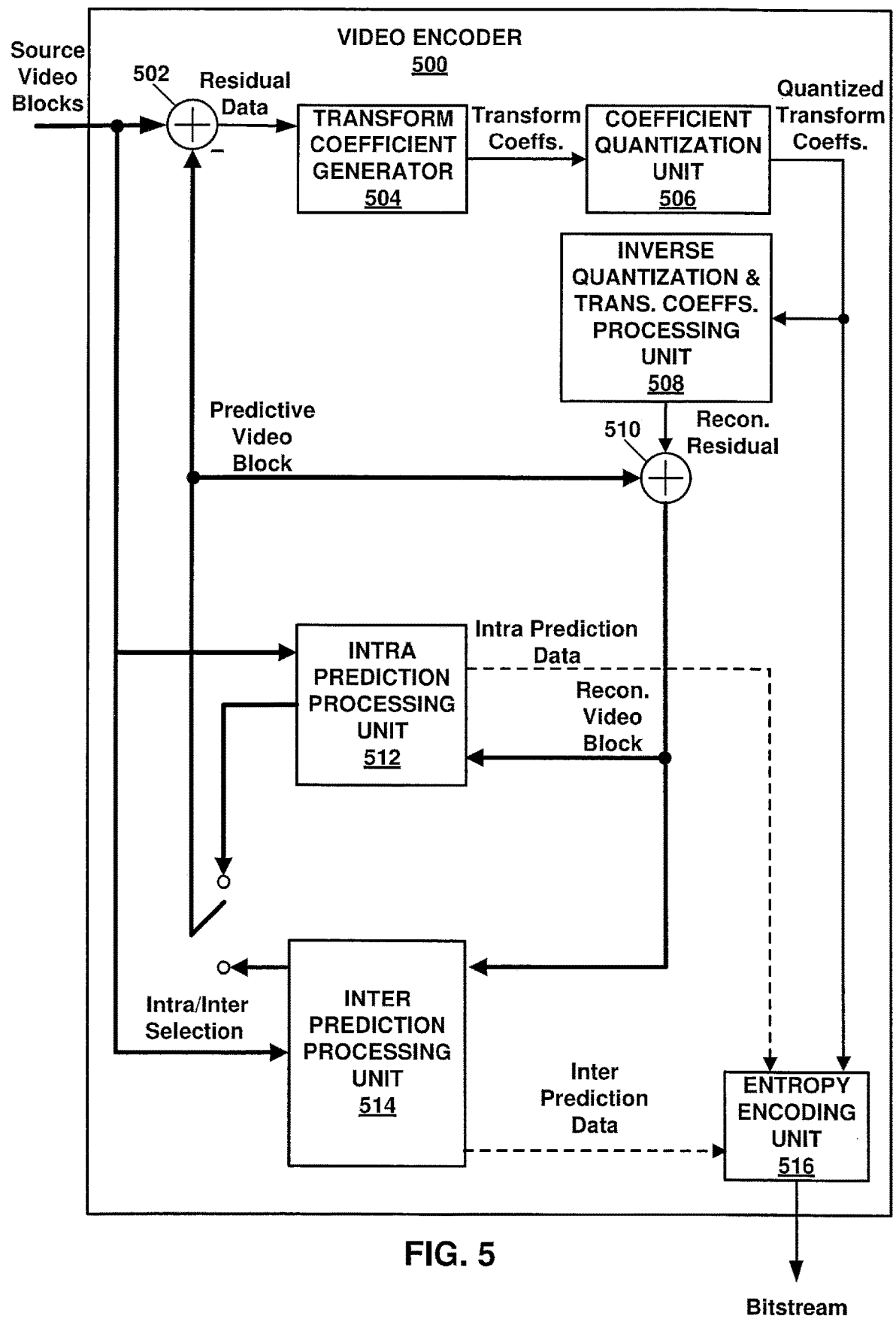
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, and entropy encoding unit 516. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 516 and transform coefficient generator 504. As described above, a transform performed on residual data may be mode dependent (e.g., a secondary transform matrix may be determined based on a predication mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 516.

Referring again to FIG. 5, entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclose. In one example, video encoder 500 may generate encoded video data including motion-constrained tile sets.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream.

As described above, in ITU-T H.265, tile structures are limited in that each row and column includes the same number of tiles. In some cases, it may be useful to have a varying number of tiles in rows and/or columns. For example, for coding of 3600 spherical video, it may be useful to have fewer tiles at the polar regions than at the equator of a sphere and as such in this case it may be useful to varying the number of tile columns from row-to-row. In one example, data encapsulator 107 may be configured to signal tile structures according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

According to the techniques described herein, data encapsulator 107 may be configured to signal one or more of the following types of information for a tile set structure:
A flag to indicate if tile sets are enabled. If not enabled then the entire picture is inferred to be one tile set.
If tile set signaling is enabled, then the following may be signaled:
Number of rows of tile sets may be signaled,
Number of columns of tile sets may be signaled,
In each tile set the following information may be signaled:
Number of tile rows in the tile set,
Number of tile columns in the tile set,
An indicator/flag to signal if the tiles are uniformly spaced along the row direction in a tile set, and/or
An indicator/flag to signal if the tiles are uniformly spaced along the column direction in a tile set, and/or
If the spacing is uniform then the following may be signaled for each tile set:
Tile width in number of CTBs in each tile row in a tile set, Tile height in number of CTBs in each tile column in a tile set,
If the spacing is not uniform then the following may be signaled for each tile in each tile set:
Number of CTBs in a row in each tile in a tile set,
Number of CTBs in a column in each tile in a tile set Table 3 illustrates an example of syntax for a parameter set that may be used to signal tile structures according to the techniques herein. In one example, the example syntax included in Table 3 may be included in a PPS. In other examples, the example syntax included in Table 3 may be included in a VPS or SPS.

TABLE 3

|  | Descriptor |
| --- | --- |
| parameter_set_rbsp( ) { |  |
| ... |  |
|   tiles_enabled_flag | u(1) |
|   tilesets_enabled_flag | u(1) |
| ... |  |
|   if( tiles_enabled_flag) { |  |
|     if( tilesets_enabled_flag ) { |  |
|       num_tile_set_columns_minus1 | ue(v) |
|       num_tile_set_rows_minus1 | ue(v) |
|     } |  |
|     for( k = 0; k < num_tile_set_rows_minus1; k++ ) |  |
|     for( l = 0; l < num_tile_set_columns_minus1; l++ ) { |  |
|       num_tile_columns_minus1[k][l] | ue(v) |
|       num_tile_rows_minus1[k][l] | ue(v) |
|       uniform_spacing_flag[k][l] | u(1) |
|       if( !uniform_spacing_flag[k][l] ) { |  |
|         for( i = 0; i <= num_tile_columns_minus1[k][l]; i++ ) |  |
|           column_width_minus1[k][l] [ i ] |  |
|         for( i = 0; i <= num_tile_rows_minus1[k][l]; i++ ) |  |
|           row_height_minus1[k][l] [ i ] |  |
|       } |  |
|       else { |  |
|         tile_width_in_ctbsy_minus1[k][l] | ue(v) |
|         tile_height_in_ctbsy_minus1[k][l] | ue(v) |
|       } |  |
|       loop_filter_across_tiles_enabled_flag[k][l] | u(1) |
|     } |  |
|   } |  |
| } |  |
| ... |  |

With respect to Table 3, it should be noted that syntax elements tiles_enabled_flag, tilesets_enabled_flag, num_tile_columns_minus1[k][i], num_tile_rows_minus1[k][l], uniform_spacing_flag[k][l], column_width_minus1[k][l][i], row_height_minus1[k][l][i], tile_width_in_ctbsy_minus1[k][l], tile_height_in_ctbsy_minus1[k][l] and loop_flter_across_tiles_enabled_flag[k][l] may be based on the following example definitions:

tiles_enabled_flag equal to 1 specifies that there is more than one tile in each picture referring to the parameter set. tiles_enabled_flag equal to 0 specifies that there is only one tile in each picture referring to the parameter set.

tilesets_enabled_flag equal to 1 specifies that there is more than one tile set in each picture referring to the parameter set. tilesets_enabled_flag equal to 0 specifies that there is only one tile set in each picture referring to the parameter set.

It is a requirement of bitstream conformance that the value of tilesets_enabled_flag shall be the same for all parameter sets that are activated within a CVS.

It is a requirement of bitstream conformance when tiles_enabled_flag is equal to 0, tilesets_enabled_flag shall be equal to 0.

num_tile_set_columns_minus1 plus 1 specifies the number of tile set columns partitioning the picture. num_tile_set_columns_minus1 shall be in the range of 0 to PicWidthInCtbsY−1, inclusive. When not present, the value of num_tile_set_columns_minus1 is inferred to be equal to 0.

num_tile_set_rows_minus1 plus 1 specifies the number of tile rows partitioning the picture. num_tile_set_rows_minus1 shall be in the range of 0 to PicHeightInCtbsY−1, inclusive. When not present, the value of num_tile_set_rows_minus1 is inferred to be equal to 0.

In one example, when tilesets_enabled_flag is equal to 1, num_tile_set_columns_minus1 and num_tile_set_rows_minus1 shall not be both equal to 0.

num_tile_columns_minus1[k][l] plus 1 specifies the number of tile columns partitioning the tile set associated with the index (k,l). num_tile_columns_minus1[k][1] shall be in the range of 0 to PicWidthInCtbsY−1, inclusive. When not present, the value of num_tile_columns_minus1[k][1] is inferred to be equal to 0.

In another example, num_tile_columns_minus1 [k][1] shall be in the range of 0 to PicWidthInCtbsY-num_tile_set_columns_minus1-1, inclusive.

num_tile_rows_minus1[k][1] plus 1 specifies the number of tile rows partitioning the tile set associated with the index (k,l). num_tile_rows_minus1[k][1] shall be in the range of 0 to PicHeightInCtbsY−1, inclusive. When not present, the value of num_tile_rows_minus1 [k][1] is inferred to be equal to 0.

In another example, num_tile_rows_minus1[k][1] shall be in the range of 0 to PicHeightInCtbsY-num_tile_set_rows_minus1-1, inclusive.

uniform_spacing_flag[k][l] equal to 1 specifies that tile column boundaries and likewise tile row boundaries are distributed uniformly across the tile set associated with the index (k,l). uniform_spacing_flag[k][l] equal to 0 specifies that tile column boundaries and likewise tile row boundaries are not distributed uniformly across the tile set associated with the index (k,l) but signaled explicitly using the syntax elements column_width_minus1 [k][1][i] and row_height_minus1 [k][1][i]. When not present, the value of uniform_spacing_flag[k][1] is inferred to be equal to 1.

column_width_minus1[k][l][i] plus 1 specifies the width of the i-th tile column in units of coding tree blocks in the tile set associated with the index (k,l).

row_height_minus1[k][1][i] plus 1 specifies the height of the i-th tile row in units of coding tree blocks in the tile set associated with the index (k,l).

tile_width_in_ctbsy_minus1[k][1] plus 1 specifies the width of each tile column in tile set associated with the index (k,l) in units of coding tree blocks.

In one example, it is a requirement of bitstream conformance that for each k in the range of 0 to num_tile_set_rows_minus1, inclusive the value of sum of tile_width_in_ctbsy_minus1[k][1] for l in the range of 0 to num_tile_set_columns_minus1 is the same value.

tile_height_in_ctbsy_minus1[k][l] plus 1 specifies the height of each tile row in tile set associated with the index (k,l) in units of coding tree blocks.

In one example, it is a requirement of bitstream conformance that for each l in the range of 0 to num_tile_set_columns_minus1, inclusive the value of sum of tile_height_in_ctbsy_minus1 [k][l] for k in the range of 0 to num_tile_set_rowss_minus1 is the same value.

loop_filter_across_tiles_enabled_flag[k][1] equal to 1 specifies that in-loop filtering operations may be performed across tile boundaries in tile set associated with the index (k,l) referring to the PPS. loop_filter_across_tiles_enabled_flag[k][l] equal to 0 specifies that in-loop filtering operations are not performed across tile boundaries in tile set associated with the index (k,l) referring to the PPS. The in-loop filtering operations include the deblocking filter and sample adaptive offset filter operations. When not present, the value of loop_filter_across_tiles_enabled_flag[k][l] is inferred to be equal to 1.

In another example, the number tile set columns per tile set row may be allowed to be different for each tile set row. Table 4 illustrates an example of syntax for a parameter set that may be used to signal tile structures according to the techniques herein. In one example, the example syntax included in Table 4 may be included in a PPS. In other examples, the example syntax included in Table 4 may be included in a VPS or SPS.

TABLE 4

| | Descriptor |
|---|---|
| parameter_set_rbsp( ) { | |
| ... | |
| tiles_enabled_flag | u(1) |
| tilesets_enabled_flag | u(1) |
| ... | |
| if( tiles_enabled_flag ) { | |
| if( tilesets_enabled_flag ) { | |
| num_tile_set_rows_minus1 | ue(v) |
| } | |
| for( k = 0; k < num_tile_set_rows_minus1; k++ ) { | |
| num_tile_set_columns_minus1[k] | ue(v) |
| for( l = 0; l < num_tile_set_columns_minus1[k]; l++ ) { | |
| num_tile_columns_minus1[k][l] | ue(v) |
| num_tile_rows_minus1[k][l] | ue(v) |
| uniform_spacing_flag[k][l] | u(1) |
| if( !uniform_spacing_flag[k][l]) { | |
| for( i = 0; i <= num_tile_columns_minus1[k][l]; i++ ) | |
| column_width_minus1[k][l] [ i ] | ue(v) |
| for( i = 0; i <= num_tile_rows_minus1[k][l]; i++ ) | |
| row_height_minus1[k][l] [ i ] | ue(v) |
| } | |
| else { | |
| tile_width_in_ctbsy_minus1[k][l] | ue(v) |
| tile_height_in_ctbsy_minus1[k][l] | ue(v) |
| } | |
| loop_filter_across_tiles_enabled_flag[k][l] | u(1) |
| } | |
| } | |
| } | |
| } | |

With respect to Table 4, it should be noted that syntax elements tiles_enabled_flag, tilesets_enabled_flag, num_tile_rows_minus1, uniform_spacing_flag[k][l], column_width_minus1[k][l][i], row_height_minus1[k][l][i], tile_width_in_ctbsy_minus1[k][l], tile_height_in_ctbsy_minus1[k][l] and loop_filter_across_tiles_enabled_flag[k][l] may be based on the definitions provided above with respect to Table 3. num_tile_set_columns_minus1[k] may be based on the following example definition:

num_tile_set_columns_minus1[k] plus 1 specifies the number of tile set columns in the tile set row k. num_tile_set_columns_minus1[k] shall be in the range of 0 to PicWidthInCtbsY−1, inclusive. When not present, the value of num_tile_set_columns_minus1 [k] is inferred to be equal to 0 for k in the range of 0 to num_tile_set_rows_minus1, inclusive.

In another example, the number tile set rows per tile set column may be allowed to be different for each tile set row. Table 5 illustrates an example of syntax for a parameter set that may be used to signal tile structures according to the techniques herein. In one example, the example syntax included in Table 5 may be included in a PPS. In other examples, the example syntax included in Table 5 may be included in a VPS or SPS.

TABLE 5

| | Descriptor |
|---|---|
| parameter_set_rbsp( ) { | |
| ... | |
| tiles_enabled_flag | u(1) |
| tilesets_enabled_flag | u(1) |
| ... | |
| if( tiles_enabled_flag ) { | |
| if( tilesets_enabled_flag ) { | |
| num_tile_set_columns_minus1 | ue(v) |
| } | |
| for( l = 0; l < num_tile_set_columns_minus1; l++ ) { | |
| num_tile_set_rows_minus1[l] | ue(v) |
| for( k = 0; k < num_tile_set_rows_minus1[l]; k++ ) { | |
| num_tile_columns_minus1[k][l] | ue(v) |
| num_tile_rows_minus1[k][l] | ue(v) |
| uniform_spacing_flag[k][l] | u(1) |
| if( !uniform_spacing_flag[k][l] ) { | |
| for( i = 0; i <= num_tile_columns_minus1[k][l]; i++ ) | |
| column_width_minus1[k][l] [ i ] | ue(v) |
| for( i = 0; i <= num_tile_rows_minus1[k][l]; i++ ) | |
| row_height_minus1[k][l] [i] | ue(v) |
| } | |
| else { | |
| tile_width_in_ctbsy_minus1[k][l] | ue(v) |
| tile_height_in_ctbsy_minus1[k][l] | ue(v) |
| } | |
| loop_filter_across_tiles_enabled_flag[k][l] | u(1) |
| } | |
| } | |
| } | |

With respect to Table 5, it should be noted that syntax elements tiles_enabled_flag, tilesets_enabled_flag, num_tile_columns_minus1, uniform_spacing_flag[k][l], column_width_minus1[k][l][i], row_height_minus1[k][l][i], tile_width_in_ctbsy_minus1[k][l], tile_height_in_ctbsy_minus1[k][i] and loop_filter_across_tiles_enabled_flag[k][l] may be based on the definitions provided above with respect to Table 3. num_tile_set_rows_minus1[k] may be based on the following example definition:

num_tile_set_rows_minus1[l] plus 1 specifies the number of tile set rows in the tile set column 1. num_tile_set_rows_minus1[l] shall be in the range of 0 to PicHeightInCtbsY−1, inclusive. When not present, the value of num_tile_set_rows_minus1[l] is inferred to be equal to 0 for l in the range of 0 to num_file_set_columns_minus1, inclusive.

With respect to this example, in a another example, the array indices [k][l] for syntax elements num_tile_columns_minus1[k][l], num_tile_rows_minus1[k][l], uniform_spacing_flag[k][l], tile_width_in_ctbsy_minus1[k][l], tile_height_in_ctbsy_minus1[k][l], and loop_filter_across_tiles_enabled_flag[k][l] may instead be signalled as indices in the order [1][k] and as such may be signaled as syntax elements num_tile_columns_minus1[l][k], num_tile_rows_minus1[l][k], uniform_spacing_flag[l][k], tile_width_in_ctbsy_minus1[l][k], tile_height_in_ctbsy_minus1[l][k], loop_filter_across_tiles_enabled_flag[l][k].

Further, with respect to this example, in another example, the array indices [k][l][i] for elements column_width_minus1[k][l][i], row_height_minus1[k][l][i] may instead be signalled as indices in the order [l][k][i] and as such may be signaled as syntax elements column_width_minus1[l][k][i], row_height_minus1[l][k][i].

Figures 6, 7:
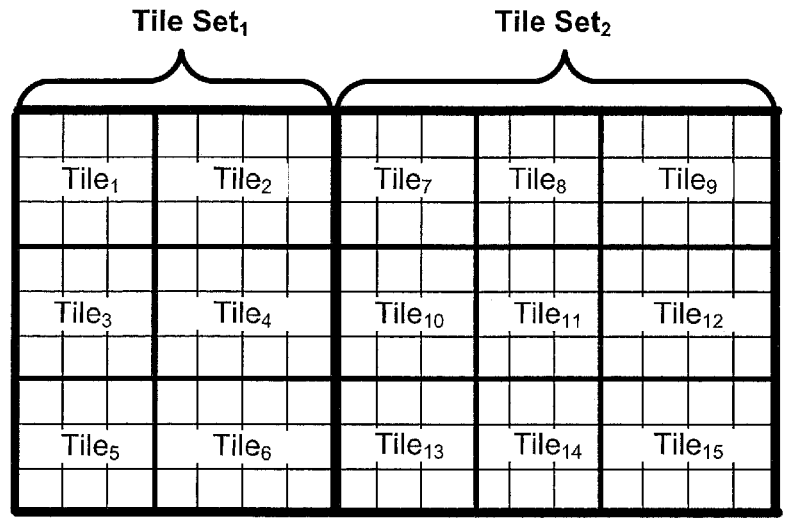
FIG. 6 is a conceptual diagram illustrating an example of ordering tiles included in tile sets according to one or more techniques of this disclosure.
FIG. 7 is a conceptual diagram illustrating an example of ordering video blocks included in tile sets according to one or more techniques of this disclosure.

In one example, according to the techniques herein, the raster order of tiles may be row-by-row within a tile set and the tile sets are raster ordered within the picture. It should be noted that this makes the coded data within a tile set contiguous, which can help splicing of the tile set bitstreams and parallel decoding of those bitstream portions. The term splicing here may refer to extraction of only portion of the overall bitstream where the extracted portion may correspond to one or more tile sets. In contrast, in ITU-T H.265, the raster ordering of tiles is row-by-row in a picture. FIG. 6 illustrates a tile raster scan where the raster order of tiles is row-by-row within a tile set and the tile sets are raster ordered within the picture. In FIG. 6, the subscript number indicated for each tile provides the order in which a tile is scanner.

In one example, according to the techniques herein, the raster ordering of coded tree blocks (CTBs/CTUs) may be row-by-row in tile raster scan within a tile set and the tile sets are raster ordered within the picture. It should be noted that this makes the coded data within a tile set contiguous which can help splicing of the tile set bitstreams and parallel decoding. The term splicing here may refer to extraction of only portion of the overall bitstream where the extracted portion may correspond to one or more tile sets. In contrast, in ITU-T H.265, the raster ordering of coded tree blocks (CTBs/CTUs) is row-by-row in tile raster scan in the picture. FIG. 7 illustrates a raster ordering of coded tree blocks (CTBs/CTUs) may row-by-row in tile raster scan within a tile set and the tile sets are raster ordered within the picture. In FIG. 7, the number indicated for each CTU provides the order in which a CTU is scanned. It should be noted that the example in FIG. 7 includes the same tile structure as illustrated in FIG. 6.

The raster ordering of coded tree blocks (CTBs/CTUs), tiles, and tile sets may be based on the following description:

This sub-clause specifies the order of VCL NAL units and association to coded pictures. Each VCL NAL unit is part of a coded picture.

The order of the VCL NAL units within a coded picture is constrained as follows:

The first VCL NAL unit of the coded picture shall have first_slice_segment_in_pic_flag equal to 1.

Let sliceSegAddrA and sliceSegAddrB be the slice_segment_address values of any two coded slice segment NAL units A and B within the same coded picture. When either of the following conditions is true, coded slice segment NAL unit A shall precede the coded slice segment NAL unit B:

- TileId[ CtbAddrRsToTs[ sliceSegAddrA ] ] is less than TileId[ CtbAddrRsToTs[ sliceSegAddrB ] ].
- TileId[ CtbAddrRsToTs[ sliceSegAddrA ] ] is equal to TileId[ CtbAddrRsToTs[ sliceSegAddrB ] ] and CtbAddrRsToTs[ sliceSegAddrA ] is less than CtbAddrRsToTs[ sliceSegAddrB ].

The list colWidth[k][l][i] for k ranging from 0 to num_tile_set_rows_minus1, inclusive, and l ranging from 0 to num_tile_set_columns_minus1, inclusive, and for i ranging from 0 to num_tile_columns_minus1, inclusive, specifying the width of the i-th tile column of tile set associated with the index (k,l) in units of CTBs, is derived as follows:

```
for(k=0;k<=num_tile_set_rows_minus1;k++){
  for(l=0;l<=num_tile_set_rows_minus1;l++){
   if( uniform_spacing_flag[ k ] [ l ]  )
    for( i = 0; i  <=  num_tile_columns_minus1[ k ] [ l ]; i++ )
     colWidth[ k ] [ l ] [ i ] = tile_width_in_ctbsy[ k ] [ l ] -
   else {
    for( i = 0; i <= num_tile_columns_minus1[ k ] [ l ]; i++ ) {
     colWidth[ k ] [ l ] [ i ] = column_width_minus1[ k ] [ l ]
     [ i ] + 1
    }
   }
  }
}
```

The list rowHeight[k][l][j] for k ranging from 0 to num_tile_set_rows_minus1, inclusive, and l ranging from 0 to num_tile_set_columns_minus1, inclusive, and for j ranging from 0 to num_tile_rows_minus1, inclusive, specifying the height of the j-th tile row of tile set associated with the index (k,l) in units of CTBs, is derived as follows:

```
for(k=0;k<=num_tile_set_rows_minus1;k++){
  for(l=0;l<=num_tile_set_columns_minus1;l++){
   if( uniform_spacing_flag[ k ] [ l ] )
    for( j = 0; j  <=  num_tile_rows_minus1[ k ] [ l ]; j++ )
     rowHeight[ k ] [ l ] [ j ] = tile_height_in_ctbsy[ k ] [ l ]
   else {
    for( j = 0; j <= num_tile_rows_minus1[ k ] [ l ]; j++ ) {
     rowHeight[ k ] [ l ] [ j ] = row_height_minus1[ k ] [ l ]
     [ j ] + 1
    }
   }
  }
}
```

The variable NumTileSets indicating number of tile sets is derived as follows:

NumTileSets=(num_tile_set_rows_minus11)*(num_tile_set_columns_minus1+1)

The arrays of pwctbsy[k][l], phctbsy[k][l], psizectbsy[k][l] for k ranging from 0 to num_tile_set_rows_minus1, inclusive, and l ranging from 0 to num_tile_set_columns_minus1, inclusive, respectively specifying the picture width in luma CTBs, picture height in luma CTBs, and picture size in luma CTBs of the tile set associated with the index (k,l), and the array ctbAddrRSOffset[k][l] for k ranging from 0 to num_tile_set_rows_minus1, inclusive, and l ranging from 0 to num_tile_set_columns_minus1, inclusive, specifying the cumulative count of CTBs up to the tile set associated with the index (k,l) is derived as follows:

```
ctbAddrRSOffsetCalc=0; picSizeInCtbsY=0;
 for(k=0;k<=num_tile_set_rows_minus1;k++){
  for(l=0;l<=num_tile_set_columns_minus1;l++){
   for(pwctbsy[ k ] [ l ] = 0, i = 0; i <=
   num_tile_columns_minus1[k][l]; i++ ) {
    pwctbsy[ k ] [ l ] += (colWidth [ k ] [ l ] [ i ] )
  }
```

-continued

```
for(phctbsy[ k ] [ l ]   = 0, i = 0; i <= num_tile_rows_minus1[k][l];
i++ ) {
    phctbsy[ k ] [ l ]   += (rowHeight [ k ] [ l ] [ i ] );
  }
  psizectbsy[ k ] [ l ] =pwctbsy[ k ] [ l ] *phctbsy[ k ] [ l ]
  picSizeInCtbsY+=  psizectbsy[ k ] [ l ]
  ctbAddrRSOffset[ k ] [ l ] =ctbAddrRSOffsetCalc
  ctbAddrRSOffsetCalc+=psizectbsy[ k ] [ l ]
    }
}
```

A j-th tile set is associated with indices (k,l) as follows. A j-th tile set may be referred to as a tile set with index j.

Given the tile set index j and number of tile set columns in the picture k and 1 are derived as follows:

$k=j/(\text{num\_tile\_set\_columns\_minus1}+1)$ $l=j\%(\text{num\_tile\_set\_columns\_minus1}+1)$ Given the indices k and 1 and number of tile set columns in the picture, the tile set index j is derived as follows:

$j=k*((\text{num\_tile\_set\_columns\_minus1}+1)+1$

The list colBd[k][l][i] for k ranging from 0 to num_tile_set_rows_minus1, inclusive, and 1 ranging from 0 to num_tile_set_columns_minus1, inclusive, and for i ranging from 0 to num_tile_columns_minus1+1, inclusive, specifying the location of the i-th tile column boundary of tile set associated with the index (k,l) in units of coding tree blocks, is derived as follows:

```
for(k=0;k<=num_tile_set_rows_minus1;k++){
  for(l=0;l<=num_tile_set_columns_minus1;l++){
    for( colBd[ k ] [ l ] [ 0 ] = 0, i = 0; i   <=
num_tile_columns_minus1[ k ] [ l ]; i++ )
      colBd[ k ] [ l ] [ i + 1 ] = colBd[ k ] [ l ] [ i ] + colWidth[ k ]
      [ l ] [ i ]
  }
}
```

The list rowBd[j] for k ranging from 0 to num_tile_set_rows_minus1, inclusive, and 1 ranging from 0 to num_tile_set_columns_minus1, inclusive, and for j ranging from 0 to num_tile_rows_minus1+1, inclusive, specifying the location of the j-th tile row boundary of tile set associated with the index (k,l) in units of coding tree blocks, is derived as follows:

```
for(k=0;k<=num_tile_set_rows_minus1;k++){
  for(l=0;l<=num_tile_set_columns_minus1;l++){
    for( rowBd[ k ] [ l ] [ 0 ] = 0, j = 0; j   <=
num_tile_rows_minus1[ k ] [ l ]; j++ )
      rowBd[ k ] [ l ] [ j + 1 ] = rowBd[ k ] [ l ] [ j ] + rowHeight[ k ]
      [ l ] [ j ]
  }
}
```

The list CtbAddrRsToTs[ctbAddrRs] for ctbAddrRs ranging from 0 to PicSizeInCtbsY−1, inclusive, specifying the conversion from a CTB address in CTB raster scan of a picture to a CTB address in tile set and tile scan, is derived as follows:

```
for(k=0;k<=num_tile_set_rows_minus1;k++){
  for(l=0;l<=num_tile_set_columns_minus1;l++){
    for( ctbAddrRs = 0; ctbAddrRs < psizectbsy[ k ] [ l ]; ctbAddrRs++ ) {
      tbX = ctbAddrRs % pwctbsy [ k ] [ l ]
      tbY = ctbAddrRs / pwctbsy [ k ] [ l ]
      for( i = 0; i   <=   num_tile_columns_minus1[ k ] [ l ]; i++ )
        if( tbX  >=   colBd[ k] [ l ] [ i ] )
          tileX = i
      for( j = 0; j   <=   num_tile_rows_minus1[ k ] [ l ]; j++ )
        if( tbY  >=   rowBd[ k ] [ l ] [ j ] )
          tileY = j
      CtbAddrRsToTs[ ctbAddrRs + ctbAddrRSOffset[ k ] [ l ] ] = 0
      for( i = 0; i < tileX; i++ )
        CtbAddrRsToTs[ ctbAddrRs + ctbAddrRSOffset[ k ] [ l ] ] +=
rowHeight[ k ] [ l] [ tileY ] * colWidth[ i ]
      for( j = 0; j < tileY; j++ )
        CtbAddrRsToTs[ ctbAddrRs + ctbAddrRSOffset[ k ] [ l ]] +=
pwctbsy [ k ] [ l] * rowHeight[ k ] [ l ] [ j ]
      CtbAddrRsToTs[ ctbAddrRs + ctbAddrRSOffset[ k ] [ l ]] +=
( tbY − rowBd[ k ] [ l ] [ tileY ] ) * colWidth[ k ] [ l ] [ tileX ] +
tbX − colBd[ k ] [ l ] [ tileX ]
      CtbAddrRsToTs[ ctbAddrRs + ctbAddrRSOffset[ k ] [ l ] ] +=
ctbAddrRSOffset[ k ] [ l ]
    }
  }
}
```

The list CtbAddrTsToRs[ctbAddrTs] for ctbAddrTs ranging from 0 to PicSizeInCtbsY−1, inclusive, specifying the conversion from a CTB address in tile scan to a CTB address in CTB raster scan of a picture, is derived as follows:

```
for( ctbAddrRs = 0; ctbAddrRs < PicSizeInCtbsY; ctbAddrRs++ )
  CtbAddrTsToRs[ CtbAddrRsToTs[ ctbAddrRs ] ] = ctbAddrRs
```

The list TileId[ctbAddrTs] for ctbAddrTs ranging from 0 to PicSizeInCtbsY−1, inclusive, specifying the conversion from a CTB address in tile scan to a tile ID, is derived as follows:

```
for(k=0;k<=num_tile_set_rows_minus1;k++){
  for(l=0;l<=num_tile_set_columns_minus1;l++){
    for( j = 0, tileIdx = 0; j   <=   num_tile_rows_minus1[ k ] [ l ]; j++ )
      for( i = 0; i   <=   num_tile_columns_minus1[ k ] [ l ]; i++,
tileIdx++ )
        for( y = rowBd[ k ] [ l ] [ j ]; y < rowBd[ k ] [ l ] [ j + 1 ];
y++ )
          for( x = colBd[ k ] [ l ] [ i ]; x < colBd[ k ] [ l ] [ i + 1 ];
x++ )
            TileId[ CtbAddrRsToTs[ y * PicWidthInCtbsY+ x +
ctbAddrRSOffset[ k ] [ l ] ] ] = tileIdx
  }
}
```

Figure 8:
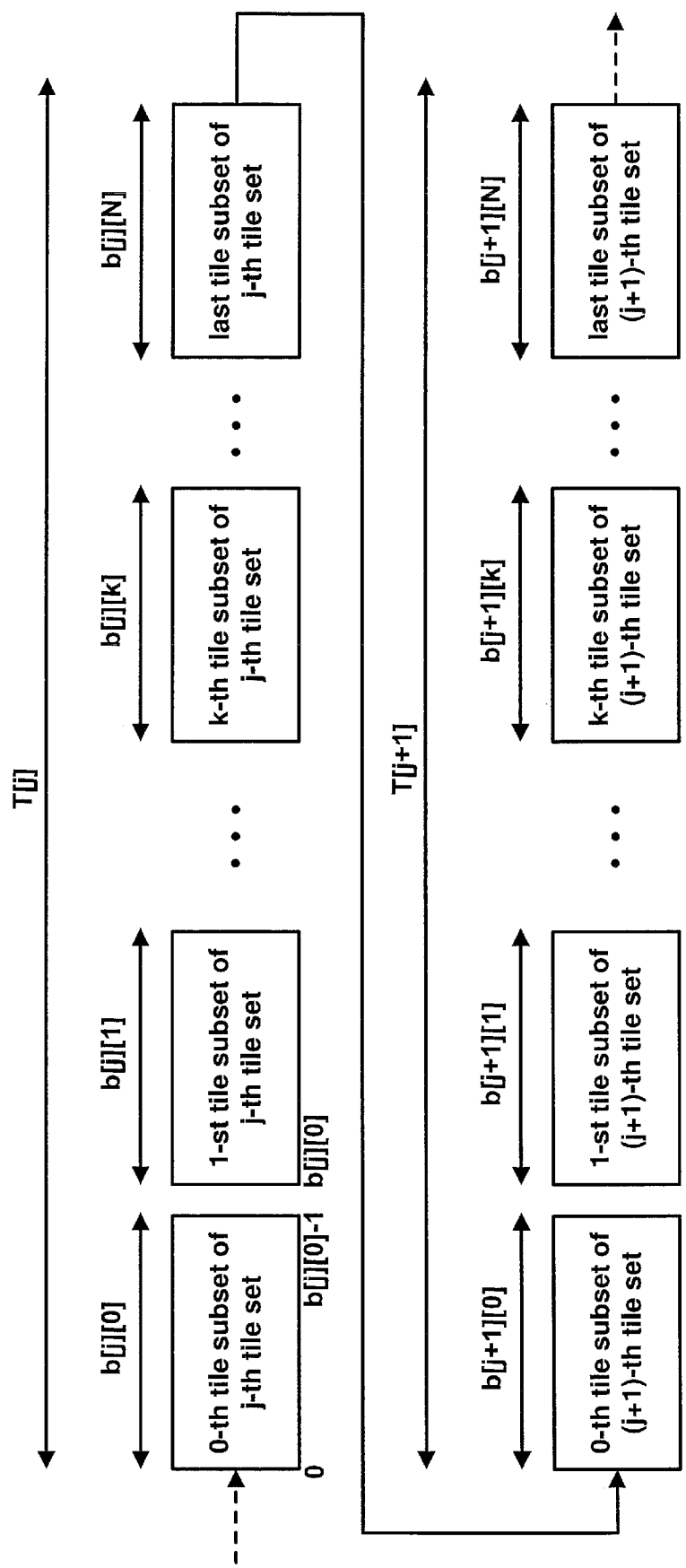
FIG. 8 is a conceptual diagram illustrating an example of signaling byte range information according to one or more techniques of this disclosure.

In one example according to the techniques herein, data encapsulator 107 may be configured to signal information such that each tile set and tiles within the tile set may be independently processed. In one example, the byte range information of each tile set is signaled. In one example, this may be signaled as a list of tile set entry point offsets. FIG. 8 illustrates and example where each of T[j] and T[j+1] respectively indicates the sizes of the bytes belonging to the j-th and (j+1)-th tile set respectively. Additionally, within each tile set byte range information is signaled for each tile in the tile set. In one example, this may be signaled as a list of tile entry point offsets. In the FIG. 8, b[j][k] and b[j+1][k] respectively indicates the sizes of the bytes belonging to the k-th tile subset of the j-th tile set and k-th tile subset of (j+1)-th tile set respectively. Table 6 illustrates an example slice segment header that may be used to signal information such that each tile set and tiles within the tile set may be independently processed according to the techniques herein.

TABLE 6

| | Descriptor |
|---|---|
| slice_segment_header( ) { | |
| ... | |
|   if( tiles_enabled_flag \|\| | |
|   entropy_coding_sync_enabled_flag ) { | |
|     if( tilesets_enabled_flag ) { | |
|       tileset_offset_len_minus1 | ue(v) |
|       for( j = 0; j < NumTileSets−1; j++ ) | |
|         tileset_entry_point_offset_minus1[ j ] | u(v) |
|     } | |
|     for( j = 0; j < NumTileSets; j++ ){ | |
|       num_entry_point_offsets[ j ] | ue(v) |
|       if( num_entry_point_offsets[ j ] > 0 ) { | |
|         offset_len_minus1[ j ] | ue(v) |
|         for( i = 0; i < num_entry_point_offsets[ j ]; i++ ) | |
|           entry_point_offset_minus1[ j ][ i ] | u(v) |
|       } | |
|     } | |
|   } | |
| ... | |
| } | |

With respect to Table 6, it should be noted that syntax elements tileset_offset_len_minus1, tileset_entry_point_offset_minus1, num_entry_point_offsets, offset_len_minus1, and entry_point_offset_minus1, may be based on the following definitions:

tileset_offset_len_minus1 plus 1 specifies the length, in bits, of the tileset_entry_point_offset_minus1[i] syntax elements. The value of tileset_offset_len_minus1 shall be in the range of 0 to 31, inclusive.

tileset_entry_point_offset_minus1[i] plus 1 specifies the i-th entry point offset in bytes for the i-th tile set, and is represented by tileset_offset_len_minus1 plus 1 bits. The slice segment data that follows the slice segment header consists of NumTileSets subsets, with tile set index values ranging from 0 to NumTileSets−1, inclusive. The first byte of the slice segment data is considered byte 0. When present, emulation prevention bytes that appear in the slice segment data portion of the coded slice segment NAL unit are counted as part of the slice segment data for purposes of subset identification. Tile set 0 consists of bytes 0 to tileset_entry_point_offset_minus1[0], inclusive, of the coded slice segment data, tile set k, with k in the range of 1 to NumTileSets−1, inclusive, consists of bytes firstTilesetByte[k] to lastTileSetByte[k], inclusive, of the coded slice segment data with firstTileSetByte[k] and lastTileSetByte[k] defined as:

$$firstTileSetByte[k] = \sum_{n=1}^{k} \text{tileset\_entry\_point\_offset\_minus1}[n-1] + 1$$

$$lastTileSetByte[k] =$$
$$firstTileSetByte[k] + \text{tileset\_entry\_point\_offset\_minus1}[k]$$

The last subset (with subset index equal to NumTileSets) consists of the remaining bytes of the coded slice segment data, i.e. bytes from lastTileSetByte[NumTileSets−1]+1 to the end of the slice segment data.

Each subset shall consist of all coded bits of all coding tree units in the slice segment that are within the same tile set.

num_entry_point_offsets[j] specifies the number of entry_point_offset_minus1[j][i] syntax elements for j-th tile set in the slice header. When not present, the value of num_entry_point_offsets[j] is inferred to be equal to 0.

The variables k and 1 are derived as follows:

$$k=j/(\text{num\_tile\_set\_columns\_minus1}+1)$$

$$l=j\%(\text{num\_tile\_set\_columns\_minus1}+1)$$

The value of num_entry_point_offsets[j] is constrained as follows:

If tiles_enabled_flag is equal to 0 and entropy_coding_sync_enabled_flag is equal to 1, the value of num_entry_point_offsets[j] shall be in the range of 0 to PicHeightInCtbsY−1, inclusive.

Otherwise, if tiles_enabled_flag is equal to 1 and entropy_coding_sync_enabled_flag is equal to 0, the value of num_entrypoint_offsets[j] shall be in the range of 0 to (num_tile_columns_minus1[k][l]+1)* (num_tile_rows_minus1[k][l]+1)−1, inclusive, Otherwise, when tiles_enabled_flag is equal to 1 and entropy_coding_sync_enabled_flag is equal to 1, the value of num_entry_point_offsets shall be in the range of 0 to (num_tile_columns_minus1[k][l]−1, ~~Pic HeightIn CtbsY~~ inclusive.

offset_len_minus1[j] plus 1 specifies the length, in bits, of the entry_point_offset_minus1[j][i] syntax elements. The value of offset_len_minus1[j] shall be in the range of 0 to 31, inclusive.

entry_point_offset_minus1[j][i] plus 1 specifies the i-th entry point offset in bytes in the j-th tile set, and is represented by offset_len_minus1[j] plus 1 bits. The data in the slice segment data that corresponds to the j-th tile set follows the tileset_entry_point_offset_minus1[j] position and consists of num_entry_point_offsets[j]+1 subsets, with subset index values for j-th tile set ranging from 0 to num_entry_point_offsets[j], inclusive. The first byte of the slice segment data is considered byte 0. When present, emulation prevention bytes that appear in the slice segment data portion of the coded slice segment NAL unit are counted as part of the slice segment data for purposes of subset identification. Subset 0 for j-th tile set consists of bytes tileset_entry_point_offset_minus1[j]+0 to tileset_entry_point_offset_minus1[j]+entry_point_offset_minus1[0], inclusive, of the coded slice segment data, subset k, with k in the range of 1 to num_entry_point_offsets[j]−1, inclusive, consists of bytes firstByte[j][k] to lastByte[j][k], inclusive, of the coded slice segment data with firstByte[j][k] and lastByte[j][k] defined as:

$$firstByte[j][k] = \text{tileset\_entry\_point\_offset}[j] +$$
$$\sum_{n=1}^{k} \text{entry\_point\_offset\_minus1}[j][n-1] + 1$$

$$lastByte[j][k] = firstByte[k] + \text{entry\_point\_offset\_minus1}[j][k]$$

The last subset (with subset index equal to [j][num_entry_point_offsets[j]]) consists of the bytes lastByte[j]

[num_entry_point_offsets[j]−1]+1 to tileset_entry_point_offset_minus1[j+]−1, inclusive of the coded slice segment data for j in the range of 0 to NumTileSets−1. The last subset (with subset index equal to [NumTileSets−1][num_entry_point_offsets[NumTileSets]]) of the last tile set consists of the bytes of the coded slice segment data, i.e. bytes from lastByte[NumTileSets-1][num_entry_point_offsets[j]−1]+1 till the end of the slice segment data.

When tiles_enabled_flag is equal to 1 and entropy_coding_sync_enabled_flag is equal to 0, each subset shall consist of all coded bits of all coding tree units in the slice segment that are within the same tile, and the number of subsets (i.e. the value of num_entry_point_offsets[j]+1) shall be equal to the number of tiles that contain coding tree units that are in the j-th tile set in coded slice segment.

> NOTE: When tiles_enabled_flag is equal to 1 and entropy_coding_sync_enabled_flag is equal to 0, each slice must include either a subset of the coding tree units of one tile (in which case the syntax element entry_point_offset_minus1[j][i] is not present) or must include all coding tree units of an integer number of complete tiles.

When tiles_enabled_flag is equal to 0 and entropy_coding_sync_enabled_flag is equal to 1, each subset k with k in the range of 0 to num_entry_point_offsets[j], inclusive, shall consist of all coded bits of all coding tree units in the slice segment that include luma coding tree blocks that are in the same luma coding tree block row of the picture, and the number of subsets (i.e. the value of num_entry_point_offsets[j]+1) shall be equal to the number of coding tree block rows of the picture that contain coding tree units that are in the coded slice segment.

> NOTE: The last subset (i.e. subset k for k equal to num_entry_point_offsets[j]) may or may not contain all coding tree units that include luma coding tree blocks that are in a luma coding tree block row of the picture.

When tiles_enabled_flag is equal to 1 and entropy_coding_sync_enabled_flag is equal to 1, each subset k for the j-th tile set with k in the range of 0 to num_entry_point_offsets[j], inclusive, shall consist of all coded bits of all coding tree units in the slice segment that include luma coding tree blocks that are in the same luma coding tree block row of a tile in the j-th tile set, and the number of subsets (i.e. the value of num_entry_point_offsets[j]+1) shall be equal to the number of luma coding tree block rows of a tile that contain coding tree units that are in the j-th tile set in the coded slice segment.

In one example the offset length information used for fixed length coding of tile byte-range signaling (tile offset signaling) in each tile set may be signaled only once and will apply to all the tile sets. An example syntax for this is shown in Table 7.

TABLE 7

| | Descriptor |
|---|---|
| slice_segment_header( ) { | |
| ... | |
| } | |
| if( tiles_enabled_flag \|\| entropy_coding_sync_enabled_flag ) { | |
|   if( tilesets_enabled_flag ) { | |
|     tileset_offset_len_minus1 | ue(v) |
|     for( j = 0; j < NumTileSets−1; j++ ) | |
|       tileset_entry_joint_offset_minus1[ j ] | u(v) |
|   } | |
|   all_tile_offset_len_minus1 | ue(v) |
|   for( j = 0; j < NumTileSets; j++ ){ | |
|     num_entry_joint_offsets[ j ] | ue(v) |
|     if( num_entry_point_offsets[ j ] > 0 ) { | |
|       for( i = 0; i < num_entry_joint_offsets[ j ]; i++ ) | |
|         entry_joint_offset_minus1[ j ][ i ] | u(v) |
|     } | |
|   } | |
| } | |
| ... | |

With respect to Table 7, it should be noted that syntax elements tileset_offset_len_minus1, tileset_entry_point_offset_minus1, num_entry_point_offsets, and offset_len_minus1, may be based on the definitions provided above with respect to Table 6 and all_tile_offset_len_minus1 and entry_point_offset_minus1 may be based on the following definitions:

all_tile_offset_len_minus1 plus 1 specifies the length, in bits, of the entry_point_offset_minus1[j][i] syntax elements for each value of j in the range of 0 to NumTileSets−1, inclusive. The value of all_tile_offset_len_minus1 shall be in the range of 0 to 31, inclusive.

entry_point_offset_minus1 [j][i] plus 1 specifies the i-th entry point offset in bytes in the j-th tile set, and is represented by all_tile_offset_len_minus1 plus 1 bits.

In one example, the tile byte range information may be signaled in a single for loop for all the tiles in the picture. In this case a single syntax element may be signaled for number of tile byte ranges signaled. Then the other signaled syntax elements can be used to determine how many of these tile byte range elements belong to each tile set.

In one example, the syntax elements for number of tile set columns (unm_tile_set_columns_minus1) and number of tile set rows (num_tile_set_rows_minus1) in the picture may be fixed length coded using u(v) coding instead of ue(v) coding. In one example, an additional syntax element may be signaled to indicate the length of bits used for fixed length coding of these elements in this case. In another example, the length of bits used for coding of these syntax elements may not be signaled but instead inferred to be equal to:

Ceil(Log 2(PicSizeInCtbsY)) bits, where PicSizeInCtbsY indicates the number of CTBs in the picture.

In one example, the syntax elements for tile width in the number of CTBs for a tile set associated with index (k,l) (tile_width_in_ctbsy_minus1[k][l]) and tile height in the number of CTBs for a tile set associated with index (k,l) (tile_height_in_ctbsy_minus1[k][l]) in the picture may be fixed length coded using u(v) coding instead of ue(v) coding. In one example, an additional syntax element may be signaled to indicate the length of bits used for fixed length coding of these elements in this case. In another example, the length of bits used for coding of these syntax elements may not be signaled but instead inferred to be equal to:

Ceil(Log 2(PicSizeInCtbsY)) bits, where PicSizeInCtbsY indicates the number of CTBs in the picture.

In one example, the syntax elements for column width in CTBs and/or row height in CTBs may not be signaled for the last tile set for the last tile set column (num_tile_columns_minus11[num_tile_set_rows_minus1][num_tile_set_columns_minus1]) and/or last tile set row (num_tile_rows_minus1 [num_tile_set_rows_minus1][num_tile_set_columns_minus1]) in the picture. In this case, their value may be inferred from the picture height in CTBs and/or picture width in CTBs.

Table 8 illustrates an example of syntax for a parameter set that may be used to signal tile structures according to the techniques herein. In one example, the example syntax included in Table 8 may be included in a PPS. In other examples, the example syntax included in Table 8 may be included in a VPS or SPS.

TABLE 8

| | Descriptor |
|---|---|
| parameter_set_rbsp( ) { | |
| ... | |
|   tiles_enabled_flag | u(1) |
|   entropy_coding_sync_enabled_flag | u(1) |
|   if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tile_columns_minus1; i++ ) | |
|         column_width_minus1[ i ] | ue(v) |
|       for( i = 0; i < num_tile_rows_mius1; i++ ) | |
|         row_height_minus1[ i ] | ue(v) |
|     } | |
|     loop_filter_across_tiles_enabled_flag | u(1) |
|     tilesets_enabled_flag | u(1) |
|     if( tilesets_enabled_flag ) { | |
|       num_tile_set_rows_minus1 | ue(v) |
|       num_tile_set_columns_minus1 | ue(v) |
|       for( k = 0; k <= num_tile_set_rows_minus1; k++ ) | |
|         num_tile_rows_in_tileset_minus1[k] | ue(v) |
|       for( l = 0; l <= num_tile_set_columns_minus1; l++ ) | |
|         num_tile_columns_in_tileset_minus1[l] | ue(v) |
|     } | |
|   } | |
| ... | |
|   rbsp_trailing_bits( ) | |
| } | |

With respect to Table 8, the respective syntax elements may be based on the following definitions:

num_tile_columns_minus1 plus 1 specifies the number of tile columns partitioning the picture. num_tile_columns_minus1 shall be in the range of 0 to PicWidthInCtbsY−1, inclusive. When not present, the value of num_tile_columns_minus1 is inferred to be equal to 0.

num_tile_rows_minus1 plus 1 specifies the number of tile rows partitioning the picture. num_tile_rows_minus1 shall be in the range of 0 to PicHeightInCtbsY−1, inclusive. When not present, the value of num_tile_rows_minus1 is inferred to be equal to 0.

When tiles_enabled_flag is equal to 1, num_tile_columns_minus1 and num_tile_rows_minus1 shall not be both equal to 0.

uniform_spacing_flag equal to 1 specifies that tile column boundaries and likewise tile row boundaries are distributed uniformly across the picture. uniform_spacing_flag equal to 0 specifies that tile column boundaries and likewise tile row boundaries are not distributed uniformly across the picture but signalled explicitly using the syntax elements column_width_minus1[i] and row_height_minus1[i]. When not present, the value of uniform_spacing_flag is inferred to be equal to 1.

column_width_minus1[i] plus 1 specifies the width of the i-th tile column in units of coding tree blocks.

row_height_minus1[i] plus 1 specifies the height of the i-th tile row in units of coding tree blocks.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter and sample adaptive offset filter operations. When not present, the value of loop_filter_across_tiles_enabled_flag is inferred to be equal to 1.

tilesets_enabled_flag equal to 1 specifies that there is more than one tile set in each picture referring to the PPS. tilesets_enabled_flag equal to 0 specifies that there is only one tile set in each picture referring to the PPS.

In another example, tilesets_enabled_flag equal to 1 indicates that syntax elements num_tile_set_rows_minus1, num_tile_sets_columns_minus1, num_tile_rows_in_tileset_minus1[k], num_tile_columns_in_tileset_minus1[l] are present. tilesets_enabled_flag equal to 0 indicates that syntax elements num_tile_set_rows_minus1, num_tile_sets_columns_minus1, num_tile_rows_in_tileset_minus1[k], num_tile_columns_in_tileset_minus1[l] are not present.

In one example, when tilesets_enabled_flag is equal to 0 num_tile_set_rows_minus1 is inferred to be equal to 0 and num_tile_sets_columns_minus1 is inferred to be equal to 0 (i.e. the entire picture is a single tile set).

In one example, it is a requirement of bitstream conformance that the value of tilesets_enabled_flag shall be the same for all PPSs that are activated within a CVS. When tiles_enabled_flag is equal to 0, tilesets_enabled_flag is inferred to be equal to 0.

In another example, it is a requirement of bitstream conformance that when tiles_enabled_flag is equal to 0, tilesets_enabled_flag shall be equal to 0.

num_tile_set_rows_minus1 plus 1 specifies the number of tile set rows partitioning the picture. num_tile_set_rows_minus1 shall be in the range of 0 to num_tile_rows_minus1, inclusive. In another example num_tile_set_rows_minus1 shall be in the range of 0 to PicHeightInCtbsY−1, inclusive. When not present, the value of num_tile_set_rows_minus1 is inferred to be equal to 0.

num_tile_set_columns_minus1 plus 1 specifies the number of tile set columns partitioning the picture. num_tile_set_columns_minus1 shall be in the range of 0 to num_tile_columns_minus1, inclusive. In another example num_tile_set_columns_minus1 shall be in the range of 0 to PicWidthInCtbsY−1, inclusive. When not present, the value of num_tile_set_columns_minus1 is inferred to be equal to 0.

In one example when tilesets_enabled_flag is equal to 1, num_tile_set_columns_minus1 and num_tile_set_rows_minus1 shall not be both equal to 0.

num_tile_rows_in_tileset_minus1[k] plus 1 specifies the number of tile rows in the tile set associated with the index (k,l) for each k in the range of 0 to num_tile_set_rows_minus1, inclusive. num_tile_rows_in_tileset_minus1[k] shall be in the range of 0 to num_tile_rows_minus1, inclusive. In another example num_tile_rows_in_tileset_minus1[k] shall be in the range of 0 to PicHeightInCtbsY−1, inclusive. When not present, the value of num_tile_rows_in_tileset_minus1 [k] is inferred to be equal to num_tile_rows_minus1. In one example when not present, the value of num_tile_rows_in_tileset_minus1 [k] is inferred to be equal to 0.

In one example, it is a requirement of bitstream conformance that sum of all (num_tile_rows_in_tileset_minus1[k]+1), for k in the range of 0 to num_tile_set_rows_minus1, inclusive, is equal to (num_tile_rows_minus1+1).

In another example, num_tile_rows_minus1[k] shall be in the range of 0 to PicHeightInCtbsY−num_tile_set_rows_minus1−1, inclusive.

num_tile_columns_in_tileset_minus1[l] plus 1 specifies the number of tile columns in the tile set associated with the index (k,l) for each 1 in the range of 0 to num_tile_set_columns_minus1, inclusive. num_tile_columns_in_tileset_minus1[l] shall be in the range of 0 to num_tile_columns_minus1, inclusive. In another example num_tile_columns_in_tileset_minus1[l] shall be in the range of 0 to PicWidthInCtbsY−1, inclusive. When not present, the value of num_tile_columns_in_tileset_minus1[l] is inferred to be equal to num_tile_columns_minus1. In one example when not present, the value of num_tile_columns_in_tileset_minus1[l] is inferred to be equal to 0.

In one example, it is a requirement of bitstream conformance that sum of all (num_tile_columns_in_tileset_minus1[l]+1), for 1 in the range of 0 to num_tile_set_columns_minus1, inclusive, is equal to (num_tile_columns_minus1+1).

In another example, num_tile_columns_minus1[l] shall be in the range of 0 to PicWidthInCtbsY−num_tile_set_columns_minus1−1, inclusive.

In one example, the tile structure syntax (i.e., syntax elements from ITU-T H.265) may be signaled in a PPS and the newly proposed tile sets related syntax may be signaled in an SPS.

In one example, when the syntax is signaled in PPS as above the following may be defined for scope of tile sets:

Let a set of pictures PPSassociatedPicSet be the set of all the pictures which are consecutive in decoding order and for whom the associated PPS is activated in the slice header (by inclusion of slice_pic_parameter_set_id). Then the scope of tile set signaled in PPS is the set of pictures PPSassociatedPicSet.

In another example:

The scope of tile set signaled in PPS with pps_pic_parameter_set_id value equal to PPSValA are the set of pictures which are consecutive in decoding order and whose slice header has the value for slice_pic_parameter_set_id equal to PPSValA and the picture before and after this set of pictures in decoding order have slice_pic_parameter_set_id equal to not equal to PPSValA. There may be multiple such sets in the coded video sequence.

In one example, a coding tree block raster and tile scanning conversion process may be as follows:

The list colWidth[k][l][i] for k ranging from 0 to num_tile_set_rows_minus1, inclusive, and 1 ranging from 0 to num_tile_set_columns_minus1, inclusive, and for i ranging from 0 to num_tile_columns_in_tileset_minus1[l], inclusive, specifying the width of the i-th tile column of tile set associated with the index (k,l) in units of CTBs, is derived as follows:

```
for(k=0;k<=num_tile_set_rows_minus1;k++){
  for(l=0;l<=num_tile_set_columns_minus1;l++){
if( uniform_spacing_flag )
    for( i = 0; i  <=  num_tile_columns_in_tileset_minus1[l]; i++ )
      colWidth[ k ] [ l ] [ i ] = ( ( i + 1 ) * PicWidthInCtbsY ) /
        ( num_tile_columns_minus1 + 1 ) − ( i * PicWidthInCtbsY ) /
        ( num_tile_columns_minus1 + 1 )
else {
    colWidth[ k ] [ l ] [ num_tile_columns_minus1 ] =
    PicWidthInCtbsY
    for( i = 0; i <= num_tile_columns_in_tileset_minus1[l]; i++ ) {
      colWidth[ k ] [ l ] [ i ] = column_width_minus1[ i ] + 1
      colWidth[ k ] [ l ] [ num_tile_columns_minus1 ]  −=
      colWidth [ k ] [ l ] [ i ]
    }
  }
 }
}
```

The list rowHeight[k][l][j] for k ranging from 0 to num_tile_set_rows_minus1, inclusive, and 1 ranging from 0 to num_tile_set_columns_minus1, inclusive, and for j ranging from 0 to num_tile_rows_in_tileset_minus1 [k], inclusive, specifying the height of the j-th tile row of tile set associated with the index (k,l) in units of CTBs, is derived as follows:

```
for(k=0;k<=num_tile_set_rows_minus1;k++){
  for(l=0;l<=num_tile_set_columns_minus1;l++){
if( uniform_spacing_flag )
    for( j = 0; j  <=  num_tile_rows_in_tileset_minus1[k]; j++ )
      rowHeight[ k ] [ l ] [ j ] = ( ( j + 1 ) * PicHeightInCtbsY ) /
        ( num_tile_rows_minus1 + 1 ) − ( j * PicHeightInCtbsY ) /
        ( num_tile_rows_minus1 + 1 )
else {
    rowHeight[ k ] [ l ] [ num_tile_rows_minus1 ] =
    PicHeightInCtbsY
    for( j = 0; j <= num_tile_rows_in_tileset_minus1[k]; j++ ) {
      rowHeight[ k ] [ l ] [ j ] = row_height_minus1 [ j ] + 1
      rowHeight[ k ] [ l ] [ num_tile_rows_minus1 ]  −=
      rowHeight[ k ] [ l ] [ j ]
    }
  }
 }
}
```

In another example the above derivations may be performed as follows:

NumTileSets=(num_tile_set_rows_minus1+1)*(num_tile_set_columns_minus1+1);

The list colWidth[k][l][i] for k ranging from 0 to num_tile_set_rows_minus1, inclusive, and 1 ranging from 0 to num_tile_set_columns_minus1, inclusive, and for i ranging from 0 to num_tile_columns_in_tileset_minus1[l], inclusive, specifying the width of the i-th tile column of tile set associated with the index (k,l) in units of CTBs, is derived as follows:

```
for(k=0;k<=num_tile_set_rows_minus1;k++){
  for(l=0;l<=num_tile_set_columns_minus1;l++){
if( uniform_spacing_flag )
    for( i = 0; i  <=  num_tile_columns_in_tileset_minus1[l]; i++ )
      colWidth[ k ] [ l ] [ i ] = ( ( i + 1 ) * PicWidthInCtbsY ) /
        ( num_tile_columns_minus1+ 1 ) − ( i * PicWidthInCtbsY ) /
        ( num_tile_columns_minus1+ 1 )
```

```
else {
    colWidth[ k ] [ l ] [num_tile_columns_minus1 ] =
    PicWidthInCtbsY
        for( i = 0; i < num_tile_columns_in_tileset_minus1[l]; i++ ) {
            colWidth[ k ] [ l ] [ i ] = column_width_minus1[ i ] + 1
            colWidth[ k ] [ l ] [ num_tile_columns_minus1 ]  -=
            colWidth [ k ] [ l ] [ i ]
        }
        if(NumTileSets>1){
            colWidth[ k ] [ l ] [ i ] = column_width_minus1[ i ] + 1
            colWidth[ k ][ l ] [ num_tile_columns_minus1 ]  -=
            colWidth [ k ] [ l ][ i ]
        }
    }
  }
}
```

In another example, the above derivations may be performed as follows:

NumTileSets=(num_tile_set_rows_minus1+1)*(num_tile_set_columns_minus1+1);

The list colWidth[k][l][i] for k ranging from 0 to num_tile_set_rows_minus1, inclusive, and l ranging from 0 to num_tile_set_columns_minus1, inclusive, and for i ranging from 0 to num_tile_columns_in_tileset_minus1[l], inclusive, specifying the width of the i-th tile column of tile set associated with the index (k,l) in units of CTBs, is derived as follows:

```
for(k=0;k<=num_tile_set_rows_minus1;k++){
  for(l=0;l<=num_tile_set_columns_minus1;l++){
if( uniform_spacing_flag )
    for( i = 0; i  <=  num_tile_columns_in_tileset_minus1[l]; i++ )
        colWidth[ k ] [ l ] [ i ] = ( ( i + 1 ) * PicWidthInCtbsY ) /
            ( num_tile_columns_minus1+ 1 ) - ( i * PicWidthInCtbsY ) /
            ( num_tile_columns_minus1+ 1 )
else {
    colWidth[ k ] [ l ] [num_tile_columns_minus1 ] =
    PicWidthInCtbsY
        for( i = 0; i < num_tile_columns_in_tileset_minus1[l]; i++ ) {
            colWidth[ k ] [ l ] [ i ] = column_width_minus1[ i ] + 1
            colWidth[ k ] [ l ] [ num_tile_columns_minus1 ]  -=
            colWidth [ k ] [ l ] [ i ]
        }
        if(NumTileSets>1){
            colWidth[ k ] [ l ] [ i ] = column_width_minus1[ i ] + 1
            colWidth[ k ] [ l ] [ num_tile_columns_minus1 ]  -=
            colWidth [ k ] [ l ] [ i ]
        }
    }
  }
}
```

The list rowHeight[k][l][j] for k ranging from 0 to num_tile_set_rows_minus1, inclusive, and l ranging from 0 to num_tile_set_columns_minus1, inclusive, and for j ranging from 0 to num_tile_rows_in_tileset_minus1[k], inclusive, specifying the height of the j-th tile row of tile set associated with the index (k,l) in units of CTBs, is derived as follows:

```
for(k=0;k<=num_tile_set_rows_minus1;k++){
  for(l=0;l<=num_tile_set_columns_minus1;l++){
if( uniform_spacing_flag )
    for( j = 0; j  <=  num_tile_rows_in_tileset_minus1[k]; j++ )
        rowHeight[ k ] [ l ] [ j ] = ( ( j + 1 ) * PicHeightInCtbsY ) /
            ( num_tile_rows_minus1+ 1 ) - ( j * PicHeightInCtbsY ) /
            ( num_tile_rows_minus1 + 1 )
```

```
else {
    rowHeight[ k ] [ l ] [ num_tile_rows_minus1 ] =
    PicHeightInCtbsY
        for( j = 0; j < num_tile_rows_in_tileset1[k] ; j++ ) {
            rowHeight[ k ] [ l ] [ j ] = row_height_minus1 [ j ] + 1
            rowHeight[ k ] [ l ] [ num_tile_rows_minus1 ]  -=
            rowHeight[ k ] [ l ] [ j ]
        }
        if(NumTileSets>1){
            rowHeight[ k ] [ l ][ j ] = row_height_minus1 [ j ] + 1
            rowHeight[ k ] [ l ] [ num_tile_rows_minus1 ]  -=
            rowHeight[ k ] [ l ] [ j ]
        }
    }
  }
}
```

In yet another example, the above derivations may be performed as follows:

The list colWidth[k][l][i] for k ranging from 0 to num_tile_set_rows_minus1, inclusive, and l ranging from 0 to num_tile_set_columns_minus1, inclusive, and for i ranging from 0 to num_tile_columns_in_tileset_minus1[l], inclusive, specifying the width of the i-th tile column of tile set associated with the index (k,l) in units of CTBs, is derived as follows:

```
for(k=0;k<=num_tile_set_rows_minus1;k++){
  for(l=0;l<=num_tile_set_columns_minus1;l++){
if( uniform_spacing_flag )
    for( i = 0; i  <=  num_tile_columns_in_tileset_minus1[l]; i++ )
        colWidth[ k ] [ l ] [ i ] = ( ( i + 1 )* PicWidthInCtbsY ) /
            ( num_tile_columns_minus1+ 1 ) - ( i * PicWidthInCtbsY ) /
            ( num_tile_columns_minus1+ 1 )
else {
    colWidth[ k ] [ l ] [num_tile_columns_minus1 ] =
    PicWidthInCtbsY
        for( i = 0; i < num_tile_columns_in_tileset_minus1[l]; i++ ) {
            colWidth[ k ] [ l ] [ i ] = column_width_minus1[ i ] + 1
            colWidth[ k ] [ l ] [ num_tile_columns_minus1 ]  -=
            colWidth [ k ] [ l ] [ i ]
        }
    }
  }
}
```

The list rowHeight[k][l][j] for k ranging from 0 to num_tile_set_rows_minus1, inclusive, and l ranging from 0 to num_tile_set_columns_minus1, inclusive, and for j ranging from 0 to num_tile_rows_in_tileset_minus1[k], inclusive, specifying the height of the j-th tile row of tile set associated with the index (k,l) in units of CTBs, is derived as follows:

```
for(k=0;k<=num_tile_set_rows_minus1;k++){
  for(l=0;l<=num_tile_set_columns_minus1;l++){
if( uniform_spacing_flag )
    for( j = 0; j  <=  num_tile_rows_in_tileset_minus1[k]; j++ )
        rowHeight[ k ] [ l ] [ j ] = ( ( j + 1 )* PicHeightInCtbsY ) /
            ( num_tile_rows_minus1+ 1 ) - ( j * PicHeightInCtbsY ) /
            ( num_tile_rows_minus1 + 1 )
else {
    rowHeight[ k ] [ l ] [ num_tile_rows_minus1 ] =
    PicHeightInCtbsY
```

-continued

```
    for( j = 0; j < num_tile_rows_in_tilesct_minus1[k] ; j++ ) {
      rowHeight[ k ] [ l ] [ j ] = row_height_minus1 [ j ] + 1
      rowHeight[ k ] [ l ] [ num_tile_rows_minus1 ] -=
      rowHeight[ k ] [ l ] [ j ]
    }
  }
 }
}
```

The variable NumTileSets indicating number of tile sets is derived as follows:
NumTileSets=(num_tile_set_rows_minus1+1)*(num_tile_set_columns_minus1+1)
The arrays of pwctbsy[k][l], phctbsy[k][l], psizectbsy[k][l] for k ranging from 0 to num_tile_set_rows_minus1, inclusive, and l ranging from 0 to num_tile_set_columns_minus1, inclusive, respectively specifying the picture width in luma CTBs, picture height in luma CTBs, and picture size in luma CTBs of the tile set associated with the index (k,l), and the array ctbAddrRSOffset[k][l] for k ranging from 0 to num_tile_set_rows_minus1, inclusive, and l ranging from 0 to num_tile_set_columns_minus1, inclusive, specifying the cumulative count of CTBs up to the tile set associated with the index (k,l) is derived as follows:

```
ctbAddrRSOffsetCalc=0; picSizeInCtbsY=0;
 for(k=0;k<=num_tile_set_rows_minus1;k++){
   for(l=0;l<=num_tile_set_columns_minus1;l++){
     for(pwctbsy[ k ] [ l ] = 0, i = 0; i <=
     num_tile_columns_in_tileset_minus1[l]; i++ ) {
       pwctbsy[ k ] [ l ] += (colWidth [ k ] [ l ] [ i ] )
     }
   for(phctbsy[ k ] [ l ]  = 0, i = 0; i <=
   num_tile_rows_in_tileset_minus1[k]; i++ ) {
       phctbsy[ k ] [ l ]   += (rowHeight [ k ] [ l ] [ i ] );
     }
     psizectbsy[ k ] [ l ] =pwctbsy[ k ] [ l ] *phctbsy[ k ] [ l ]
     picSizeInCtbsY+=   psizectbsy[ k ] [ l ]
     ctbAddrRSOffset[ k ] [ l ] =ctbAddrRSOffsetCalc
     ctbAddrRSOffsetCalc+=psizectbsy[ k ] [ l ]
    }
   }
```

In one example, above:

```
picSizeInCtbsY will not be set equal to 0 and will not be updated as
picSizeInCtbsY+= psizectbsy[ k ] [ l ]. In this case picSizeInCtbsY is
calculated as follows as in ITU-T H.265:
PicWidthInMinCbsY = pic_width_in_luma_samples / MinCbSizeY
PicWidthInMinCbsY = Ceil( pic_width_in_luma_samples ÷ CtbSizeY )
PicHeightInMinCbsY = pic_height_in_luma_samples / MinCbSizeY
PicHeightInMinCbsY = Ceil( pic_height_in_luma_samples ÷ CtbSizeY )
PicSizeInMinCbsY = PicWidthInMinCbsY * PicHeightInMinCbsY
PicSizeInCtbsY = PicWidthInCtbsY * PicHeightInCtbsY
```

A j-th tile set is associated with indices (k,l) as follows. A j-th tile set may be referred to as a tile set with index j.
Given the tile set index or tile set identifier j and number of tile set columns in the picture k and l are derived as follows:

$k=j/($num_tile_set_columns_minus1$+1)$ $l=j\%($num_tile_set_columns_minus1$+1)$ Given the indices k and l and number of tile set columns in the picture, the tile set index or tile set identifier j is derived as follows:

$j=k*($num_tile_set_columns_minus1$+1)+l$

Number of tiles in each tile set for k ranging from 0 to num_tile_set_rows_minus1, inclusive, and l ranging from 0 to num_tile_set_columns_minus1, inclusive, are derived as follows:

```
for(k=0;k<=num_tile_set_rows_minus1;k++){
  for(l=0;l<=num_tile_set_columns_minus1;l++){
    j = k*( num_tile_set_columns_minus1+1)+l
    NumTiles[j]=
    (num_tile_rows_in_tileset_minus1[k]+1)*(num_tile_columns_in_tileset_minus1[l]+1)
   }
 }
```

The list colBd[k][l][i] for k ranging from 0 to num_tile_set_rows_minus1, inclusive, and l ranging from 0 to num_tile_set_columns_minus1, inclusive, and for i ranging from 0 to num_tile_columns_in_tileset_minus1[k]+1, inclusive, specifying the location of the i-th tile column boundary of tile set associated with the index (k,l) in units of coding tree blocks, is derived as follows:

```
for(k=0;k<=num_tile_set_rows_minus1;k++){
  for(l=0;l<=num_tile_set_columns_minus1;l++){
    for( colBd[ k ] [ l ] [ 0 ] = 0, i = 0;  i <=
    num_tile_columns_in_tileset_minus1 [l]; i++ )
      colBd[ k ] [ l ] [ i + 1 ] = colBd[ k ] [ l ] [ i ] + colWidth[ k ] [ l ]
      [ i ]
  }
}
```

The list rowBd[j] for k ranging from 0 to num_tile_set_rows_minus1, inclusive, and l ranging from 0 to num_tile_set_columns_minus1, inclusive, and for j ranging from 0 to num_tile_rows_in_tileset_minus1[k]+1, inclusive, specifying the location of the j-th tile row boundary of tile set associated with the index (k,l) in units of coding tree blocks, is derived as follows:

```
for(k=0;k<=num_tile_set_rows_minus1;k++){
  for(l=0;l<=num_tile_set_columns_minus1;l++){
    for( rowBd[ k ] [ l ] [ 0 ] = 0, j = 0; j <=
    num_tile_rows_in_tileset_minus1[k]; j++ )
      rowBd[ k ] [ l ] [ j + 1 ] = rowBd[ k ] [ l ] [ j ] + rowHeight[ k ]
      [ l ] [ j ]
  }
}
```

The list CtbAddrRsToTs[ctbAddrRs] for ctbAddrRs ranging from 0 to PicSizeInCtbsY−1, inclusive, specifying the conversion from a CTB address in CTB raster scan of a picture to a CTB address in tile set and tile scan, is derived as follows:

```
for (k=0;k<=num_tile_set_rows_minus1;k++){
  for(l=0;l<=num_tile_set_columns_minus1;l++){
    for( ctbAddrRs = 0; ctbAddrRs < psizectbsy[ k ] [ l ]; ctbAddrRs++ ) {
      tbX = ctbAddrRs % pwctbsy [ k ] [ l ]
      tbY = ctbAddrRs / pwctbsy [ k ] [ l ]
      for( i = 0; i <= num_tile_columns_in_tileset_minus1 [l];
        i++)
        if( tbX >= colBd[ k ] [ l ] [ i ] )
          tileX = i
      for( j = 0; j <= num_tile_rows_in_tileset_minus1[k]; j++ )
        if( tbY >= rowBd[ k ] [ l ] [ j ] )
          tileY = j
      CtbAddrRsToTs[ ctbAddrRs + ctbAddrRSOffset[ k ] [ l ] ] = 0
      for( i = 0; i < tileX; i++ )
        CtbAddrRsToTs[ ctbAddrRs + ctbAddrRSOffset[ k ] [ l ] ] +=
          rowHeight[ k ] [ l ] [ tileY ] * colWidth[ i ]
      for( j = 0; j < tileY; j++ )
        CtbAddrRsToTs[ ctbAddrRs + ctbAddrRSOffset[ k ] [ l ]] +=
          pwctbsy [ k ] [ l ] * rowHeight[k] [ l ] [ j ]
      CtbAddrRsToTs[ ctbAddrRs + ctbAddrRSOffset[ k ] [ l ]] += (
        tbY - rowBd[ k ] [ l ] [ tileY ] ) * colWidth[ k ] [ l ] [ tileX ] +
        tbX - colBd[ k ] [ l ] [ tileX ]
      CtbAddrRsToTs[ ctbAddrRs + ctbAddrRSOffset[ k ] [ l ] ] +=
        ctbAddrRSOffset[ k ] [ l ]
    }
  }
}
```

The list CtbAddrTsToRs[ctbAddrTs] for ctbAddrTs ranging from 0 to PicSizeInCtbsY−1, inclusive, specifying the conversion from a CTB address in tile scan to a CTB address in CTB raster scan of a picture, is derived as follows:

```
for( ctbAddrRs = 0; ctbAddrRs < PicSizeInCtbsY; ctbAddrRs++ )
  CtbAddrTsToRs[ CtbAddrRsToTs[ ctbAddrRs ] ] = ctbAddrRs
```

The list TileId[ctbAddrTs] for ctbAddrTs ranging from 0 to PicSizeInCtbsY−1, inclusive, specifying the conversion from a CTB address in tile scan to a tile ID, is derived as follows:

```
for(k=0;k<=num_tile_set_rows_minus1;k++){
  for(l=0;l<=num_tile_sei_cokimns_minus1;l++){
    for( j = 0, tileIdx = 0; j <= num_tile_rows_in_tileset_minus1[k];
      j++ )
      for( i = 0; i <= num_tile_columns_in_tileset_mmus1[l];
        i++, tileIdx++)
        for( y = rowBd[ k ] [ l ] [ j ]; y < rowBd[ k ] [ l ] [ j + 1 ];
          y++ )
          for( x = colBd[ k ] [ l ] [ i ]; x < colBd[ k ] [ l ] [ i + 1 ];
            x++)
            TileId[ CtbAddrRsToTs[ y * PicWidthInCtbsY+ x +
              ctbAddrRSOffset[ k ] [ l ] ] ] = tileIdx
  }
}
```

In one example, additional calculations may be needed for sub-bitstream extraction or other processes. In one example, the additional calculations may be as follows:

for k ranging from 0 to num_tile_set_rows_minus1, inclusive, and l ranging from 0 to num_tile_set_columns_minus1, inclusive number of tile columns minus1 and number of tile rows minus1 are derived as follows:

```
for(k=0;k<=num_tile_set_rows_minus1;k++){
  for(l=0;l<=num_tile_set_columns_minus1;l++){
    num_tile_columns_minus1[k][l]=
      num_tile_columns_in_tileset_minus1[l]
    num_tile_rows_minus1[k][l]=
      num_tile_rows_in_tileset_minus1[k]
  }
}
```

The list tilecolumnPos [l] for l ranging from 0 to num_tile_columns_minus1+1, inclusive, specifying the location of the tile set associated with index (*,l)'s boundary in units of tiles, is derived as follows

```
for( l = 0, tilecolumnPos[0]=0; l <=
  num_tile_set_columns_minus1; l++ )
  tilecolumnPos[l+1]= tilecolumnPos[l+1]+
    num_tile_columns_in_tileset_minus1[l]
```

The list tilerowPos [k] for k ranging from 0 to num_tile_rows_minus1+1, inclusive, specifying the location of the of the tile set associated with index (k,*)'s boundary in units of tiles, is derived as follows

```
for( k = 0, tilerowPos[0]=0; k <= num_tile_set_rows_minus1; k++ )
  tilerowPos[k+1]= tilerowPos[k+1]+
    num_tile_rows_in_tileset_minus1[k]
```

The list colBd[k][l] for k ranging from 0 to num_tile_set_rows_minus1, inclusive, and l ranging from 0 to num_tile_set_columns_minus1, inclusive, and specifying the location of the tile column boundary of tile set associated with the index (k,l) in units of coding tree blocks and The list rowBd[k][l] for k ranging from 0 to num_tile_set_rows_minus1, inclusive, and l ranging from 0 to num_tile_set_columns_minus1, inclusive specifying the location of the tile row boundary of tile set associated with the index (k,l) in units of coding tree blocks, is derived as follows, is derived as follows

```
for(k=0;k<=num_tile_set_rows_minus1;k++){
  for(l=0,j=0;l<=num_tile_set_columns_minus1;l++){
    colBd[ k ] [ l ]= colWidth[tilecolumnPos[l]]
    rowBd[ k ] [ l ]= rowHeight[tilerowPos[k]]
  }
}
```

Table 9 illustrates an example slice segment header that may be used to signal information such that each tile set and tiles within the tile set may be independently processed according to the techniques herein. In this case, a slice always includes a single complete tile set. In this case the following signaling is done in the slice header (which may instead be called a tile set header or segment header or such other similar name):

TABLE 9

| | Descriptor |
|---|---|
| slice_segment_header( ) { | |
| ... | |
|   if( tilesets_enabled_flag ) | |
|     tile_set_id | u(v) |
| ... | |
|   if( tiles_enabled flag ) { | |
|     if(!tilesets_enabled_flag) | |
|       num_entry_point_offsets | ue(v) |
|     if(OffsetInfoPresent) { | |
|       offset_len_minus1 | ue(v) |
|       for( i = 0; i < NumOffsets; i++ ) | |
|         entry_point_offset_minus1[ i ] | ue(v) |
|   } | |
| ... | |

With respect to Table 9, it should be noted that syntax elements tile_set_id, num_entry_point_offsets, offset_len_minus1, and entry_point_offset_minus1, may be based on the following definitions:

tile_set_id specifies the tile set identifier of this tile set. Given the tile set indices k and l and number of tile set columns in the picture, the tile set index or tile set identifier j is derived as follows:

$$j = k * ((num\_tile\_set\_columns\_minus1 + 1) + 1$$

Tile set identifier may be instead called tile set index. The length of tile_set_id syntax element is Ceil(Log 2(NumTileSets)) bits num_entry_point_offsets, offset_len_minus1 and entry_offset_minus1[i] may have semantics similar to those provided in ITU-T H.265.

In one example, the following is derived when tiles_enabled_flag is equal to 1:

```
If tilesets_enabled_flag is equal to 1
    OffsetInfoPresent=1
    NumOffsets =NumTilesInTileset[ tile_set_id ]- 1
Otherwise (i.e. if tilesets_enabled_flag is equal to 0)
    OffsetInfoPresent= (num_entry_point_offsets? 1:0)
    NumOffsets =num_entry_offsets
When tiles_enabled_flag is equal to 0: OffsetInfoPresent = 0,
NumOffsets=0
```

In another example, the Table 10 illustrates an example slice segment header that may be used to signal information such that each tile set and tiles within the tile set may be independently processed according to the techniques herein. In this case, a slice may include an integer number of complete tile sets. In this case the following signaling is done in the slice header (which may instead be called a tile set header or segment header or such other similar name):

TABLE 10

| | Descriptor |
|---|---|
| slice_segment_header( ) { | |
| ... | |
|   if( tilesets_enabled_flag ) { | |
|     tile_set_id | u(v) |
|     num_tile_set_ids_minus1 | u(v) |
|   } | |
| ... | |
|   if( tiles_enabled_flag ) { | |
|     if(!tilesets_enabled_flag) | |
|       num_entry_point_offsets | ue(v) |
|     if(OffsetInfoPresent) { | |
|       offset_len_minus1 | ue(v) |
|       for( i = 0; i < NumOffsets; i++ ) | |
|         entry_point_offset_minus1[ i ] | ue(v) |
|   } | |
| ... | |

With respect to Table 10, it should be noted that syntax elements tile_set_id, num_entry_point_offsets, offset_len_minus1, and entry_point_offset_minus1, may be based on the following definitions:

tile_set.id specifies the tile set identifier of this tile set. Given the tile set indices k and l and number of tile set columns in the picture, the tile set index or tile set identifier j is derived as follows:

$$j = k * ((num\_tile\_set\_columns\_minus1 + 1) + 1$$

Tile set identifier may be instead called tile set index. The length of tile_set_id syntax element is Ceil(Log 2(NumTileSets)) bits.

num_tile_set_ids_minus1 plus 1 specifies the number of tile sets (in raster scan order of tile sets) that are present in the slice. The length of num_tile_set_ids_minus1 syntax element is Ceil(Log 2(NumTileSets−1)) bits.

The following is derived when tiles_enabled_flag is equal to 1:

```
If tilesets_enabled_flag is equal to 1
    OffsetInfoPresent=1
    for(i=tile_set_id,NumOffsets=0;  i<
    (tile_set_id+num_tile_set_ids_minus1+1); i++)
        {NumOffsets +=NumTilesInTileset[ i ]}
        NumOffsets=NumOffsets−1;
Otherwise (i.e. if tilesets_enabled_flag is equal to 0)
    OffsetInfoPresent= (num_entry_point_offsets? 1:0)
    NumOffsets =num_entry_offsets
When tiles_enabled_flag is equal to 0: OffsetInfoPresent = 0,
NumOffsets=0
```

It should be noted that "slice segment" may instead be called a "slice" or a "tile set" or a "tileset" or a "segment" or a "multi-ctu group" or a "tile group" or a "tile list" or a "tile collection" etc. As such, these words, in some cases, may be used interchangeably. Also, similar named data structure names are interchangeable. It should be noted that "slice segment header" may instead be called a "slice header" or a "tile set header" or a "tileset header" or a "segment header" or a "multi-ctu group header" or a "tile group header" or a "tile list header" or a "tile collection header" etc. As such these words are used interchangeably. Also, similar named data structure names may, in some cases, be used interchangeable.

Table 11 illustrates an example of syntax for a parameter set that may be used to signal tile structures according to the techniques herein. In one example, the example syntax included in Table 11 may be included in a PPS. In other examples, the example syntax included in Table 11 may be included in a VPS or SPS or other parameter set. In other examples, the example syntax included in Table 11 may be included in a tile group header or a slice header.

TABLE 11

| | Descriptor |
|---|---|
| parameter_set_rbsp( ) { | |
| ... | |
|   tilesets_enabled_flag | u(1) |
|   if( tilesets_enabled_flag ) { | |
|     num_tile_sets_in_pic_minus1 | ue(v) |
|     for( i = 0; i <= num_tile_sets_in_pic_minus1; i++ ) { | |
|       top_left_tile_id[ i ] | u(v) |
|       num_tile_rows_in_tileset_minus1[ i ] | u(v) |
|       num_tile_columns_in_tileset_minus1[ i ] | u(v) |
|     } | |
|   } | |
| ... | |
|   rbsp_trailing_bits( ) | |
| } | |

With respect to Table 11, the respective syntax elements may be based on the following definitions:

tilesets_enabled_flag equal to 1 specifies that there is more than one tile set in each picture referring to the parameter set. tilesets_enabled_flag equal to 0 specifies that there is only one tile set in each picture referring to the parameter set. In a variant: tilesets_enabled_flag equal to 0 may specify that each tile is a tile set in each picture referring to the PPS.
It is a requirement of bitstream conformance that the value of tilesets_enabled_flag shall be the same for all PPSs that are activated within a CVS. When tiles_enabled_flag is equal to 0, tilesets_enabled_flag is inferred to be equal to 0.
num_tile_sets_in_pic_minus1 plus 1 specifies the number of tile sets in the picture.
top_left_tile_id specifies the tile ID of the tile located at the top-left corner of the i-th tile set. The length of top_left_tile_id[i] is Ceil(Log 2(num_tilesets_in_pic_minus1+1)) bits. The value of top_left_tile_id[i] shall not be equal to the value of top_left_tile_id[j] for any i not equal to j.
num_tile_rows_in_tileset_minus1[i] plus 1 specifies the number of tile rows in the i-th tile set, for each i in the range of 0 to (num_tile_sets_in_pic_minus1), inclusive. num_tile_rows_in_tileset_minus1[i] shall be in the range of 0 to num_tile_rows_minus1, inclusive. The length of num_tile_rows_in_tileset_minus1[i] is Ceil(Log 2(num_tile_rows_minus1+1)) bits.
When not present, the value of num_tile_rows_in_tileset_minus1[i] is inferred to be equal to 0.
In a variant when not present, the value of num_tile_rows_in_tileset_minus1 [i] is inferred to be equal to num_tile_rows_minus1.
num_tile_columns_in_tileset_minus1[1] plus 1 specifies the number of tile columns in the i-th tile set, for each i in the range of 0 to (num_tile_sets_in_pic_minus1), inclusive. num_tile_columns_in_tileset_minus1 [1] shall be in the range of 0 to num_tile_columns_minus1, inclusive. The length of num_tile_columnss_in_tileset_minus1[i] is Ceil(Log 2(num_tile_columns_minus1+1)) bits.
When not present, the value of num_tile_columns_in_tileset_minus1[1] is inferred to be equal to 0. In a variant, when not present, the value of num_tile_columns_in_tileset_minus1[1] is inferred to be equal to num_tile_columns_minus1.
In a variant, num_tile_rows_in_tileset_minus1[i] and num_tile_columns_in_tileset_minus1[1] are ue(v) coded.
In a variant, one or two separate additional syntax elements signal the number of bits used for num_tile_rows_in_tileset_minus1[i] and/or num_tile_columns_in_tileset_minus1[1].

Table 12 illustrates an example of syntax for a parameter set that may be used to signal tile structures according to the techniques herein. In one example, the example syntax included in Table 12 may be included in a PPS. In other examples, the example syntax included in Table 12 may be included in a VPS or SPS or other parameter set. In other examples, the example syntax included in Table 12 may be included in a tile group header or a slice header.

TABLE 12

| | Descriptor |
|---|---|
| parameter_set_rbsp( ) { | |
| ... | |
|   tilesets_enabled_flag | u(1) |
|   if( tilesets_enabled_flag ) { | |
|     num_tile_sets_in_pic_minus1 | ue(v) |
|     remaining_tiles_tileset_flag | u(1) |
|     for( i = 0; i < (num_tile_sets_in_pic_minus1+!remaining_tiles_tileset_flag); i++ ) | |
|     { | |
|       top_left_tile_id[ i ] | u(v) |
|       num_tile_rows_in_tileset_minus1[ i ] | u(v) |
|       num_tile_columns_in_tileset_minus1[ i ] | u(v) |
|     } | |
|   } | |
| ... | |
|   rbsp_trailing_bits( ) | |
| } | |

With respect to Table 12, the respective syntax elements may be based on the definitions provided above and following definitions:

remaining_tiles_tileset_flag equal to 1 specifies that all the remaining tiles in the picture except those explicitly specified in the (num_tilesets_in_pic_minus1-1) tile sets signaled by syntax elements top_left_tile_id[i], num_tile_rows_in_tileset_minus1[i], num_tile_columns_in_tileset_minus1[i] form the last tile set. remaining_tiles_tileset_flag equal to 0 specifies that all the num_tilesets_in_pic_minus1 tile sets are explicitly specified by signaling syntax elements top_left_tile_id[i], num_tile_rows_in_tileset_minus1[i], num_tile_columns_in_tileset_minus1[i].

num_tile_rows_in_tileset_minus1[i] plus 1 specifies the number of tile rows in the i-th tile set, for each i in the range of 0 to (num_tile_sets_in_pic_minus1+!remaining_tiles_tileset_flag-1), inclusive. num_tile_rows_in_tileset_minus1 [i] shall be in the range of 0 to num_tile_rows_minus1, inclusive. The length of num_tile_rows_in_tileset_minus1[i] is Ceil(Log 2(num_tile_rows_minus1+1)) bits. When not present, the value of num_tile_rows_in_tileset_minus1[i] is inferred to be equal to 0.

In a variant when not present, the value of num_tile_rows_in_tileset_minus1[i] is inferred to be equal to num_tile_rows_minus1.

num_tile_columns_in_tileset_minus1[1] plus 1 specifies the number of tile columns in the i-th tile set, for each I in the range of 0 to (num_tile_sets_in_pic_minus1+!remaining_tiles_tileset_flag-1), inclusive. num_tile_columns_in_tileset_minus1[1] shall be in the range of 0 to num_tile_columns_minus1, inclusive. The length of num_tile_columnss_in_tileset_minus1[i] is Ceil(Log 2(num_tile_columns_minus1+1)) bits.

When not present, the value of num_tile_columns_in_tileset_minus1[1] is inferred to be equal to 0. In a variant when not present, the value of num_tile_columns_in_tileset_minus1[1] is inferred to be equal to num_tile_columns_minus1.

In a variant example, it is requirement of bitstream conformance that each tile in the picture shall belong to one and only one of the tile sets, with tile sets in the range of 0 to num_tile_sets_minus1, inclusive.

Table 12A illustrates an example of syntax for a parameter set that may be used to signal tile structures according to the techniques herein. In one example, the example syntax included in Table 12A may be included in a PPS. In other examples, the example syntax included in Table 12A may be included in a VPS or SPS or other parameter set. In other examples, the example syntax included in Table 12A may be included in a tile group header or a slice header.

TABLE 12A

| | Descriptor |
|---|---|
| parameter_set_rbsp( ) { | |
| ... | |
|   tilesets_enabled_flag | u(1) |
|   if( tilesets_enabled_flag ) { | |
|     num_tile_sets_in_pic_minus1 | ue(v) |
|     for( i = 0; i < num_tile_sets_in_pic_minus1; i++ ) { | |
|       top_left_tile_id[ i ] | u(v) |
|       num_tile_rows_in_tileset_minus1[ i ] | u(v) |
|       num_tile_columns_in_tileset_minus1[ i ] | u(v) |
|     } | |
|   } | |
| ... | |
|   rbsp_trailing_bits( ) | |
| } | |

With respect to Table 12A, the respective syntax elements may be based on the definitions provided above.

Table 13 illustrates an example of syntax for a parameter set that may be used to signal tile structures according to the techniques herein. In one example, the example syntax included in Table 13 may be included in a PPS. In other examples, the example syntax included in Table 13 may be included in a VPS or SPS or other parameter set. In other examples, the example syntax included in Table 13 may be included in a tile group header or a slice header.

TABLE 13

| | Descriptor |
|---|---|
| parameter_set_rbsp( ) { | |
| ... | |
|   tile_set_flag | u(1) |
|   if( tile_set_flag ) { | |
|     num_tile_sets_in_pic_minus1 | ue(v) |
|     remaining_tiles_tileset_flag | u(1) |
|     for( i = 0; i < (num_tile_sets_in_pic_minus1+!remaining_tiles_tileset_flag); i++ ) | |
|     { | |
|       top_left_tile_id[ i ] | u(v) |
|       bottom_right_tile_id[ i ] | u(v) |
|     } | |
|   } | |
| ... | |
|   rbsp_trailing_bits( ) | |
| } | |

With respect to Table 13, the respective syntax elements may be based on the definitions provided above and following definitions:

bottom_right_tile_id[i] specifies the tile ID of the tile located at the bottom-right corner of the i-th tile set. The length of bottom_right_tile_id[i] is Ceil(Log 2(num_tilesets_in_pic_minus11)) bits. The value of bottom_right_tile_id[i] shall not be equal to the value of bottom_right_tile_id[j] for any i not equal to j.

Table 14 illustrates an example of syntax for a parameter set that may be used to signal tile structures according to the techniques herein. In one example, the example syntax included in Table 14 may be included in a PPS. In other examples, the example syntax included in Table 14 may be included in a VPS or SPS or other parameter set. In other examples, the example syntax included in Table 14 may be included in a tile group header or a slice header.

TABLE 14

| | Descriptor |
|---|---|
| parameter_set_rbsp( ) { | |
| ... | |
|   tile_set_flag | u(1) |
|   if( tile_set_flag ) { | |
|     num_tile_sets_in_pic_minus1 | ue(v) |
|     for(i = 0; i < num_tile_sets_in_pic_minus1; i++ ) { | |
|       top_left_tile_id[ i ] | u(v) |
|       bottom_right_tile_id[ i ] | u(v) |
|     } | |
|   } | |
| ... | |
|   rbsp_trailing_bits( ) | |
| } | |

With respect to Table 14, the respective syntax elements may be based on the definitions provided above.

With respect to the Tables 11-14, Table 14A illustrates an example syntax of tile group header.

TABLE 14A

| | Descriptor |
|---|---|
| tile_group_header( ) { | |
|   tile_group_pic_parameter_set_id | ue(v) |
|   tile_set_idx | u(v) |
|   tile_group_type | ue(v) |
|   if ( tile_group_type != I ) { | |
|     log2_diff_ctu_max_bt_size | ue(v) |

TABLE 14A-continued

| | Descriptor |
|---|---|
|   if( sps_sbtmvp_enabled_flag ) { | |
|     sbtmvp_size_override_flag | u(1) |
|     if( sbtmvp_size_override_flag ) | |
|       log2_sbtmvp_active_size_minus2 | u(3) |
|   } | |
|   if( sps_temporal_mvp_enabled_flag ) | |
|     tile_group_temporal_mvp_enabled_flag | u(1) |
|   if( tile_group_type == B ) | |
|     mvd_l1_zero_flag | u(1) |
|   if( tile_group_temporal_mvp_enabled_flag ) { | |
|     if( tile_group_type == B ) | |
|       collocated_from_l0_flag | u(1) |
|   } | |
|   six_minus_max_num_merge_cand | ue(v) |
|   } | |
|   dep_quant_enabled_flag | u(1) |
|   if( !dep_quant_enabled_flag ) | |
|     sign_data_hiding_enabled_flag | u(1) |
|   if( num_tiles_in_tile_group_minus1 > 0 ) { | |
|     offset_len_minus1 | ue(v) |
|     for( i = 0; i < num_tiles_in_tile_group_minus1; i++ ) | |
|       entry_point_offset_minus1[ i ] | u(v) |
|   } | |
|   byte_alignment( ) | |
| } | |

With respect to Table 14A, the respective syntax elements may be based on the definitions provided above and following definitions:

tile_set_idx specifies the tile set index of this tile set. The length of tile_set_idx syntax element is Ceil(Log 2(NumTileSets)) bits.

With respect to Table 11, Table 15 illustrates an example syntax of tile group data.

TABLE 15

| | Descriptor |
|---|---|
| tile_group_data( ) { | |
|   tileIdx = top_left_tile_id[ tile_set_idx ] | |
|   for( k = 0; k <= num_tile_rows_in_tileset_minus1[ tile_set_idx ]; k++, tileIdx += | |
|     (num_tile_columns_minus1 − | |
| num_tile_columns_in_tileset_minus1[ tile_set_idx ] ) ) { | |
|     for(i = 0; i <= num_tile_columns_in_tileset_minus1[ tile_set_idx ]; i++, tileIdx++ ) { | |
|       ctbAddrInTs = FirstCtbAddrTs[ tileIdx ] | |
|       for( j = 0; j < NumCtusInTile[ tileIdx ]; j++, ctbAddrInTs++ ) { | |
|         CtbAddrInRs = CtbAddrTsToRs[ ctbAddrInTs ] | |
|         coding_tree_unit( ) | |
|       }//for j= CTUs in one tile | |
|       end_of_tile_one_bit  /* equal to 1 */ | ae(v) |
|       if( k < num_tile_rows_in_tileset_minus1[ tile_set_idx ]  \|\| | |
|         j < num_tile_columnss_in_tileset_minus1[ tile_set_idx ] ) | |
| Variant | |
|       if( !((k == num_tile_rows_in_tileset_minus1[ tile_set_idx ]) &&  \| | |
|         (j == num_tile_columnss_in_tileset_minus1[tile_set_idx])) ) | |
|         byte_alignment( ) | |
|     }//for i | |
|   }//for k | |
| } | |

With respect to Table 15, in one example, the conversion from a CTB address in tile scan to a tile ID may be as follows:

```
for( j = 0, tileIdx = 0; j <= num_tile_rows_minus1; j++ )
  for( i = 0; i <= num_tile_columns_minus1; i++, tileIdx++ ) {
    for( y = RowBd[ j ]; y < RowBd[ j + 1 ]; y++ )
      for( x = ColBd[ i ]; x < ColBd[ i + 1 ]; x++ ) {
        TileId[ CtbAddrRsToTs[ y * PicWidthInCtbsY+ x ] ] =
          tileIdx
        FirstCtbAddrTs[ tileIdx ] =
CtbAddrRsToTs[ RowBd[ j ] * PicWidthInCtbsY + ColBd[ i ] ]
      }
```

```
        TileIndex[ j*( num_tile_columns_minus1+1)+i ] = tileIdx
    }
for( l = 0; l <= num_tile_sets_in_pic_minus1; l++ ) {
  TopLeftTileId[ l ]= top_left_tile_id[ l ];
  NumTileRowsInTileSetMinus1[ l ] =
  num_tile_rows_in_tileset_minus1 [ l ];
    NumTileColumnsInTileSetMinus1[ l ] =
      num_tile_columns_in_tileset_minus1 [ l ];
}
```

With respect to Tables 12-14, Table 16 illustrates an example syntax of tile group data.

TABLE 16

| | Descriptor |
|---|---|
| tile_group_data( ) { <br>   tileIdx = TopLeftTileId[ tile_set_idx ] <br>     for( k = 0; k <= NumTileRowsInTileSetMinus1 [ tile_set_idx ]; k++, tileIdx  += <br>         (num_tile_columns_minus1 −num_tile_columns_in_tileset_minus1[ tile_set_idx ]) ) <br> { <br>   for( i = 0; i  <=  NumTileColumnsInTileSetMinus1[ tile_set_idx ]; i++, tileIdx++ ) { <br>   ctbAddrInTs = FirstCtbAddrTs[ tileIdx ] <br>     for( j = 0; j < NumCtusInTile[ tileIdx ]; j++, ctbAddrInTs++ ) { <br>       CtbAddrInRs = CtbAddrTsToRs[ CtbAddrInTs ] <br>       coding_tree_unit( ) <br>     }//for j= CTUs in one tile <br>     end_of_tile_one_bit   /* equal to 1 */ <br>       if( k < num tile_rows_in_tileset_minus1[ tile_set_idx ]   \|\| <br>         j <   num_tile_columnss_in_tileset_minus1[ tile_set_idx ]) <br> Variant <br> if( !((k == num_tile_rows_in_tileset_minus1[ tile_set_idx ]) &&   \| <br>   (j ==   num_tile_columnss_in_tileset_minus1[ tile_set_idx])) ) <br>     byte_alignment( ) <br>   }//for i <br> }//for k <br> } | <br><br><br><br><br><br><br><br><br><br>ae(v) |

With respect to Tables 12-14, Table 16A illustrates another example syntax of tile group data. The main difference between Table 16 and Table 16A is that some of the syntax elements are replaced by derived variables.

TABLE 16A

| | Descriptor |
|---|---|
| tile_group_data( ) { <br>   tileIdx = TopLeftTileId[ tile_set_idx ] <br>   for( k = 0; k <= NumTileRowsInTileSetMinus1[ tile_set_idx ]; k++, tileIdx  += <br>       (num_tile_columns_minus1 − NumTileColumnsInTileSetMinus1[ tile_set_idx ]) ) { <br>   for( i = 0; i  <=  NumTileColumnsInTileSetMinus1 [ tile_set_idx ]; i++, tileIdx++ ) { <br>   ctbAddrInTs = FirstCtbAddrTs[ tileIdx ] <br>     for( j = 0; j < NumCtusInTile[ tileIdx ]; j++, ctbAddrInTs++ ) { <br>       CtbAddrInRs = CtbAddrTsToRs[ ctbAddrInTs ] <br>       coding_tree_unit( ) <br>     }//for j= CTUs in one tile <br>     end_of_tile_one_bit   /* equal to 1 */ <br>       if) k < NumTileRowsInTileSetMinus1 [ tile_set_idx]   \|\| <br>         j <   NumTileColumnsInTileSetMinus1 [ tile_set_idx ] ) <br> Variant <br> if( !((k == NumTileRowsInTileSetMinus1 [ tile_set_idx ]) &&   \| <br>   (j ==   NumTileColumnsInTileSetMinus1 [ tile_set_idx ])) ) <br>     byte_alignment( ) <br>   }//for i <br> }//for k <br> } | <br><br><br><br><br><br><br><br><br>ae(v) |

With respect to Table 12 and Table 16 and Table 16A, in one example, the conversion from a CTB address in tile scan to a tile ID may be as follows:

```
        for( j = 0, tileIdx = 0; j  <=  num_tile_rows_minus1; j++ )
            for( i = 0; i  <=  num_tile_columns_minus1; i++, tileIdx++ ) {
                for( y = RowBd[ j ]; y < RowBd[ j + 1 ]; y++ )
                    for( x = ColBd[ i ]; x < ColBd[ i + 1 ]; x++ ) {
                        TileId[ CtbAddrRsToTs[ y * PicWidthInCtbsY+ x ] ] = tileIdx
                        FirstCtbAddrTs[ tileIdx ] =
        CtbAddrRsToTs[ RowBd[ j ] * PicWidthInCtbsY + ColBd[ i ] ]
                    }
                TileIndex[ j*( num_tile_columns_minus1+1)+i ] = tileIdx
                RemTiles[tileIdx]=1
            }
for( l = 0; l  < (num_tile_sets_in_pic_minus1+!remaining_tiles_tileset_flag); l++ ) {
        for( k = 0, tileIdx= top_left_tile_id[l]; k <= num_tile_rows_in_tileset_minus1[ l ]; k++,
tileIdx   +=
        (num_tile_columns_minus1 −num_tile_columns_in_tileset_minus1[ l ]) )
                for( i = 0; i  <=  num_tile_columns_in_tileset_minus1[ l ]; i++, tileIdx++ ){
                    RemTiles[tileIdx]=0
                }
        TopLeftTileId[ l ]= top_left_tile_id[ l ];
        NumTileRowsInTileSetMinus1[ l  ] =  num_tile_rows_in_tileset_minus1  [  l ];
        NumTileColumnsInTileSetMinus1[ l] = num_tile_columns_in_tileset_minus1 [ l ];
NumTilesInSlice[ l ]=(NumTileRowsInTileSetMinus1[ l ]+1)*( NumTileColumnsInTileSetMin
us1 [ l ]+1)
}
if(remaining_tiles_tileset_flag) {
for(i=0,tlId=(num_tile_columns_minus1+1)*(num_tile_rows_minus1+1),brId=0;i<(num_tile_c
olumns_minus1+1)*( num_tile_rows_minus1+1);i++){
    if(RemTiles[i]){
        if(i<tlId) tlId=i;
        if(i>brId) brId=i;
    }
}
TopLeftTileId[ num_tile_sets_in_pic_minus1 ]= tlId;
NumTileRowsInTileSetMinus1[ num_tile_sets_in_pic_minus1 ]=(brId−tlId)/( num_tile_colum
ns_minus1 + 1);
NumTileColumnsInTileSetMinus1[ num_tile_sets_in_pic_minus1 ]=(brId−tlId)%( num_tile_c
olumns_minus1 + 1);
NumTilesInSlice[ num_tile_sets_in_pic_minus1 ] =
(NumTileRowsInTileSetMinus1[ num_tile_sets_in_pic_minus1 ]+1)*( NumTileColumnsInTil
eSetMinus1 [ num_tile_sets_in_pic_minus1 ]+1)
}
```

With respect to Table 12A and Table 16 and Table 16A, in one example, the conversion from a CTB address in tile scan to a tile ID may be as follows:

```
for( j = 0, tileIdx = 0; j  <=  num_tile_rows_minus1; j++ )
        for( i = 0; i  <=  num_tile_columns_minus1; i++, tileIdx++ ) {
            for( y = RowBd[ j ]; y < RowBd[ j + 1 ]; y++ )
                for( x = ColBd[ i ]; x < ColBd[ i + 1 ]; x++ ) {
                    TileId[ CtbAddrRsToTs[ y * PicWidthInCtbsY+ x ] ] = tileIdx
                    FirstCtbAddrTs[ tileIdx ] =
CtbAddrRsToTs[ RowBd[ j ] * PicWidthInCtbsY + ColBd[ i ] ]
                }
            TileIndex[ j*( num_tile_columns_minus1+1)+i ] = tileIdx
            RemTiles[tileIdx]=1
        }
for( l = 0; l  < num_tile_sets_in_pic_minus1; l++ ) {
        for( k = 0, tileIdx= top_left_tile_id[l]; k <= num_tile_rows_in_tileset_minus1[ l ]; k++, tileIdx
+=
        (num_tile_columns_minus1 −num_tile_columns_in_tileset_minus1[ l ]) )
                for( i = 0; i  <=  num_tile_columns_in_tileset_minus1[ l ]; i++, tileIdx++) {
                    RemTiles[tileIdx]=0
                }
        TopLeftTileId[ l ]= top_left_tile_id[ l ];
        NumTileRowsInTileSetMinus1[ l ] = num_tile_rows_in_tileset_minus1 [ l ];
NumTilesInSlice[ l ]=(NumTileRowsInTileSetMinus1[ l ]+1)*( NumTileColumnsInTileSetMin
us1 [ l ]+1)
}
```

-continued

```
for(i=0,tlId=(num_tile_columns_minus1+1)*(num_tile_rows_minus1+1),brId=0;i<(num_tile_c
olumns_minus1+1)*( num_tile_rows_minus1+1);i++){
    if(RemTiles[i]){
        if(i<tlId) tlId=i;
        if(i>brId) brId=i;
    }
}
TopLeftTileId[ num_tile_sets_in_pic_minus1 ]= tlId;
NumTileRowsInTileSetMinus1[ num_tile_sets_m_pic_minus1 ]=(brId-tlId)/( num_tile_colum
ns_minus1 + 1);
NumTileColumnsInTileSetMinus1[ num_tile_sets_in_pic_minus1 ]=(brId-tlId)%( num_tile_c
olumns_minus1 + 1);
NumTilesInSlice[ num_tile_sets_in_pic_minus1 ] =
(NumTileRowsInTileSetMinus1[ num_tile_sets_in_pic_minus1 ]+1)*( NumTileColumnsInTil
eSetMinus1 [ num_tile_sets_in_pic_minus 1 ]+1)
```

With respect to Table 13 and Table 16 and Table 16A, in one example, the conversion from a CTB address in tile scan to a tile ID may be as follows:
The list TileId[ctbAddrTs] for ctbAddrTs ranging from 0 to PicSizeInCtbsY−1, inclusive, specifying the conversion from a CTB address in tile scan to a tile ID, and the list NumCtusInTile[tileIdx] for tileIdx ranging from 0 to PicSizeInCtbsY−1, inclusive, specifying the conversion from a tile index to the number of CTUs in the tile, are derived as follows:

With respect to Table 14 and Table 16 and Table 16A, in one example, the conversion from a CTB address in tile scan to a tile ID may be as follows:
The list TileId[ctbAddrTs] for ctbAddrTs ranging from 0 to PicSizeInCtbsY−1, inclusive, specifying the conversion from a CTB address in tile scan to a tile ID, and the list NumCtusInTile[tileIdx] for tileIdx ranging from 0 to PicSizeInCtbsY−1, inclusive, specifying the conversion from a tile index to the number of CTUs in the tile, are derived as follows:

```
for( j = 0, tileIdx = 0; j  <=  num_tile_rows_minus 1; j++ )
    for( i = 0; i  <=  num_tile_columns_minus1; i++, tileIdx++ ) {
        for( y = RowBd[ j ]; y < RowBd[ j + 1 ]; y++ )
            for( x = ColBd[ i ]; x < ColBd[ i + 1 ]; x++ ) {
                TileId[ CtbAddrRsToTs[ y * PicWidthInCtbsY+ x ] ] = tileIdx
                FirstCtbAddrTs[ tileIdx ] =
CtbAddrRsToTs[ RowBd[ j ] * PicWidthInCtbsY + ColBd[ i ] ]
            }
        TileIndex[ j*( num_tile_columns_minus1+1)+i ] = tileIdx
        RemTiles[tileIdx]=1
    }
for( l = 0; l  < (num_tile_sets_in_pic_minus1+!remaining_tiles_tileset_flag); l++ ) {
    for( k = 0, tileIdx= top_left_tile_id[l]; k <= num_tile_rows_in_tileset_minus1[ l ]; k++,
tileIdx +=
 (num_tile_columns_minus1 -num_tile_columns_in_tileset_minus1[ l ]) )
        for( i = 0; i  <=  num_tile_columns_in_tileset_minus1[ l ]; i++, tileIdx++ ){
            RemTiles[tileIdx]=0
        }
    TopLeftTileId[ l ]= top_left_tile_id[ l ];
    BottomRightTileId[ l ]= bottom_right_tile_id[ l ];
    dtlId = TileIdToIdx[ bottom_right_tile_id[ i ] ] − TileIdToIdx[ top_left_tile_id[ i ]
NumTileRowsInTileSetMinus1 [ l ] = ( dtlId / ( num_tile_columns_minus1 + 1) )
NumTileColumnsInTileSetMinus1 [ l ] = ( dtlId% ( num_tile_columns_minus1 + 1 ) )  }
 NumTilesInSlice[ l ]=(NumTileRowsInTileSetMinus1[ l ]+1)*( NumTileColumnsInTileSetMin
us1 [ l ]+1)
}
if(remaining_tiles_tileset_flag) {
for(i=0,tlId=(num_tile_columns_minus1+1)*(num_tile_rows_minus1+1),brId=0;i<(num_tile_c
olumns_minus1+1)*( num_tile_rows_minus1+1);i++){
    if(RemTiles[i]){
        if(i<tlId) tlId=i;
        if(i>brId) brId=i;
    }
}
TopLeftTileId[ num_tile_sets_in_pic_minus1 ]= tlId;
BottomRightTileId[ num_tile_sets_in_pic_minus1 ]= brId;
NumTileRowsInTileSetMinus1[ num_tile_sets_in_pic_minus1 ]=(brId-tlId)/( num_tile_columns_minus1 +
1);
NumTileColumnsInTileSetMinus1[ num_tile_sets_in_pic_minus1 ]=(brId-tlId)%( num_tile_columns_min
us1 + 1);
NumTilesInSlice[ num_tile_sets_in_pic_minus1 ]=
(NumTileRowsInTileSetMinus1[ num_tile_sets_in_pic_minus1 ]+1)*( NumTileColumnsInTil
eSetMinus1 [ num_tile_sets_in_pic_minus1 ]+1)
}
```

```
    for( j = 0, tileIdx = 0; j  <=   num_tile_rows_minus 1; j++ )
      for( i = 0; i  <=  num_tile_columns_minus1; i++, tileIdx++ ) {
        for( y = RowBd[ j ]; y < RowBd[ j + 1 ]; y++ )
          for( x = ColBd[ i ]; x < ColB[ i + 1 ]; x++ ) {
            TileId[ CtbAddrRsToTs[ y * PicWidthInCtbsY+ x ] ] = tileIdx
            FirstCtbAddrTs[ tileIdx ] =
CtbAddrRsToTs[ RowBd[ j ] * PicWidthInCtbsY + ColBd[ i ] ]
          }
        TileIndex[ j*( num_tile_columns_minus1+1)+i ] = tileIdx
        RemTiles[tileIdx]=1
      }
for( l = 0; l  < num_tile_sets_in_pic_minus1; l++ ) {
  for( k = 0, tileIdx= top_left_tile_id[l]; k <= num_tile_rows_in_tileset_minus1[ l ]; k++,
tileIdx   +=
    (num_tile_columns_minus1 -num_tile_columns_in_tileset_minus1[ l ]) )
        for( i = 0; i  <=  num_tile_columns_in_tileset_minus1[ l ]; i++, tileIdx++ ){
          RemTiles[tileIdx]=0
        }
    TopLeftTileId[ l ]= top_left_tile_id[ l ];
    BottomRightTileId[ l ]= bottom_right_tile_id[ l ];
    dtlId = TileIdToIdx[ bottom_right_tile_id[ i ] ] - TileIdToIdx[ top_left_tile_id[ i ]
NumTileRowsInTileSetMinus1 [ l ] = ( dtlId / ( num_tile_columns_minus1 + 1 ))
NumTileColumnsInTileSetMinus1 [ l ] = ( dtlId % ( num_tile_columns_minus1 + 1 ) ) }
NumTilesInSlice[ l ]=(NumTileRowsInTileSetMinus1[ l ]+1)*( NumTileColumnsInTileSetMin
us1 [ l ]+1)
}
  for(i=0,tlId=(num_tile_columns_minus1+1)*(num_tile_rows_minus1+1),brId=0;i<(num_tile_c
olumns_minus1+1)*( num_tile_rows_minus1+1);i++){
    if(RemTiles[i]){
      if(i<tlId) tlId=i;
      if(i>brId) brId=i;
    }
  }
  TopLeftTileId[ num_tile_sets_in_pic_minus1 ]= tlId;
  BottomRightTileId[ num_tile_sets_in_pic_minus1 ]= brId;
  NumTileRowsInTileSetMinus1[ num_tile_sets_in_pic_minus1 ]=(brId−tlId)/( num_tile_colum
ns_minus1 + 1);
  NumTileColumnsInTileSetMinus1[ num_tile_sets_in_pic_minus1 ]=(brId−tlId)%( num_tile_c
olumns_minus1 + 1);
  NumTilesInSlice[ num_tile_sets_in_pic_minus1 ] =
(NumTileRowsInTileSetMinus1[ num_tile_sets_in_pic_minus1 ]+1)*( NumTileColumnsInTil
eSetMinus1 [ num_tile_sets_in_pic_minus1 ]+1)
```

In one example, a flag which indicates that each tile group consists of only one tile may be signaled. The signaling of syntax element for number of tiles in tile group in the tile group header may be conditioned on this flag. This provides bit savings. Table 17 illustrates an example of syntax for a picture parameter set that may be used to signal tile structures that includes a flag which indicates that each tile group consists of only one tile.

TABLE 17

| | Descriptor |
|---|---|
| pic_parameter_set_rbsp( ) { | |
| pps_pic_parameter_set_id | ue(v) |
| pps_seq_parameter_set_id | ue(v) |
| transform_skip_enabled_flag | u(1) |
| single_tile_in_pic_flag | u(1) |
| if( !single_tile_in_pic_flag ) { | |
| one_tile_per_tile_group | u(1) |
| num_tile_columns_minus1 | ue(v) |
| num_tile_rows_minus1 | ue(v) |
| uniform_tile_spacing_flag | u(1) |
| if( !uniform_tile spacing_flag ) { | |
| for( i = 0; i < num_tile_columns_minus1; i++ ) | |
| tile_column_width_minus1[ i ] | ue(v) |
| for( i = 0; i < num_tile_rows_minus1; i++ ) | |
| tile_row_height_minus1[ i ] | ue(v) |
| } | |

TABLE 17-continued

| | Descriptor |
|---|---|
| loop_filter_across_tiles_enabled_flag | u(1) |
| } | |
| rbsp_trailing_bits( ) | |
| } | |

With respect to Table 17, the respective syntax elements may be based on the definitions provided above and following definitions:

transform_skip_enabled_flag equal to 1 specifies that transform_skip_flag may be present in the residual coding syntax. transform_skip_enabled_flag equal to 0 specifies that transform_skip_flag is not present in the residual coding syntax.

single_tile_in_pic_flag equal to 1 specifies that there is only one tile in each picture referring to the PPS. single_tile_in_pic_flag equal to 0 specifies that there is more than one tile in each picture referring to the PPS.

It is a requirement of bitstream conformance that the value of single_tile_in_pic_flag shall be the same for all PPSs that are activated within a CVS.

one_tile_per_tile_group equal to 1 specifies that each tile group includes one tile. one_tile_per_tile_group equal to 0 specifies that a tile group may include more than one tile.

In a variant:
one_tile_per_tile_group equal to 1 specifies that each tile group includes one tile. one_tile_per_tile group equal to 0 specifies that at least one tile group includes more than one tile.
tile_column_width_minus1 plus 1 specifies the width of the i-th tile column in units of coding tree blocks.
tile_row_height_minus1[i] plus 1 specifies the height of the i-th tile row in units of coding tree blocks.

With respect to Table 17, Table 18 illustrates an example syntax of a tile group header.

TABLE 18

|  | Descriptor |
|---|---|
| tile_group_header( ) { | |
|   tile_group_pic_parameter_set_id | ue(v) |
|   if(NumTilesInPic > 1 ) { | |
|     tile_group_address | u(v) |
|     if(!one_tile_per_tile group) | |
|       num_tiles_in_tile_group_minus1 | ue(v) |
|   } | |
|   ... | |
| } | |

With respect to Table 18, the respective syntax elements may be based on the definitions provided above and following definitions:

When present, the value of the tile group header syntax element tile_group_pic_parameter_set_id shall be the same in all tile group headers of a coded picture.

tile_group_pic_parameter_set_id specifies the value of pps_pic_parameter_set_id for the PPS in use. The value of tile_group_pic_parameter_set_id shall be in the range of 0 to 63, inclusive.

tile_group_address specifies the tile address of the first tile in the tile group. The length of tile_group_address is Ceil(Log 2 (NumTilesInPic)) bits. The value of tile_group_address shall be in the range of 0 to NumTilesInPic−1, inclusive, and the value of tile_group_address shall not be equal to the value of tile_group_address of any other coded tile group NAL unit of the same coded picture. When tile_group_address is not present it is inferred to be equal to 0.

num_tiles_in_tile_group_minus1 plus 1 specifies the number of tiles in the tile group. The value of num_tiles_in_tile_group_minus1 shall be in the range of 0 to NumTilesInPic−1, inclusive. When not present, the value of num_tiles_in_tile_group_minus1 is inferred to be equal to 0.

In a variant the syntax element for number of tiles in tile group (minus 1), num_tiles_in_tile_group_minus1, is signaled using a fixed length coding (i.e., u(v)) instead of variable length coding (i.e., ue(v)). This may allow easier parsing at the system level. As such num_tiles_in_tile_group_minus1 may be based on the following definition:

num_tiles_in_tile_group_minus1 plus 1 specifies the number of tiles in the tile group. The length of num_tiles_in_tile_group_minus1 is Ceil(Log 2 (NumTilesInPic)) bits. When not present, the value of num_tiles_in_tile_group_minus1 is inferred to be equal to 0.

In one example, the signaling of number of tiles in tile group may be conditioned based on the single_tile_in_pic_flag syntax element instead of on the NumTileInPic derived variable. Using a syntax element for signaling makes parsing of tile group header easier by not requiring derivation and use of additional variables for deciding if a syntax element is included or not. Table 19 illustrates an example syntax of a tile group header for this example.

TABLE 19

|  | Descriptor |
|---|---|
| tile_group_header( ) { | |
|   tile_group_pic_parameter_set_id | ue(v) |
|   if(!single_tile_in_pic_flag) { | |
|     tile_group_address | u(v) |
|     if(!one_tile_per_tile_group) | |
|       num_tiles_in_tile_group_minus1 | ue(v) |
|   } | |
|   ... | |
| } | |

With respect to Table 19, the respective syntax elements may be based on the definitions provided above.

Table 20 illustrates another example syntax of a tile group header.

TABLE 20

|  | Descriptor |
|---|---|
| tile_group_header( ) { | |
|   tile_group_pic_parameter_set_id | ue(v) |
|   if(!single_tile_in_pic_flag) { | |
|     tile_set_idx | ue(v) |
|   } | |
|   ... | |
| } | |

With respect to Table 20, the respective syntax elements may be based on the definitions provided above and following definitions.

tile_set_idx specifies the tile set index of this tile set. The length of tile_set_id syntax element is Ceil(Log 2(NumTileSets)) bits.

As described above, ITU-T H.265 defines signaling that enables motion-constrained tile sets, where a motion-constrained tile set may include a tile set for which inter-picture prediction dependencies are limited to the collocated tile sets in reference pictures. In one example, a flag which indicates whether a tile set is a MCTS may be signaled. Table 21 illustrates an example of syntax for a picture parameter set that may be used to signal tile structures that includes a flag which indicates whether a tile set is a MCTS may be signaled.

TABLE 21

|  | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|   } | |

TABLE 21-continued

| | Descriptor |
|---|---|
| tile_id_len_minus1 | ue(v) |
| explicit_tile_id_flag | u(1) |
| if( explicit_tile_id_flag ) | |
|   for( i = 0; i <= num_tile_rows_minus1; i++ ) | |
|     for( j = 0; j <= num_tile_columns_minus1; j++ ) | |
|       tile_id_val[ i ][ j ] | u(v) |
| if( !single_tile_in_pic_flag ) { | |
|   uniform_tile_spacing_flag | u(1) |
|   if( !uniform_tile_spacing_flag ) { | |
|     for( i = 0; i < num_tile_columns_minus1; i++ ) | |
|       tile_column_width_minus1[ i ] | ue(v) |
|     for( i = 0; i < num_tile_rows_minus1; i++ ) | |
|       tile_row_height_minus1[ i ] | ue(v) |
|   } | |
|   tile_set_flag | u(1) |
|   if( tile_set_flag ) { | |
|     num_tile_sets_in_pic_minus1 | ue(v) |
|     signaled_tile_set_index_flag | u(1) |
|     remaining_tiles_tileset_flag | u(1) |
|     for( i = 0; i <= num_tile_sets_in_pic_minus1; i++ ) { | |
|       if(!remaining_tiles_tileset_flag \|\| | |
|       (remaining_tiles_tileset_flag && i < num_tile_sets_in_pic_minus1) { | |
|         top_left_tile_id[ i ] | u(v) |
|         bottom_right_tile_id[ i ] | u(v) |
|       } | |
|       is_mets_flag | u(1) |
|       if(signaled_tile_set_index_flag) | |
|         tile_set_index[ i ] | u(v) |
|     } | |
|   } | |
|   loop_filter_across_tiles_enabled_flag | u(1) |
| } | |
| rbsp_trailing_bits( ) | |
| } | |

With respect to Table 21, the respective syntax elements may be based on the following definitions:

pps_pic_parameter_set_id identifies the PPS for reference by other syntax elements. The value of pps_pic_parameter_set_id shall be in the range of 0 to 63, inclusive.

pps_seq_parameter_set_id specifies the value of sps_seq_parameter_set_id for the active SPS. The value of pps_seq_parameter_set_id shall be in the range of 0 to 15, inclusive.

transform_skip_enabled_flag equal to 1 specifies that transform_skip_flag may be present in the residual coding syntax. transform_skip_enabled_flag equal to 0 specifies that transform_skip_flag is not present in the residual coding syntax.

single_tile_in_pic_flag equal to 1 specifies that there is only one tile in each picture referring to the PPS. single_tile_in_pic_flag equal to 0 specifies that there is more than one tile in each picture referring to the PPS. It is a requirement of bitstream conformance that the value of single_tile_in_pic_flag shall be the same for all PPSs that are activated within a CVS.

num_tile_columns_minus1 plus 1 specifies the number of tile columns partitioning the picture. num_tile_columns_minus1 shall be in the range of 0 to PicWidthInCtbsY−1, inclusive. When not present, the value of num_tile_columns_minus1 is inferred to be equal to 0.

num_tile_rows_minus1 plus 1 specifies the number of tile rows partitioning the picture. num_tile_rows_minus1 shall be in the range of 0 to PicHeightInCtbsY−1, inclusive. When not present, the value of num_tile_rows_minus1 is inferred to be equal to 0.

The variable NumTilesInPic is set equal to (num_tile_columns_minus1+1)*(num_tile_rows_minus1+1).

When single_tile_in_pic_flag is equal to 0, NumTilesInPic shall be greater than 0.

tile_id_len_minus1 plus 1 specifies the number of bits used to represent the syntax element tile_id_val[i][j], top_left_tile_id[i], and bottom_right_tile_id[i], when present, in the PPS. The value of tile_id_len_minus1 shall be in the range of Ceil(Log 2(NumTilesInPic)) to 15, inclusive.

explicit_tile_id_flag equal to 1 specifies that tile ID for each tile is explicitly signalled. explicit_tile_id_flag equal to 0 specifies that tile IDs are not explicitly signalled.

tile_id_val[i][j] specifies the tile ID of the tile of the i-th tile row and the j-th tile column. The length of tile_id_val[i][j] is tile_id_len_minus1+1 bits.

For any integer m in the range of 0 to num_tile_columns_minus1, inclusive, and any integer n in the range of 0 to num_tile_rows_minus1, inclusive, tile_id_val[i][j] shall not be equal to tile_id_val[m][n] when i is not equal to m or j is not equal to n, and tile_id_val[i][j] shall be less than tile_id_val[m][n] when j*(num_tile_columns_minus1+1)+i is less than n*(num_tile_columns_minus1+1)+m.

uniform_tile_spacing_flag equal to 1 specifies that tile column boundaries and likewise tile row boundaries are distributed uniformly across the picture. uniform_tile_spacing_flag equal to 0 specifies that tile column boundaries and likewise tile row boundaries are not distributed uniformly across the picture but signalled explicitly using the syntax elements tile_column_width_minus1[i] and tile_row_height_minus1[i]. When not present, the value of uniform_tile_spacing_flag is inferred to be equal to 1.

tile_column_width_minus1[i] plus 1 specifies the width of the i-th tile column in units of CTBs.

tile_row_height_minus1[i] plus 1 specifies the height of the i-th tile row in units of CTBs. The following variables are derived by invoking the CTB raster and tile scanning conversion process:

The list ColWidth[i] for i ranging from 0 to num_tile_columns_minus1, inclusive, specifying the width of the i-th tile column in units of CTBs, the list RowHeight[j] for j ranging from 0 to num_tile_rows_minus1, inclusive, specifying the height of the j-th tile row in units of CTBs, the list ColBd[i] for i ranging from 0 to num_tile_columns_minus1+1, inclusive, specifying the location of the i-th tile column boundary in units of CTBs, the list RowBd[j] for j ranging from 0 to num_tile_rows_minus1+1, inclusive, specifying the location of the j-th tile row boundary in units of CTBs, the list CtbAddrRsToTs[ctbAddrRs] for ctbAddrRs ranging from 0 to PicSizeInCtbsY−1, inclusive, specifying the conversion from a CTB address in the CTB raster scan of a picture to a CTB address in the tile scan, the list CtbAddrTsToRs[ctbAddrTs] for ctbAddrTs ranging from 0 to PicSizeInCtbsY−1, inclusive, specifying the conversion from a CTB address in the tile scan to a CTB address in the CTB raster scan of a picture, the list TileId[ctbAddrTs] for ctbAddrTs ranging from 0 to PicSizeInCtbsY−1, inclusive, specifying the conversion from a CTB address in tile scan to a tile ID, the list NumCtusInTile[tileIdx] for tileIdx ranging from 0 to PicSizeInCtbsY−1, inclusive, specifying the conversion from a tile index to the number of CTUs in the tile, the set TileIdToIdx[tileId] for a set of NumTilesInPic tileId values specifying the conversion from a tile ID to a tile index and the list FirstCtbAddrTs[tileIdx] for tileIdx ranging from 0 to NumTilesInPic−1, inclusive, specifying the conversion from a tile ID to the CTB address in tile scan of the first CTB in the tile, the lists ColumnWidthInLumaSamples[i] for i ranging from 0 to num_tile_columns_minus1, inclusive, specifying the width of the i-th tile column in units of luma samples, the list RowHeightInLumaSamples[j] for j ranging from 0 to num_tile_rows_minus1, inclusive, specifying the height of the j-th tile row in units of luma samples.

The values of ColumnWidthInLumaSamples[i] for i ranging from 0 to num_tile_columns_minus1, inclusive, and RowHeightInLumaSamples[j] for j ranging from 0 to num_tile_rows_minus1, inclusive, shall all be greater than 0.

tile_set_flag equal to 0 specifies that each tile is a tile set. tile_set_flag equal to 1 specifies that tile sets are explicitly specified by the syntax elements num_tile_sets_in_pic_minus1, top_left_tile_id[i], and bottom_right_tile_id[i].

In another example, tile_set_flag equal to 0 specifies that each picture is one tile.

num_tilesets_in_pic_minus1 plus 1 specifies the number of tile sets in the picture. The value of num_tilesets_in_pic_minus1 shall be in the range of 0 to (NumTilesInPic−1), inclusive. When not present num_tilesets_in_pic_minus1 is inferred to be equal to (NumTilesInPic−1). In another example when not present num_tilesets_in_pic_minus1 is inferred to be equal to 0.

signaled_tile_set_index_flag equal to 1 specifies that tile set index for each tile set is signalled. signaled_tile_set_index_flag equal to 0 specifies that tile set index is not signalled.

remaining_tiles_tileset_flag equal to 1 specifies that all the remaining tiles in the tile set except those explicitly specified in the (num_tilesets_in_pic_minus1-1) tile sets signaled by syntax elements top_left_tile_id[i], num_tile_rows_in_tileset_minus1[i], num_tile_columns_in_tileset_minus1[i] form the last tile set. remaining_tiles_tileset_flag equal to 0 specifies that all the num_tilesets_in_pic_minus1 tile sets are explicitly specified by signaling syntax elements top_left_tile_id[i], num_tile_rows_in_tileset_minus1[i], num_tile_columns_in_tileset_minus1[i].

top_left_tile_id[i] specifies the tile ID of the tile located at the top-left corner of the i-th tile set. The length of top_left_tile_id[i] is tile_id_len_minus1+1 bits. The value of top_left_tile_id[i] shall not be equal to the value of top_left_tile_id[j] for any i not equal to j.

bottom_right_tile_id[i] specifies the tile ID of the tile located at the bottom-right corner of the i-th tile set. The length of bottom_right_tile_id[i] is tile_id_len_minus1+1 bits.

The variables NumTileRowsInSlice[top_left_tile_id[i] ], NumTileColumnsInSlice[top_left_tile_id[i] ], and NumTilesInSlice[top_left_tile_id[i]] are derived as follows:

```
deltaTileIdx = TileIdToIdx[ bottom_right_tile_id[ i ] ] − TileIdToIdx[ top_left_tile_id[ i ] ]
NumTileRowsInSlice[ top_left_tile_id[ i ] ] = ( deltaTileIdx / ( num_tile_columns_minus1 + 1 ) ) + 1
NumTileColumnsInSlice[ top_left_tile_id[ i ] ] = ( deltaTileIdx % ( num_tile_columns_minus1 + 1 ) ) + 1
NumTilesInSlice[ top_left_tile_id[ i ] ] = NumTileRowsInSlice[ top_left_tile_id[ i ] ] * NumTileColumnsInSlice[ top_left_tile_id[ i ] ]
``` is_mcts_flag equal to 1 specifies that i-th tile set is a motion constrained tile set. is_mcts_flag equal to 0 specifies that i-th tile set is not a motion constrained tile set.

In one example, is_mcts_flag equal to 0 specifies that i-th tile set may or may not be a motion constrained tile set.

When a i-th tile set is a motion constrained tile set, it may have one or more of the constraints such as those described in Clause D.3.30 (i.e. Temporal motion-constrained tile sets SEI message) of ITU-T H.265. In one example, a motion constrained tile set may be called a temporal motion-constrained tile set.

tile_set_index[i] specifies the tile set index of the i-th tile set. The length of tile_set_index[i] syntax element is Ceil(Log 2(num_tile_sets_in_pic_minus1+1)) bits. When not present, tile_set_index[i] is inferred to be equal to i, for each i in the range of 0 to num_tile_sets_in_pic_minus1, inclusive.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

In one example, the corresponding portion of Table 21 may be modified as shown in Table 21A below:

TABLE 21A

| | |
|---|---|
| tile_set_flag | u(1) |
| if( tile_set_flag ) { | |
|   num_tile_sets_in_pic_minus1 | ue(v) |
|   signaled_tile_set_index_flag | u(1) |
|   remaining_tiles_tileset_flag | u(1) |
|   for( i = 0; i <= num_tile_sets_in_pic_minus1; i++ ) { | |
|     if(!remaining_tiles_tileset_flag \|\| | |
|     (remaining_tiles_tileset_flag && i < num_tile_sets_in_pic minus1) { | |
|       top_left_tile_id[ i ] | u(v) |
|       num_tile_rows_in_tileset_minus1[ i ] | u(v) |
|       num_tile_columns_in_tileset_minus1[ i ] | u(v) |
|     } | |
|     tile_set_index[ i ] | u(v) |
|   } | |
| } | |

Where respective syntax elements may have definitions as provided above. Further, with respect to Table 21, the syntax of the tile group header may be as shown in Table 21B below.

TABLE 21B

| | Descriptor |
|---|---|
| tile_group_header( ) { | |
|   tile_group_pic_parameter_set_id | ue(v) |
|   tile_set_idx | u(v) |
|   tile_group_type | ue(v) |
|   if ( tile_group_type != I ) { | |
|     log2_diff_ctu_max_bt_size | ue(v) |
|     if( sps_sbtmvp_enabled_flag) { | |
|       sbtmvp_size_override_flag | u(1) |
|       if( sbtmvp_size_override_flag ) | |
|         log2_sbtmvp_active_size_minus2 | u(3) |
|     } | |
|     if( sps_temporal_mvp_enabled_flag ) | |
|       tile_group_temporal_mvp_enabled_flag | u(1) |
|     if( tile group type == B ) | |
|       mvd_l1_zero_flag | u(1) |
|     if( tile_group_temporal_mvp_enabled_flag ) { | |
|       if( tile_group_type == B ) | |
|         collocated_from_l0_flag | u(1) |
|     } | |
|     six_minus_max_num_merge_cand | ue(v) |
|   } | |
|   dep_quant_enabled_flag | u(1) |
|   if( !dep_quant_enabled_flag ) | |
|     sign_data_hiding_enabled_flag | u(1) |
|   if(NumTilesInSlice[ tile_set_idx ] > 1) { | |
|     offset_len_minus1 | ue(v) |
|     for( i = 0; i < NumTilesInSlice[ tile_set_idx ]−1 ; i++ ) | |
|       entry_point_offset_minus1[ i ] | u(v) |
|   } | |
|   byte_alignment( ) | |
| } | |

With respect to Table 21B, the respective syntax elements may be based on the following semantics and definitions:

When present, the value of the tile group header syntax element tile_group_pic_parameter_set_id shall be the same in all tile group headers of a coded picture.

tile_group_pic_parameter_set_id specifies the value of pps_pic_parameter_set_id for the PPS in use. The value of tile_group_pic_parameter_set_id shall be in the range of 0 to 63, inclusive.

tile_set_idx specifies the tile set index of this tile set. The length of tile_set_idx syntax element is Ceil(Log 2(num_tile_sets_in_pic_minus1+1)) bits.

In another example tile_set_idx may be called tile_group_idx and have semantics as follows:

tile_group_idx specifies the tile set index of this tile set. The length of tile_group_idx syntax element is Ceil (Log 2(num_tile_sets_in_pic_minus1+1)) bits.

tile_group_type specifies the coding type of the tile group according to Table 21C.

TABLE 21C

| tile_group_type | Name of tile_group_type |
|---|---|
| 0 | B (B tile group) |
| 1 | P (P tile group) |
| 2 | I (I tile group) |

When nal_unit_type is equal to IRAP_NUT, i.e., the picture is an IRAP picture, tile_group_type shall be equal to 2.

log 2_diff_ctu_max_bt_size specifies the difference between the luma CTB size and the maximum luma size (width or height) of a coding block that can be split using a binary split. The value of log 2_diff_ctu_ max_bt_size shall be in the range of 0 to CtbLog 2SizeY−MinCbLog 2SizeY, inclusive.

When log 2_diff_ctu_max_bt_size is not present, the value of log 2_diff_ctu_max_bt_size is inferred to be equal to 2.

The variables MinQtLog 2SizeY, MaxBtLog 2SizeY, MinBtLog 2SizeY, MaxTtLog 2SizeY, MinTtLog 2SizeY, MaxBtSizeY, MinBtSizeY, MaxTtSizeY, MinTtSizeY and MaxMttDepth are derived as follows:

MinQtLog2SizeY = ( tile_group_type == I ) ? MinQtLog2SizeIntraY : MinQtLog2SizeInterY
MaxBtLog2SizeY = CtbLog2SizeY − log2_diff_ctu_max_bt_size
MinBtLog2SizeY = MinCbLog2SizeY
MaxTtLog2SizeY = ( tilegrouptype == I ) ? 5 : 6
MinTtLog2SizeY = MinCbLog2SizeY
MinQtSizeY = 1 << MinQtLog2SizeY
MaxBtSizeY = 1 << MaxBtLog2SizeY
MinBtSizeY = 1 << MinBtLog2SizeY
MaxTtSizeY = 1 << MaxTtLog2SizeY
MinTtSizeY = 1 << MinTtLog2SizeY
MaxMttDepth = ( tile_group_type == I ) ?
max_mtt_hierarchy_depth_intra_tile_groups :
  max_mtt_hierarchy_depth_inter_tile_groups sbtmvp_size_override_fag equal to 1 specifies that the syntax element log 2_sbtmvp_active_size_minus2 is present for the current tile group. sbtmvp_size_override_flag equal to 0 specifies that the syntax element log 2_atmvp_active_size_minus2 is not present and log 2_sbtmvp_size_active_minus2 is inferred to be equal to log 2_sbtmvp_default_size_minus2.

log 2_sbtmvp_active_size_minus2 plus 2 specifies the value of the subblock size that is used for deriving the motion parameters for the subblock-based TMVP of the current tile group. When log 2_sbtmvp_size_active_minus2 is is not present, it is inferred to be equal to log 2_sbtmvp_default_size_minus2. The variable is derived as follows:

Log 2SbtmvpSize=log 2_sbtmvp_size_active_minus2+2 tile_group_temporal_mvp_enabled_flag specifies whether temporal motion vector predictors can be used for inter prediction. If tile_group_temporal_mvp_enabled_flag is equal to 0, the syntax elements of the current picture shall be constrained such that no temporal motion vector predictor is used in decoding of the current picture. Otherwise (tile_group_temporal_mvp_enabled_flag is equal to 1), temporal motion vector predictors may be used in decoding of the current picture. When not present, the value of tile_group_temporal_mvp_enabled_flag is inferred to be equal to 0.

mvd_l1_zero_flag equal to 1 indicates that the mvd_coding(x0, y0, 1) syntax structure is not parsed and MvdL1 [x0][y0][compIdx] is set equal to 0 for compIdx= 0 . . . 1. mvd_l1_zero_flag equal to 0 indicates that the mvd_coding(x0, y0, 1) syntax structure is parsed.

collocated_from_l0_flag equal to 1 specifies that the collocated picture used for temporal motion vector prediction is derived from reference picture list 0. collocated_from_l0-flag equal to 0 specifies that the collocated picture used for temporal motion vector prediction is derived from reference picture list 1. When collocated_from_l0_flag is not present, it is inferred to be equal to 1.

six_minus_max_num_merge_cand specifies the maximum number of merging motion vector prediction (MVP) candidates supported in the tile group subtracted from 6. The maximum number of merging MVP candidates, MaxNumMergeCand is derived as follows:

MaxNumMergeCand=6−six_minus_max_num_merge_cand

The value of MaxNumMergeCand shall be in the range of 1 to 6, inclusive.

dep_quant_enabled_flag equal to 0 specifies that dependent quantization is disabled. dep_quant_enabled_flag equal to 1 specifies that dependent quantization is enabled.

sign_data_hiding_enabled_flag equal to 0 specifies that sign bit hiding is disabled. sign_data_hiding_enabled_flag equal to 1 specifies that sign bit hiding is enabled. When sign_data_hiding_enabled_flag is not present, it is inferred to be equal to 0.

offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The slice data that follow the slice header consists of NumTilesInSlice[tile_set_idx] subsets, with subset index values ranging from 0 to NumTilesInSlice[tile_set_idx]−1, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice segment data, subset k, with k in the range of 1 to NumTilesInSlice[tile_set_idx]−2, inclusive, consists of bytes firstByte[k] to lastByte[k], inclusive, of the coded slice data with firstByte[k] and lastByte[k] defined as:

lastByte[*k*]=firstByte[*k*]+entry_point_offset_minus1[*k*]

The last subset (with subset index equal to NumTilesInSlice[tile_set_idx]−1) consists of the remaining bytes of the coded slice data.

Each subset shall consist of all coded bits of all CTUs in the slice that are within the same tile.

Further with respect to Table 21, the syntax of tile_group_data( ) may be as shown in Table 21D.

TABLE 21D

| | Descriptor |
|---|---|
| tile_group_data( ) { | |
|   tileIdx = TopLeftTileId[ tile_set_idx ] | |
|   for( j = 0; j <= NumTileRowsInTileSetMinus1[ tile_set_idx ]; | |
|   j++, tileIdx += | |
|     (num_tile_columns_minus1 − | |
| NumTileColumnsInTileSetMinus1[ tile_set_idx ]) ) { | |
|     for( i = 0, ; i <= NumTileColumnsInTileSetMinus1[ | |
| tile_set_idx ]; | |
|       i++, tileIdx++ ) { | |
|       ctbAddrInTs = FirstCtbAddrTs[ CurrTileIdx ] | |
|       for( k = 0; k < NumCtusInTile[ CurrTileIdx ]; k++, | |
|       ctbAddrInTs++ ) { | |
|         CtbAddrInRs = CtbAddrTsToRs[ ctbAddrInTs ] | |
|         coding_tree_unit( ) | |
|       } | |
|       end_of_tile_one_bit  /* equal to 1 */ | ae(v) |
|       if( i < NumTileRowsInTileSetMinus1[ tile_set_idx ] \|\| | |
|         j < NumTileColumnsInTileSetMinus1[ | |
| tile_set_idx ] ) | |
|         byte_alignment( ) | |
|     } | |
|   } | |
| } | |

With respect to Table 21D, the respective syntax elements may be based on the following definitions:

end_of_tile_one_bit shall be equal to 1.

It should be noted that although the description herein uses the term slice and slice header, these terms may be replaced with the terms tile group and tile group header respectively. Additionally, the syntax element slice_type may be replaced by the syntax element tile_group_type. In this case, the conditions and other syntax elements which use slice_type may be changed to tile_group_type. Additionally, the variable NumTilesInSlice may be replaced by the syntax element NumTilesInTileGroup. Further, it should be noted that although the description of examples described herein uses the term tile set, one or more occurrences of tile set may be replaced with the term tile group. Further, one or more of the syntax elements with names that include words tile_set may be replaced with names that instead include words tile_group. Thus, one or more following changes of terms may be made Change "tile set" to "tile group".
Change "tile_set" to "tile_group"
Change NumTilesInSlice to NumTilesInTileGroup
Change NumTileRowsInTileSetMinus1 to NumTileRowsInTileGroupMinus1
Change NumTileColumnsInTileSetMinus1 to NumTileColumnsInTileGroupMinus1
Change tile_set_idx to tile_group_idx
Change num_tile_sets_in_pic_minus1 to num_tile_groups_in_pic_minus1
Change signaled_tile_set_index_flag to signaled_tile_group_index_flag or to explicit_tile_group_index_flag
Change remaining_tiles_tileset_flag to remaining_tiles_tilegroup_flag
Change tile_set_index to tile_group_index Table 22A and Table 22B illustrate an examples of syntax for a picture parameter set that may be used to signal tile structures according to techniques herein.

TABLE 22A

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|   } | |

TABLE 22A-continued

| | Descriptor |
|---|---|
| if( !single_tile_in_pic_flag ) { | |
|   uniform_tile_spacing_flag | u(1) |
|   if( !uniform_tile_spacing_flag ) { | |
|     for( i = 0; i < num_tile_columns_minus1; i++ ) | |
|       tile_column_width_minus1[ i ] | ue(v) |
|     for( i = 0; i < num_tile_rows_minus1; i++ ) | |
|       tile_row_height_minus1[ i ] | ue(v) |
|   } | |
|   one_tile_per_tile_group_flag | |
|   rect_tile_group_flag | u(1) |
|   if( rect_tile_group_flag ) { | |
|     num_tile_groups_in_pic_minus1 | ue(v) |
|     signalled_tile_group_index_length_minus1 | ue(v) |
|     signalled_tile_group_index_flag | u(1) |
|     remaining_tiles_tile_group_flag | u(1) |
|     for( i = 0; i <=num_tile_sets_in_pic_minus1; i++ ) { | |
|       if(!remaining_tiles_tile_group_flag \|\| | |
| (remaining_tiles_tile_group_flag && i < num_tile_sets_in_pic_minus1) { | |
|       top_left_tile_id[ i ] | u(v) |
|       if(!one_tile_per_tile_group_flag) | |
|         bottom_right_tile_id[ i ] | u(v) |
|       } | |
|       if(signalled_tile_group_index_flag) | |
|         tile_group_index[ i ] | u(v) |
|     } | |
|   } | |
|   loop_filter_across_tiles_enabled_flag | u(1) |
| } | |
| rbsp_trailing_bits( ) | |
| } | |

TABLE 22B

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|   } | |
|   if( !single_tile_in_pic_flag ) { | |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|   one_tile_per_tile_group_flag | |
|   rect_tile_group_flag | u(1) |
|   if( rect_tile_group_flag ) { | |
|     num_tile_groups_in_pic_minus1 | ue(v) |
|     signalled_tile_group_index_flag | u(1) |
|     if(signalled_tile_group_index_flag) | |
|       signalled_tile_group_index_length_minus1 | ue(v) |
|     remaining_tiles_tile_group_flag | u(1) |
|     for( i = 0; i <=num_tile_sets_in_pic_minus1; i++ ) { | |
|       if(!remaining_tiles_tile_group_flag \|\| | |
| (remaining_tiles_tile_group_flag && i < num_tile_sets_in_pic_minus1) { | |
|       top_left_tile_id[ i ] | u(v) |
|       if(!one_tile_per_tile_group_flag) | |
|         bottom_right_tile_id[ i ] | u(v) |
|       } | |
|       if(signalled_tile_group_index_flag) | |
|         tile_group_index[ i ] | u(v) |
|     } | |
|   } | |
|   loop_filter_across_tiles_enabled_flag | u(1) |
| } | |
| rbsp_trailing_bits( ) | |
| } | |

TABLE 22C

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|   } | |
|   if( !single_tile_in_pic_flag ) { | |
|     uniform_tile_spacing_flag | u(1) |
|     if( !uniform_tile_spacing_flag ) { | |
|       for( i = 0; i < num_tile_columns_minus1; i++) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|   one_tile_per_tile_group_flag | |
|   rect_tile_group_flag | u(1) |
|   if( rect_tile_group_flag ) { | |
|     num_tile_groups_in_pic_minus1 | ue(v) |
|     signalled_tile_group_index_flag | u(1) |
|     if(signalled_tile_group_index_flag) | |
|       signalled_tile_group_index_length_minus1 | ue(v) |
|     for( i = 0; i <num_tile_sets_in_pic_minus1; i++ ){ | |
|       top_left_tile_id[ i ] | u(v) |
|       if(!one_tile_per_tile_group_flag) | |
|         bottom_right_tile_id[ i ] | u(v) |
|       } | |
|       if(signalled_tile_group_index_flag) | |
|         tile_group_index[ i ] | u(v) |
|     } | |
|   } | |
|   loop_filter_across_tiles_enabled_flag | u(1) |
| } | |
| rbsp_trailing_bits( ) | |
| } | |

With respect to Table 22A, 22B, and 22C, the respective syntax elements may be based on the semantics and definitions provided above and the following semantics and definitions:

one-tile_per_tile_group equal to 1 specifies that each tile group that refers to this PPS includes one tile. one tile_per_tile_group equal to 0 specifies that a tile group that refers to this PPS may include more than one tile.

In another example:

one_tile_per_tile_group_flag equal to 1 specifies that each tile group that refers to the PPS contains exactly one tile. one_tile_per_tile_group_flag equal to 0 specifies that each tile group that refers to the PPS contains one or more tiles.

rect_tile_group_flag equal to 0 specifies that tiles within tile group are in raster scan order and tile group information is not signalled in PPS . . . rect_tile_group_flag equal to 1 specifies that rectangular tile group information is explicitly specified by the syntax elements num_tile_groups_in_pic_minus1, top_left_tile_id[i], and when present bottom_right_tile_id[i].

tile_group_flag equal to 0 specifies that each tile is a tile group. tile_group_flag equal to 1 specifies that tile groups are explicitly specified by the syntax elements num_tile_groups_in_pic_minus1, top_left_tile_id[i], and bottom_right_tile_id[i].

In another example:

tile_group_flag equal to 0 specifies that each tile is a tile group. tile_group_flag equal to 1 specifies that tile groups are explicitly specified by the syntax elements num_tile_groups_in_pic_minus1, top_left_tile_id[i], and bottom_right_tile_id[i].

signalled_tile_group_index_length_minus1 plus 1 specifies the number of bits used to represent the syntax element tile_group_index[i] when present, and tile_group_id. The value of signalled_tile_group_index_length_minus1 shall be in the range of 0 to 15, inclusive.

signalled_tile_group_index_flag equal to 1 specifies that tile set group for each tile group is signalled. signalled_tile_group_index_flag equal to 0 specifies that tile group index is not signalled.

num_tile_groups_in_pic_minus1 plus 1 specifies the number of tile groups in the picture. The value of num_tile_groups_in_pic_minus1 shall be in the range of 0 to (NumTilesInPic−1), inclusive. When not present num_tile_groups_in_pic_minus1 is inferred to be equal to (NumTilesInPic−1).

remaining_tiles_tile_group_flag equal to 1 specifies that all the remaining tiles in the tile set except those explicitly specified in the (num_tile_groups_in_pic_minus1-1) tile sets signaled by syntax elements top_left_tile_id[i], num_tile_rows_in_tile_group_minus1[i], num_tile_columns_in_ttile_group_minus1[i] form the last tile set. remaining_tiles_tile_group_flag equal to 0 specifies that all the num_tile_groups_in_pic_minus1tile sets are explicitly specified by signaling syntax elements top_left_tile_id[i], num_tile_rows_in_tile_group_minus1[i], num_tile_columns_in_tile_group_minus1[i].

top_left_tile_id[i] specifies the tile index of the tile located at the top-left corner of the i-th tile set. The value of top_left_tile_id[i] shall not be equal to the value of top_left_tile_id[j] for any i not equal to j.

bottom_right_tile_id[i] specifies the tile index of the tile located at the bottom-right corner of the i-th tile set. When one_tile_per_tile_group_flag is equal to 1 bottom_right_tile_id[i] is inferred to be equal to top_left_tile_id[i].

The variable NumTilesInTileGroup[i], which specifies the number of tiles in the tile group, and related variables, are derived as follows:

```
deltaTileIdx[ i ]   = bottom_right_tile_id[ i ] – top_right_tile_id[ i ]
NumTileRowsInTileGroupMinus1[ i ]   = ( deltaTileIdx[ i ] / (
num_tile_columns_minus1 + 1 ) )
NumTileColumnsInTileGroupMinus1[ i ]   =
( deltaTileIdx[ i ] % ( num_tile_columns_minus1 + 1 ) )
NumTilesInTileGroup[ i ]   = numTileRows[ i ] * numTileColumns[ i ]
``` tile_group_index[i] specifies the tile group index of the i-th tile group. The length of tile_group_index[i] syntax element is signalled_tile_set_index_length_minus1+1 bits. When not present, tile_group_index[i] is inferred to be equal to i, for each i in the range of 0 to num_tile_groups_in_pic_minus1, inclusive.

With respect to Table 22A, Table 22B, Table 22C, Table 23A and Table 23B illustrate example syntax of a tile group headers and Table 24 illustrates example syntax of tile group data.

TABLE 23A

|  | Descriptor |
|---|---|
| tile_group_header( ) { |  |
|   tile_group_pic_parameter_set_id | ue(v) |
|   if(!rect_tile_group_flag) { |  |
|     if( NumTilesInPic > 1 ) { |  |
|       tile_group_address | u(v) |
|       if(!one_tile_per_tile_group) |  |
|         num_tiles_in_tile_group_minus1 | ue(v) |
|     } |  |
|   } |  |
|   else |  |
|     tile_group_id | u(v) |
|   tile_group_type | ue(v) |
|   if ( tile_group_type  !=  I ) { |  |
|     log2_diff_ctu_max_bt_size | ue(v) |
|     if( sps_sbtmvp_enabled_flag ) { |  |
|       sbtmvp_size_override_flag | u(1) |
|       if( sbtmvp_size_override_flag ) |  |
|         log2_sbtmvp_active_size_minus2 | u(3) |
|     } |  |
|     if( sps_temporal_mvp_enabled_flag ) |  |
|       tile_group_temporal_mvp_enabled_flag | u(1) |
|     if( tile_group_type  ==  B ) |  |
|       mvd_l1_zero_flag | u(1) |
|     if( tile_group_temporal_mvp_enabled_flag ) { |  |
|       if( tile_group_type  ==  B ) |  |
|         collocated_from_l0_flag | u(1) |
|     } |  |
|     six_minus_max_num_merge_cand | ue(v) |
|   } |  |
|   dep_quant_enabled_flag | u(1) |
|   if( !dep_quant_enabled_flag ) |  |
|     sign_data_hiding_enabled_flag | u(1) |
|   if( rect_tile_group_flag ? (NumTilesInTileGroup[ tile_group_id ] > 1): |  |
|   (num_tiles_in_tile_group_minus1 > 0)) { |  |
|     offset_len_minus1 | ue(v) |
|     for( i = 0; i <  rect_tile_group_flag ? (NumTilesInTileGroup[ tile_group_id ]−1) :num_tiles_in_tile_group_minus1; i++ ) |  |
|       entry_point_offset_minus1[ i ] | u(v) |
|   } |  |
|   byte_alignment( ) |  |
| } |  |

TABLE 23B

|  | Descriptor |
|---|---|
| tile_group_header( ) { |  |
| ... |  |
|   if(!rect_tile_group_flag) { |  |
|     if( NumTilesInPic > 1 ) { |  |
|       tile_group_address | u(v) |
|       if(!one_tile_per_tile_group) |  |
|         num_tiles_in_tile_group_minus1 | ue(v) |
|     } |  |
|   } |  |
|   else |  |
|     tile_group_id | u(v) |
|   tile_group_pic_parameter_set_id | ue(v) |
|   tile_group_type | ue(v) |
|   if ( tile_group_type  !=  I ) { |  |
|   ... |  |

TABLE 24

|  | Descriptor |
|---|---|
| tile_group_data( ) {<br>  tileIdx = TopLeftTileId[ tile group id ] ~~tile_group_address~~<br>  for( j = 0; j <= NumTileRowsInTileGroupMinus1[ tile_group_id ]; j++, tileIdx<br>  +=(num_tile_columns_minus1 − NumTileColumnsInTileGroupMinus1[ tile_group_id ])  ) {<br>    for( i = 0 ; i <= NumTileColumnsInTileGroupMinus1[ tile_group_id ];<br>        i++, tileIdx++ ) {<br>      ctbAddrInTs = FirstCtbAddrTs[ tileIdx ]<br>      for( k = 0; k < NumCtusInTile[ tileIdx ]; k++, ctbAddrInTs++ ) {<br>        CtbAddrInRs = CtbAddrTsToRs[ ctbAddrInTs ]<br>        coding_tree_unit( )<br>      }<br>      end_of_tile_one_bit  /* equal to 1 */<br>      if( i < NumTileRowsInTileGroupMinus1[ tile_group_id ] ‖<br>        j < NumTileColumnsInTileGroupMinus1[ tile_group_id ])<br>        byte_alignment( )<br>    }<br>  }<br>} | <br><br><br><br><br><br><br><br><br><br>ae(v) |

With respect to Table 23A, Table 23B, and Table 24, the respective syntax elements may be based on the semantics and definitions provided above and the following semantics and definitions:

tile_group_id specifies the tile group ID of this tile group. When signalled_tile_group_index_flag is equal to 1 the length of tile_group_idx syntax element is signalled_tile_set_index_length_minus1+1 bits, otherwise the length of tile_group_idx is equal to Ceil(Log 2(num_tile_groups_in_pic_minus1+1)) bits.

In another example, tile_group_id specifies the tile group ID of this tile group. The length of tile_group_idx syntax element is signalled_tile_set_index_length_minus1+1 bits.

offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The slice data that follow the slice header consists of rect_tile_group_flag? (NumTilesInTileGroup[tile_group_id]−1): num_tiles_in_tile_group_minus1+1 subsets, with subset index values ranging from 0 to rect_tile_group_flag? (NumTilesInTileGroup[tile_group_id]−1):num_tiles_in_tile_group_minus1, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice segment data, subset k, with k in the range of 1 to rect_tile_group_flag? (NumTilesInTileGroup[tile_group_id]−2): (num_tiles_in_tile_group_minus1−1), inclusive, consists of bytes firstByte[k] to lastByte[k], inclusive, of the coded slice data with firstByte[k] and lastByte[k] defined as:

lastByte[k]=firstByte[k]+entry_point_offset_minus1 [k]

The last subset (with subset index equal to rect_tile_group_flag?(NumTilesInSliceNumTilesInTileGrpup [tile_groupset_idx]−1): num_tiles_in_tile_group_minus1) consists of the remaining bytes of the coded slice data.

With respect to Tables 22A-24, in one example, a CTB raster and tile scanning process may be as follows:

The list ColWidth[i] for i ranging from 0 to num_tile_columns_minus1, inclusive, specifying the width of the i-th tile column in units of CTBs, is derived as follows:

```
if( uniform_tile_spacing_flag )
  for( i = 0; i  <=  num_tile_columns_minus1; i++ )
    ColWidth[ i ] = ( ( i + 1 ) * PicWidthInCtbsY ) /
      ( num_tile_columns_minus1 + 1 ) − ( i * PicWidthInCtbsY ) /
      ( num_tile_columns_minus1 + 1 )
else {
  ColWidth[ num_tile_columns_minus1 ] = PicWidthInCtbsY
  for( i = 0; i < num_tile_columns_minus1; i++ ) {
    ColWidth[ i ] = tile_column_width_minus1[ i ] + 1
    ColWidth[ num_tile_columns_minus1 ]  −=  ColWidth[ i ]
  }
}
```

The list RowHeight[j] for j ranging from 0 to num_tile_rows_minus1, inclusive, specifying the height of the j-th tile row in units of CTBs, is derived as follows:

```
if( uniform_tile_spacing_flag )
  for( j = 0; j  <=  num_tile_rows_minus1; j++ )
    RowHeight[ j ] = ( ( j + 1 ) * PicHeightInCtbsY ) /
      ( num_tile_rows_minus1 + 1 ) − ( j * PicHeightInCtbsY ) /
      ( num_tile_rows_minus1 + 1 )
else {
  RowHeight[ num_tile_rows_minus1 ] = PicHeightInCtbsY
  for( j = 0; j < num_tile_rows_minus1; j++ ) {
    RowHeight[ j ] = tile_row_height_minus1[ j ] + 1
    RowHeight[ num_tile_rows_minus1 ]  −=  RowHeight[ j ]
  }
}
```

The list ColBd[i] for i ranging from 0 to num_tile_columns_minus1+1, inclusive, specifying the location of the i-th tile column boundary in units of CTBs, is derived as follows:

```
for( ColBd[ 0 ] = 0, i = 0; i  <=  num_tile_columns_minus1; i++ )
    ColBd[ i + 1 ] = ColBd[ i ] + ColWidth[ i ]
```

The list RowBd[j] for j ranging from 0 to num_tile_rows_minus1+1, inclusive, specifying the location of the j-th tile row boundary in units of CTBs, is derived as follows:

```
for( RowBd[ 0 ] = 0, j = 0; j  <=  num_tile_rows_minus1; j++ )
    RowBd[ j + 1 ] = RowBd[ j ] + RowHeight[ j ]
```

The list CtbAddrRsToTs[ctbAddrRs] for ctbAddrRs ranging from 0 to PicSizeInCtbsY−1, inclusive, specifying the conversion from a CTB address in CTB raster scan of a picture to a CTB address in tile scan, is derived as follows:

```
for( ctbAddrRs = 0; ctbAddrRs < PicSizeInCtbsY; ctbAddrRs++ ) {
    tbX = ctbAddrRs % PicWidthInCtbsY
    tbY = ctbAddrRs / PicWidthInCtbsY
    for( i = 0; i  <=  num_tile_columns_minus1; i++ )
        if( tbX  >=   ColBd[ i ] )
            tileX = i
    for( j = 0; j  <=  num_tile_rows_minus1; j++ )
        if( tbY  >=   RowBd[ j ] )
            tileY = j
    CtbAddrRsToTs[ ctbAddrRs ] = 0
    for( i = 0; i < tileX; i++ )
        CtbAddrRsToTs[ ctbAddrRs ]   +=   RowHeight[ tileY ] *
ColWidth[ i ]
    for( j = 0; j < tileY; j++ )
        CtbAddrRsToTs[ ctbAddrRs ]   +=   PicWidthInCtbsY *
RowHeight[ j ]
    CtbAddrRsToTs[ ctbAddrRs ] +=
( tbY − RowBd[ tileY ] ) * ColWidth[ tileX ] + tbX − ColBd[ tileX ]
}
```

The list CtbAddrTsToRs[ctbAddrTs] for ctbAddrTs ranging from 0 to PicSizeInCtbsY−1, inclusive, specifying the conversion from a CTB address in tile scan to a CTB address in CTB raster scan of a picture, is derived as follows:

```
for( ctbAddrRs = 0; ctbAddrRs < PicSizeInCtbsY; ctbAddrRs++ )
    CtbAddrTsToRs[ CtbAddrRsToTs[ ctbAddrRs ] ] = ctbAddrRs
```

The list TileId[ctbAddrTs] for ctbAddrTs ranging from 0 to PicSizeInCtbsY−1, inclusive, specifying the conversion from a CTB address in tile scan to a tile ID, is derived as follows:

```
for( j = 0, tileIdx = 0; j  <=  num_tile_rows_minus1; j++ )
    for( i = 0; i  <=  num_tile_columns_minus1; i++, tileIdx++ )
        for( y = RowBd[ j ]; y < RowBd[ j + 1 ]; y++ )
            for( x = ColBd[ i ]; x < ColBd[ i + 1 ]; x++ ) {
                TileId[ CtbAddrRsToTs[ y * PicWidthInCtbsY+ x ] ] = tileIdx
                RemTiles[tileIdx] = 1
            }
```

The list NumCtusInTile[tileIdx] for tileIdx ranging from 0 to PicSizeInCtbsY−1, inclusive, specifying the conversion from a tile index to the number of CTUs in the tile, is derived as follows:

```
for( j = 0, tileIdx = 0; j  <=  num_tile_rows_minus1; j++ )
    for( i = 0; i  <=  num_tile_columns_minus1; i++, tileIdx++ )
        NumCtusInTile[ tileIdx ] = ColWidth[ i ] * RowHeight[ j ]
```

The set TileIdToIdx[tileId] for a set of NumTilesInPic tileId values specifying the conversion from a tile ID to a tile index and the list FirstCtbAddrTs[tileIdx] for tileIdx ranging from 0 to NumTilesInPic−1, inclusive, specifying the conversion from a tile ID to the CTB address in tile scan of the first CTB in the tile are derived as follows:

```
for( ctbAddrTs = 0, tileIdx = 0, tileStartFlag = 1; ctbAddrTs <
PicSizeInCtbsY; ctbAddrTs++ ) {
    if( tileStartFlag ) {
        TileIdToIdx[ TileId[ ctbAddrTs ] ] = tileIdx
        FirstCtbAddrTs[ tileIdx ] = ctbAddrTs
        tileStartFlag = 0
    }
    tileEndFlag = ctbAddrTs  ==  PicSizeInCtbsY − 1  | |  TileId[
ctbAddrTs + 1 ]  != TileId[ ctbAddrTs ]
    if( tileEndFlag ) {
        tileIdx++
        tileStartFlag = 1
    }
}
for( l = 0; l  < num_tile_groups_in_pic_minus1; l++ ) {
    for( k = 0, tileIdx= top_left_tile_id[l]; k <=
NumTileRowsInTileGroupMinus1[ l ]; k++, tileIdx   +=
(num_tile_columns_minus1 − NumTileColumnsInTileGroupMinus1[
l ]) )
        for( i = 0; i  <=  numTileColumnsMinus1 [ l ]; i++, tileIdx++ ){
            RemTiles [tileIdx]=0
        }
    TopLeftTileId[ l ]= top_left_tile_id[ l ];
    BottomRightTileId[ l ]= bottom_right_tile_id[ l ];
    dtlId = TileIdToIdx[ bottom_right_tile_id[ i ] ] − TileIdToIdx[
top_left_tile_id[ i ]
    NumTileRowsInTileGroupMinus1[ l ] = ( dtlId / (
num_tile_columns_minus1 + 1 ) )
    NumTileColumnsInTileGroupMinus1[ l ] = ( dtlId % (
num_tile_columns_minus1 + 1 ) )
    NumTilesInSlice[ l ] = (NumTileRowsInTileGroupMinus1[ l ]+1)*
( NumTileColumnsInTileGroupMinus1 [ l ]+1)
}
for(i=0,
tlId=(num_tile_columns_minus1+1)*(num_tile_rows_minus1+1),
brId = −1; i<(num_tile_columns_minus1+1)*(
num_tile_rows_minus1+1);i++){
    if(RemTiles[i]){
        if(i<tlId) tlId=i;
        if(i>brId) brId=i;
    }
}
TopLeftTileId[ num_tile_groups_in_pic_minus1 ]= tlId;
BottomRightTileId[ num_tile_groups_in_pic_minus1 ]= brId;
NumTileRowsInTileGroupMinus1[
num_tile_groups_in_pic_minus1 ]=(brId−tlId)/(
num_tile_columns_minus1 + 1);
NumTileColumnsInTileGroupMinus1[
num_tile_groups_in_pic_minus1 ]=(brId−tlId)%(
num_tile_columns_minus1 + 1);
NumTilesInTileGroup[ num_tile_groups_in_pic_minus1 ] =
(InTileGroupNumTileRowsInTileGroupMinus1[
num_tile_groups_in_pic_minus1 ]+1)*
(NumTileColumnsInTileGroupMinus1
[ num_tile_sets_in_pic_minus1 ]+1)
```

The values of ColumnWidthInLumaSamples[ i ], specifying the width of the i-th tile column in units of luma samples, are set equal to ColWidth[ i ] << CtbLog2SizeY for i ranging from 0 to num_tile_columns_minus1, inclusive.

The values of RowHeightInLumaSamples[ j ], specifying the height of the j-th tile row in units of luma samples, are set equal to RowHeight[ j ] << CtbLog2SizeY for j ranging from 0 to num_tile_rows_minus1, inclusive.

Table 25 illustrates an examples of syntax for a picture parameter set that may be used to signal tile structures according to techniques herein.

TABLE 25

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ) | |
|       rect_tile_group_flag | u(1) |
|     if( rect_tile_group_flag && | |
|     !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0) | |
|           top_left_tile_idx[ i ] | u(v) |
|         bottom_right_tile_idx[ i ] | u(v) |
|       } | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|     } | |
|   } | |
|   rbsp_trailing_bits( ) | |
| } | |

With respect to Table 25, the respective syntax elements may be based on the semantics and definitions provided above and the following semantics and definitions:

single_tile_per_tile_group equal to 1 specifies that each tile group that refers to this PPS includes one tile. single_tile_per_tile_group equal to 0 specifies that a tile group that refers to this PPS may include more than one tile. When not present single_tile_per_tile_group is inferred to be equal to 1.

rect_tile_group_flag equal to 0 specifies that tiles within each tile group are in raster scan order and the tile group information is not signalled in PPS. rect_tile_group_flag equal to 1 specifies that tiles within each tile group cover a rectangular region of the picture and the tile group information is signalled in the PPS. When single_tile_per_tile_group_flag is equal to 1 rect_tile_group_flag is inferred to be equal to 1.

num_tile_groups_in_pic_minus1 plus 1 specifies the number of tile groups in each picture referring to the PPS. The value of num_tile_groups_in_pic_minus1 shall be in the range of 0 to (NumTilesInPic−1), inclusive. When not present and rect_tile_group_flag is equal to 1, the value of num_tile_groups_in_pic_minus1 is inferred to be equal to (NumTilesInPic−1).

top_left_tile_idx[i] specifies the tile index of the tile located at the top-left corner of the i-th tile group. The value of top_left_tile_idx[i] shall not be equal to the value of top_left_tile_idx[j] for any i not equal to j. When not present, and when rect_tile_group_flag is equal to 1, top_left_tile_idx[i] is inferred to be equal to i. The length of the top_left_tile_idx[i] syntax element is Ceil(Log 2(NumTilesInPic) bits.

bottom_right_tile_idx[i] specifies the tile index of the tile located at the bottom-right corner of the i-th tile group. When single_tile_per_tile_group_flag is equal to 1 bottom_right_tile_idx[i] is inferred to be equal to top_left_tile_idx[i]. The length of the bottom_right_tile_idx[i] syntax element is Ceil(Log 2(NumTilesInPic)) bits.

It is a requirement of bitstream conformance that any particular tile shall only be included in one tile group.

The variable NumTilesInTileGroup[i], which specifies the number of tiles in the tile group, and related variables, are derived as follows:

```
deltaTileIdx[ i ] = bottom_right_tile_idx[ i ] −
top_left_tile_idx[ i ]
NumTileRowsInTileGroupMinus1[ i ] = ( deltaTileIdx[ i ] /
( num_tile_columns_minus1 + 1 ) )
NumTileColumnsInTileGroupMinus1[ i ] =
( deltaTileIdx[ i ] % ( num_tile_columns_minus1 + 1 ) )
NumTilesInTileGroup[ i ] = ( NumTileRowsInTileGroupMinus1[ i ] +
1 ) * ( NumTileColumnsInTileGroupMinus1[ i ] + 1 )
``` signalled_tile_group_id_flag equal to 1 specifies that the tile group ID for each tile group is signalled. signalled_tile_group_index_flag equal to 0 specifies that tile group IDs are not signalled. When rect_tile_group_flag is equal to 0, the value of signalled_tile_group_index_flag is inferred to be equal to 0.

signalled_tile_group_id_length_minus1 plus 1 specifies the number of bits used to represent the syntax element tile_group_id[i] when present, and the syntax element tile_group_address in tile group headers when rect_tile_group_flag is equal to 1. The value of signalled_tile_group_index_length_minus1 shall be in the range of 0 to 15, inclusive. When not present, and when rect_tile_group_flag is equal to 1, the value of signalled_tile_group_id_length_minus1 is inferred to be equal to Ceil(Log 2(num_tile_groups_in_pic_minus1+1))−1.

tile_group_id[i] specifies the tile group ID of the i-th tile group. The length of the tile_group_id[i] syntax element is signalled_tile_group_id_length_minus1+1 bits. When not present, and when rect_tile_group_flag is equal to 1, tile_group_id[i] is inferred to be equal to i, for each i in the range of 0 to num_tile_groups_in_pic_minus1, inclusive.

With respect to Table 25, Table 26 illustrate example syntax of a tile group headers and Table 27 illustrates example syntax of tile group data.

TABLE 26

| | Descriptor |
|---|---|
| tile_group_header( ) { | |
|   tile_group_pic_parameter_set_id | ue(v) |
|   if( rect_tile_group_flag \|\| NumTilesInPic > 1 ) | |
|     tile_group_address | u(v) |
|   if( !rect_tile_group_flag && | |
|   !single_tile_per_tile_group_flag ) | |
|     num_tiles_in_tile_group_minus1 | ue(v) |
|   tile_group_type | ue(v) |

TABLE 26-continued

| | Descriptor |
|---|---|
| if ( tile_group_type != I ) { | |
|   log2_diff_ctu_max_bt_size | ue(v) |
|   if( sps_sbtmvp_enabled_flag ) { | |
|     sbtmvp_size_override_flag | u(1) |
|     if( sbtmvp_size_override_flag ) | |
|       log2_sbtmvp_active_size_minus2 | u(3) |
|   } | |
|   if( sps_temporal_mvp_enabled_flag ) | |
|     tile_group_temporal_mvp_enabled_flag | u(1) |
|   if( tile_group_type == B ) | |
|     mvd_l1_zero_flag | u(1) |
|   if( tile_group_temporal_mvp_enabled_flag ) { | |
|     if( tile_group_type == B ) | |
|       collocated_from_l0_flag | u(1) |
|   } | |
|   six_minus_max_num_merge_cand | ue(v) |
| } | |
| dep_quant_enabled_flag | u(1) |
| if( !dep_quant_enabled_flag ) | |
|   sign_data_hiding_enabled_flag | u(1) |
| NumTilesInCurrTileGroup = rect_tile_group_flag ? NumTilesInTileGroup[ tile_group_address ] : ( num_tiles_in_tile_group_minus1 + 1 ) | |
| if( NumTilesInCurrTileGroup > 1) { | |
|   offset_len_minus1 | ue(v) |
|   for( i = 0; i < NumTilesInCurrTileGroup − 1; i++) | |
|     entry_point_offset_minus1[ i ] | u(v) |
| } | |
| byte_alignment( ) | |
| } | |

TABLE 27

| | Descriptor |
|---|---|
| tile_group_data( ) { | |
|   for( i = 0; i < NumTilesInCurrTileGroup; i++ ) { | |
|     ctbAddrInTs = FirstCtbAddrTs[ tileIdx ] | |
|     for( j = 0; j < NumCtusInTile[ TgTileIdx[ i ] ]; j++, ctbAddrInTs++ ) { | |
|       CtbAddrInRs = CtbAddrTsToRs[ ctbAddrInTs ] | |
|       coding_tree_unit( ) | |
|     } | |
|     end_of_tile_one_bit  /* equal to 1 */ | ae(v) |
|     if( i < NumTilesInCurrTileGroup − 1 ) | |
|       byte_alignment( ) | |
|   } | |
| } | |

With respect to Table 26 and Table 27, the respective syntax elements may be based on the semantics and definitions provided above and the following semantics and definitions:

tile_group_address specifies the tile address of the first tile in the tile group.

If rect_tile_group_flag is equal to 0, the following applies:
The tile address is the tile ID as specified by Equation 6-7.
The length of tile_group_address is Ceil(Log 2 (NumTilesInPic)) bits.
The value of tile_group_address shall be in the range of 0 to NumTilesInPic−1, inclusive. Otherwise (rect_tile_group_flag is equal to 1), the following applies:
The tile address is the tile group ID of the tile group.
The length of tile_group_address is signalled_tile_group_index_length_minus1+1 bits.
If signalled_tile_group_id_flag is equal to 0, the value of tile_group_address shall be in the range of 0 to num_tile_groups_in_pic_minus1, inclusive. Otherwise, the value of tile_group_address shall be in the range of 0 to $2^{(signalled\_tile\_group\_index\_length\_minus1+1)}-1$, inclusive.

The value of tile_group_address shall not be equal to the value of tile_group_address of any other coded tile group NAL unit of the same coded picture.

When not present, the value of tile_group_address is inferred to be equal to 0.

The variable NumTilesInTileGroup, which specifies the number of tiles in the tile group, and TgTileIdx[i], which specifies the tile index of the i-th tile in the tile group, are derived as follows:

```
if( rect_tile_group_flag ) {
  tileGroupIdx = 0
  while( tile_group_address != tile_group_id[ tileGroupIdx ] )
    tileGroupIdx++
  NumTilesInCurrTileGroup = NumTilesInTileGroup[ tileGroupIdx ]
  tileIdx = top_left_tile_idx[ tileGroupIdx ]
  for( j = 0, tIdx = 0; j < (NumTileRowsInGroupMinus1[ tileGroupIdx ] + 1); j++, tileIdx += num_tile_columns_minus1 + 1 ) {
    for( i = 0, currTileIdx = tileIdx; i < (NumTileColumnsInGroupMinus1[ tileGroupIdx ] + 1); i++, currTileIdx++, tIdx++ )
      TgTileIdx[ tIdx ] = currTileIdx
} } else {
  NumTilesInCurrTileGroup = num_tiles_in_tile_group_minus1 + 1
  TgTileIdx[ 0 ] = tile_group_address
  for( i = 1; i < NumTilesInCurrTileGroup; i++ )
    TgTileIdx[ i ] = TgTileIdx[ i − 1 ] + 1
}
``` num_tiles_in_tile_group_minus1 plus 1 specifies the number of tiles in the tile group. The value of num_tiles_in_tile_group_minus1 shall be in the range of 0 to NumTilesInPic−1, inclusive. When not present, the value of num_tiles_in_tile_group_minus1 is inferred to be equal to 0 if single_tile_per_tile_group_flag is equal to 1. When not present, the value of num_tiles_in_tile_group_minus1 is inferred to be equal to NumTilesInTileGroup[tile_group_address]−1 when rect_tile_group_flag is equal to 1 and single_tile_per_tile_group_flag is equal to 0.

In another example the inference rules for num_tiles_in_tile_group_minus1 may be specified as follows:

When not present, num_tiles_in_tile_group_minus1 is inferred to have value as follows:
If single_tile_per_tile_group_flag is equal to 1, num_tiles_in_tile_group_minus1 is inferred to be equal to 0.
If single_tile_per_tile_group_flag is equal to 0 and rect_tile_group_flag is equal to 1, num_tiles_in_tile_group_minus1 is inferred to be equal to NumTilesInTileGroup[tile_group_address]−1.

offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The slice data that follow the slice header consists of NumTilesInCurrTileGroup subsets, with subset index values ranging from 0 to NumTilesInCurrTileGroup−1, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice segment data, subset k, with k in the range of 1 to NumTilesInCurrTileGroup−2, inclusive, consists of bytes firstByte[k] to lastByte[k], inclusive, of the coded slice data with firstByte[k] and lastByte[k] defined as:

lastByte[$k$]=firstByte[$k$]+entry_point_offset_minus1[$k$]

The last subset (with subset index equal to NumTilesInCurrTileGroup−1 consists of the remaining bytes of the coded slice data.

With respect to Tables 25-27, in one example, a CTB raster and tile scanning process may be as follows:

The list ColWidth[i] for i ranging from 0 to num_tile_columns_minus1, inclusive, specifying the width of the i-th tile column in units of CTBs, is derived as follows:

```
if( uniform_tile_spacing_flag )
  for( i = 0; i  <=  num_tile_columns_minus1; i++ )
    ColWidth[ i ] = ( ( i + 1 ) * PicWidthInCtbsY ) /
      ( num_tile_columns_minus1 + 1 ) − ( i * PicWidthInCtbsY ) /
      ( num_tile_columns_minus1 + 1 )
else {
  ColWidth[ num_tile_columns_minus1 ] = PicWidthInCtbsY
  for( i = 0; i < num_tile_columns_minus1; i++ ) {
    ColWidth[ i ] = tile_column_width_minus1[ i ] + 1
    ColWidth[ num_tile_columns_minus1 ]  −=  ColWidth[ i ]
  }
}
```

The list RowHeight[j] for j ranging from 0 to num_tile_rows_minus1, inclusive, specifying the height of the j-th tile row in units of CTBs, is derived as follows:

```
if( uniform_tile_spacing_flag )
  for ( j = 0; j  <=  num_tile_rows_minus1; j++ )
    RowHeight[ j ] = ( ( j + 1 ) * PicHeightInCtbsY ) /
      ( num_tile_rows_minus1 + 1 ) − ( j * PicHeightInCtbsY ) /
      ( num_tile_rows_minus1 + 1 )
else {
  RowHeight[ num_tile_rows_minus1 ] = PicHeightInCtbsY
  for( j = 0; j < num_tile_rows_minus1; j++ ) {
    RowHeight[ j ] = tile_row_height_minus1[ j ] + 1
    RowHeight[ num_tile_rows_minus1 ]  −=  RowHeight[ j ]
  }
}
```

The list ColBd[i] for i ranging from 0 to num_tile_columns_minus1+1, inclusive, specifying the location of the i-th tile column boundary in units of CTBs, is derived as follows:

```
for( ColBd[ 0 ] = 0, i = 0; i  <=  num_tile_columns_minus1; i++ )
  ColBd[ i + 1 ] = ColBd[ i ] + ColWidth[ i ]
```

The list RowBd[j] for j ranging from 0 to num_tile_rows_minus1+1, inclusive, specifying the location of the j-th tile row boundary in units of CTBs, is derived as follows:

```
for( RowBd[ 0 ] = 0, j = 0; j  <=  num_tile_rows_minus1; j++ )
  RowBd[ j + 1 ] = RowBd[ j ] + RowHeight[ j ]
```

The list CtbAddrRsToTs[ctbAddrRs] for ctbAddrRs ranging from 0 to PicSizeInCtbsY−1, inclusive, specifying the conversion from a CTB address in CTB raster scan of a picture to a CTB address in tile scan, is derived as follows:

```
for( ctbAddrRs = 0; ctbAddrRs < PicSizeInCtbsY; ctbAddrRs++ ) {
  tbX = ctbAddrRs % PicWidthInCtbsY
  tbY = ctbAddrRs / PicWidthInCtbsY
  for( i = 0; i  <=  num_tile_columns_minus1; i++ )
    if( tbX  >=   ColBd[ i ] )
      tileX = i
  for( j = 0; j  <=  num_tile_rows_minus1; j++ )
    if( tbY  >=   RowBd[ j ] )
      tileY = j
  CtbAddrRsToTs[ ctbAddrRs ] = 0
  for( i = 0; i < tileX; i++ )
    CtbAddrRsToTs[ ctbAddrRs ]  +=  RowHeight[ tileY ] *
      ColWidth[ i ]
  for( j = 0; j < tileY; j++ )
    CtbAddrRsToTs[ ctbAddrRs ]  +=  PicWidthInCtbsY *
      RowHeight[ j ]
  CtbAddrRsToTs[ ctbAddrRs ]  +=
    ( tbY − RowBd[ tileY ] ) * ColWidth[ tileX ] + tbX − ColBd[ tileX ]
}
```

The list CtbAddrTsToRs[ctbAddrTs] for ctbAddrTs ranging from 0 to PicSizeInCtbsY−1, inclusive, specifying the conversion from a CTB address in tile scan to a CTB address in CTB raster scan of a picture, is derived as follows:

```
for( ctbAddrRs = 0; ctbAddrRs < PicSizeInCtbsY; ctbAddrRs++ )
  CtbAddrTsToRs[ CtbAddrRsToTs[ ctbAddrRs ] ] = ctbAddrRs
```

The list TileId[ctbAddrTs] for ctbAddrTs ranging from 0 to PicSizeInCtbsY−1, inclusive, specifying the conversion from a CTB address in tile scan to a tile ID, is derived as follows:

```
for( j = 0, tileIdx = 0; j  <=  num_tile_rows_minus1; j++ )
for( i = 0; i  <=  num_tile_columns_minus1; i++, tileIdx++ )
  for( y = RowBd[ j ]; y < RowBd[ j + 1 ]; y++ )
    for( x = ColBd[ i ]; x < ColBd[ i + 1 ]; x++ ) {
      TileId[ CtbAddrRsToTs[ y * PicWidthInCtbsY+ x ] ] = tileIdx
}
```

The list NumCtusInTile[tileIdx] for tileIdx ranging from 0 to PicSizeInCtbsY−1, inclusive, specifying the conversion from a tile index to the number of CTUs in the tile, is derived as follows:

```
for( j = 0, tileIdx = 0; j  <=  num_tile_rows_minus1; j++ )
  for( i = 0; i  <=  num_tile_columns_minus1; i++, tileIdx++ )
    NumCtusInTile[ tileIdx ] = ColWidth[ i ] * RowHeight[ j ]
```

The set TileIdToIdx[tileId] for a set of NumTilesInPic tileId values specifying the conversion from a tile ID to a tile index and the list FirstCtbAddrTs[tileIdx] for tileIdx ranging from 0 to NumTilesInPic−1, inclusive, specifying the conversion from a tile ID to the CTB address in tile scan of the first CTB in the tile are derived as follows:

```
for( ctbAddrTs = 0, tileIdx = 0, tileStartFlag = 1; ctbAddrTs <
PicSizeInCtbsY; ctbAddrTs++ ) {
   if( tileStartFlag ) {
      TileIdToIdx[ TileId[ ctbAddrTs ] ] = tileIdx
      FirstCtbAddrTs[ tileIdx ] = ctbAddrTs
      tileStartFlag = 0
   }
   tileEndFlag = ctbAddrTs  = =  PicSizeInCtbsY – 1  | |  TileId[
ctbAddrTs + 1 ]  != TileId[ ctbAddrTs ]
   if( tileEndFlag ) {
      tileIdx++
      tileStartFlag = 1
   }
}
```

The values of ColumnWidthInLumaSamples[i], specifying the width of the i-th tile column in units of luma samples, are set equal to ColWidth[i]<<CtbLog 2SizeY for i ranging from 0 to num_tile_columns_minus1, inclusive.

The values of RowHeightInLumaSamples[j], specifying the height of the j-th tile row in units of luma samples, are set equal to RowHeight[j]<<CtbLog 2SizeY for j ranging from 0 to num_tile_rows_minus1, inclusive.

In this manner, source device 102 represents an example of a device configured to signal a flag indicating tile sets are enabled in a bitstream, signal a syntax element indicating a number tile set columns partitioning a picture, and signal a syntax element indicating a number tile set rows partitioning a picture.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Data decapsulator 123 may be configured to receive and parse any of the example parameter sets described herein.

Video decoder 124 may include any device configured to receive a bitstream (e.g., a MCTS sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 9:
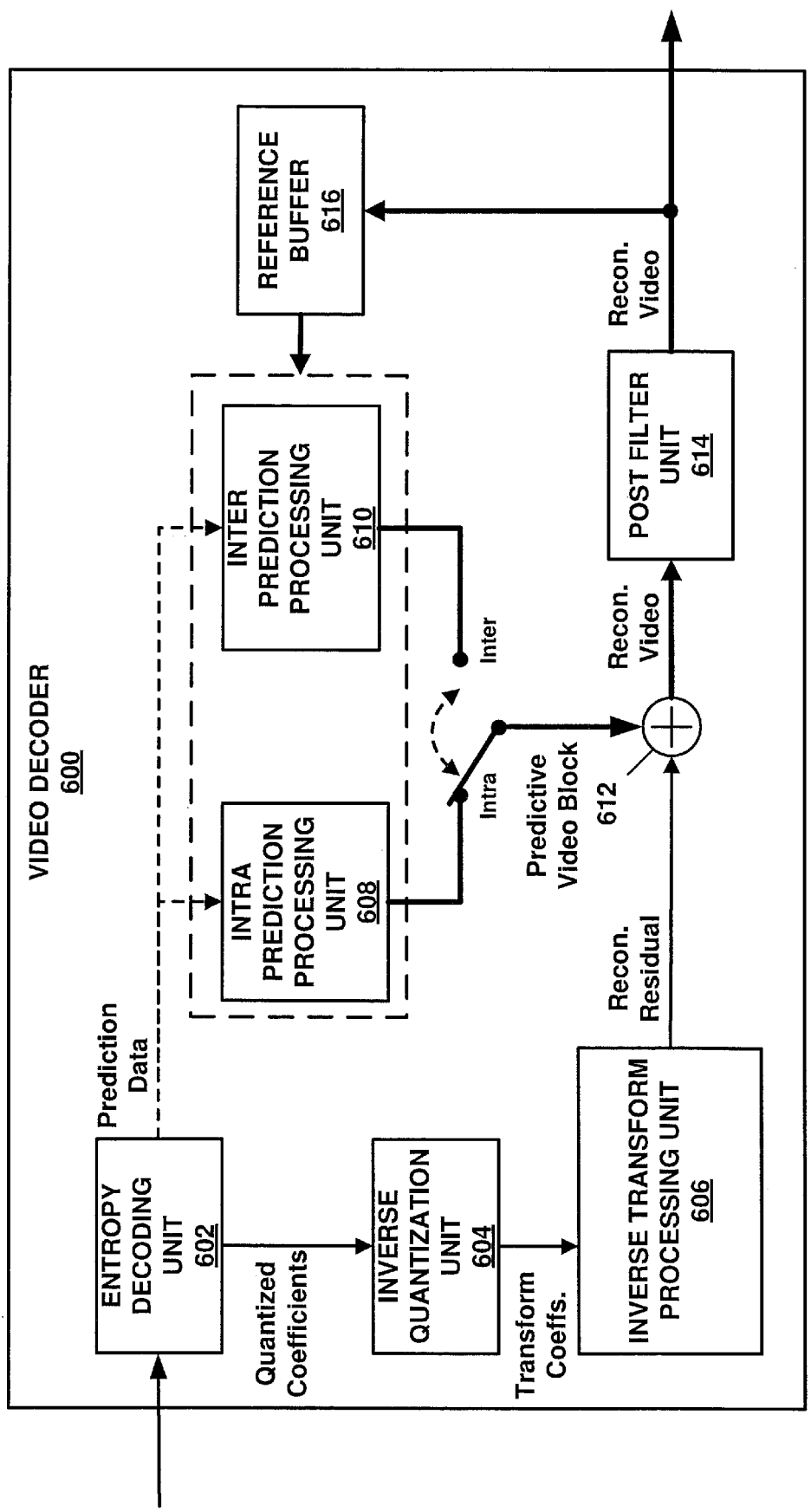
FIG. 9 is a block diagram illustrating an example of a video decoder that may be configured to decode video data according to one or more techniques of this disclosure.

FIG. 9 is a block diagram illustrating an example of a video decoder that may be configured to decode video data according to one or more techniques of this disclosure. In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. In the example illustrated in FIG. 9, video decoder 600 includes an entropy decoding unit 602, inverse quantization unit and transform coefficient processing unit 604, intra prediction processing unit 606, inter prediction processing unit 608, summer 610, post filter unit 612, and reference buffer 614. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 9, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 9, entropy decoding unit 602 may determine a quantization parameter, quantized coefficient values, transform data, and predication data from a bitstream. In the example, illustrated in FIG. 9, inverse quantization unit and transform coefficient processing unit 604 receives a quantization parameter, quantized coefficient values, transform data, and predication data from entropy decoding unit 602 and outputs reconstructed residual data.

Referring again to FIG. 9, reconstructed residual data may be provided to summer 610 summer 610 may add reconstructed residual data to a predictive video block and generate reconstructed video data. A predictive video block may be determined according to a predictive video technique (i.e., intra prediction and inter frame prediction). Intra prediction processing unit 606 may be configured to receive intra prediction syntax elements and retrieve a predictive video block from reference buffer 614. Reference buffer 614 may include a memory device configured to store one or more frames of video data. Intra prediction syntax elements may identify an intra prediction mode, such as the intra prediction modes described above. Inter prediction processing unit 608 may receive inter prediction syntax elements and generate motion vectors to identify a prediction block in one or more reference frames stored in reference buffer 814. Inter prediction processing unit 608 may produce motion compensated blocks, possibly performing interpolation based on interpolation filters. Identifiers for interpolation filters to be used for motion estimation with sub-pixel precision may be included in the syntax elements. Inter prediction processing unit 808 may use interpolation filters to calculate interpolated values for sub-integer pixels of a reference block. Post filter unit 612 may be configured to perform filtering on reconstructed video data. For example, post filter unit 612 may be configured to perform deblocking and/or Sample Adaptive Offset (SAO) filtering, e.g., based on parameters specified in a bitstream. Further, it should be noted that in some examples, post filter unit 612 may be configured to perform proprietary discretionary filtering (e.g., visual enhancements, such as, mosquito noise reduction). As illustrated in FIG. 9, a reconstructed video block may be output by video decoder 600. In this manner, video decoder 600 may be configured to parse a flag indicating tile sets are enabled in a bitstream, parse a syntax element indicating a number tile set columns partitioning a picture, parsing a syntax element indicating a number tile set rows partitioning a picture, and generate video data based on values of the parsed syntax elements.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

CROSS REFERENCE

This Nonprovisional application claims priority under 35 U.S.C. § 119 on provisional Application Nos. 62/774,050 on Nov. 30, 2018, 62/784,296 on Dec. 21, 2018, 62/791,227 on Jan. 11, 2019, 62/806,502 on Feb. 15, 2019, the entire contents of which are hereby incorporated by reference.

The invention claimed is:
1. A method of decoding video data, the method comprising:
  decoding a first flag syntax in a picture parameter set, wherein the first flag syntax specifies whether tiles within each of at least one slice are in a raster scan order or the tiles within each of the at least one slice cover a rectangular region of a picture;

decoding a second flag syntax in the picture parameter set, wherein the second flag syntax specifies that each of the at least one slice includes only one rectangular region or each of the at least one slice includes one or more rectangular regions;

decoding a first number syntax when the first number syntax is present in the picture parameter set, wherein the first number syntax is present in the picture parameter set when a value of the first flag syntax is equal to one and a value of the second flag syntax is equal to zero;

decoding a slice address syntax when the slice address syntax is present in a slice header, wherein the slice address syntax is present in the slice header when the value of the first flag syntax is equal to zero and a number of tiles of a picture is greater than one;

determining, based on the value of the first flag syntax, whether a second number syntax is present in the slice header;

decoding the second number syntax in the slice header when the value of the first flag syntax is equal to zero, wherein the value of the first flag syntax being equal to zero indicates that the second number syntax is present in the slice header; and deriving a variable specifying a number of the tiles within each of the at least one slice by using the second number syntax.

2. A method of coding video data, the method comprising:

coding a first flag syntax in a picture parameter set, wherein the first flag syntax specifies whether tiles within each of at least one slice are in a raster scan order or the tiles within each of the at least one slice cover a rectangular region of a picture;

coding a second flag syntax in the picture parameter set, wherein the second flag syntax specifies that each of the at least one slice includes only one rectangular region or each of the at least one slice includes one or more rectangular regions;

coding a first number syntax when the first number syntax is present in the picture parameter set, wherein the first number syntax is present in the picture parameter set when a value of the first flag syntax is equal to one and a value of the second flag syntax is equal to zero;

coding a slice address syntax into a slice header when it is determined that the slice address syntax is to be coded into the slice header, wherein the slice address syntax is present in the slice header when the value of the first flag syntax is equal to zero and a number of tiles of a picture is greater than one;

determining, based on the value of the first flag syntax, whether to code a second number syntax into the slice header;

coding the second number syntax into the slice header when the value of the first flag syntax is equal to zero, wherein the value of the first flag syntax being equal to zero indicates that the second number syntax is to be coded into the slice header; and deriving a variable specifying a number of the tiles within each of the at least one slice by using the second number syntax.

3. The method of claim 1, wherein the slice address syntax indicates a raster scan tile index of a tile in the at least one slice or a slice index of a slice in the at least one slice.

4. The method of claim 3, wherein the slice address syntax is the raster scan tile index when the first flag syntax is equal to zero.

5. The method of claim 3, wherein the slice address syntax is the slice index when the first flag syntax is equal to one.

6. The method of claim 1, wherein the tiles within each of the at least one slice are in the raster scan order when the first flag syntax is equal to zero.

7. The method of claim 1, further comprising deriving a length of the slice address syntax based on the number of tiles of the picture when the first flag syntax is equal to zero.

8. The method of claim 7, further comprising deriving a value of the slice address syntax in a range of zero to a maximum value by subtracting one from the number of tiles of the picture when the first flag syntax is equal to zero.

9. The method of claim 1, wherein the slice address syntax is present in the slice header when the value of the first flag syntax is equal to one.

10. The method of claim 1, wherein a value of the first number syntax plus one specifies a number of slices in each of at least one picture corresponding to the picture parameter set.

11. A device for decoding video data, the device comprising:

at least one processor; and at least one storage device coupled to the at least one processor and storing computer-executable instructions that, when executed by the at least one processor, cause the device to:

decode a first flag syntax in a picture parameter set, wherein the first flag syntax specifies whether tiles within each of at least one slice are in a raster scan order or the tiles within each of the at least one slice cover a rectangular region of a picture;

decode a second flag syntax in the picture parameter set, wherein the second flag syntax specifies that each of the at least one slice includes only one rectangular region or each of the at least one slice includes one or more rectangular regions;

decode a first number syntax when the first number syntax is present in the picture parameter set, wherein the first number syntax is present in the picture parameter set when a value of the first flag syntax is equal to one and a value of the second flag syntax is equal to zero;

decode a slice address syntax when the slice address syntax is present in a slice header, wherein the slice address syntax is present in the slice header when the value of the first flag syntax is equal to zero and a number of tiles of a picture is greater than one;

determine, based on the value of the first flag syntax, whether a second number syntax is present in the slice header;

decode the second number syntax in the slice header when the value of the first flag syntax is equal to zero, wherein the value of the first flag syntax being equal to zero indicates that the second number syntax is present in the slice header; and derive a variable specifying a number of the tiles within each of the at least one slice by using the second number syntax.

12. The device of claim 11, wherein the slice address syntax indicates a raster scan tile index of a tile in the at least one slice or a slice index of a slice in the at least one slice.

13. The device of claim 11, wherein the computer-executable instructions, when executed by the at least one processor, further cause the device to derive a length of the slice address syntax based on the number of tiles of the picture when the first flag syntax is equal to zero.

14. The device of claim 13, wherein the computer-executable instructions, when executed by the at least one processor, further cause the device to derive a value of the slice address syntax in a range of zero to a maximum value by subtracting one from the number of tiles of the picture when the first flag syntax is equal to zero.

* * * * *